United States Patent
Ishida

(10) Patent No.: US 8,758,495 B2
(45) Date of Patent: Jun. 24, 2014

(54) INK SET, INK CARTRIDGE, INKJET PRINTER, INKJET RECORDING METHOD, AND RECORDED MATTER

(75) Inventor: Shinya Ishida, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 266 days.

(21) Appl. No.: 13/246,986

(22) Filed: Sep. 28, 2011

(65) Prior Publication Data
US 2012/0075393 A1 Mar. 29, 2012

(30) Foreign Application Priority Data
Sep. 29, 2010 (JP) .................................. 2010-220080

(51) Int. Cl.
C09D 11/02 (2014.01)

(52) U.S. Cl.
USPC ................... 106/31.5; 106/31.48; 106/31.49; 106/31.52

(58) Field of Classification Search
USPC ......... 106/31.5, 31.48, 31.49, 31.52; 347/100
See application file for complete search history.

(56) References Cited

U.S. PATENT DOCUMENTS

| | | | |
|---|---|---|---|
| 6,923,855 B2 * | 8/2005 | Harada et al. ................. | 106/31.5 |
| 7,252,707 B2 * | 8/2007 | Ozawa et al. ................. | 106/31.52 |
| 7,507,282 B2 * | 3/2009 | Ozawa et al. ................. | 106/31.48 |
| 7,510,605 B2 * | 3/2009 | Harada et al. ................. | 106/31.48 |
| 7,704,311 B2 * | 4/2010 | Tojo ............................ | 106/31.52 |
| 7,731,788 B2 * | 6/2010 | Kitamura et al. ............ | 106/31.5 |
| 7,740,695 B2 * | 6/2010 | Kitamura et al. ............ | 106/31.49 |
| 7,776,144 B2 * | 8/2010 | Taguchi et al. .............. | 106/31.5 |
| 8,070,870 B2 * | 12/2011 | Wachi ......................... | 106/31.5 |
| 8,080,099 B2 * | 12/2011 | Saito et al. .................. | 106/31.5 |
| 8,262,789 B2 * | 9/2012 | Tateishi et al. .............. | 106/31.48 |
| 8,372,190 B2 * | 2/2013 | Tateishi et al. .............. | 106/31.5 |
| 8,496,745 B2 * | 7/2013 | Katsumata ................... | 106/31.48 |
| 2004/0129172 A1 | 7/2004 | Harada et al. | |

FOREIGN PATENT DOCUMENTS

| | | |
|---|---|---|
| JP | 2007-138124 A | 6/2007 |
| JP | 4402917 B2 | 1/2010 |

OTHER PUBLICATIONS

Derwent abstract of JP 2007/138124; Jun. 2007.*
Office Action dated Mar. 4, 2014 issued by the Japanese Patent Office in counterpart Japanese Patent Application No. 2010-220080.

* cited by examiner

Primary Examiner — Helene Klemanski
(74) Attorney, Agent, or Firm — Sughrue Mion, PLLC

(57) ABSTRACT

An ink set is provided and includes at least a yellow ink composition, a magenta ink composition, and a cyan ink composition, wherein the yellow ink composition contains as a colorant at least one selected from the group consisting of a compound represented by formula (Y-I) and a salt thereof.

Formula (Y-I):

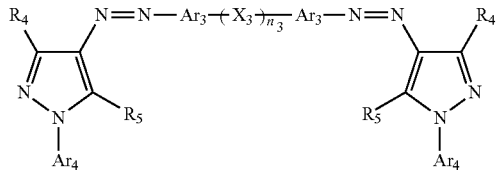

where $R_4$ represents a monovalent group; $R_5$ represents $-OR_6$ or $-NHR_7$; each of $R_6$ and $R_7$ represents a hydrogen atom or a monovalent group; $X_3$ represents a divalent linking group; $n_3$ represents 0 or 1; $Ar_3$ represents a divalent heterocyclic group; and $Ar_4$ represents an alkyl group, an aryl group, or a monovalent triazine ring group.

20 Claims, No Drawings

INK SET, INK CARTRIDGE, INKJET PRINTER, INKJET RECORDING METHOD, AND RECORDED MATTER

This application is based on and claims priority under 35 U.S.C. §119 from Japanese Patent Application No. 2010-220080, filed Sep. 29, 2010, the entire disclosure of which is herein incorporated by reference.

BACKGROUND OF THE INVENTION

1. Field of the Invention

The present invention relates to an ink set capable of forming an image excellent in, in particular, light fastness and ozone resistance, and excellent in preservation stability. The invention further relates to an ink cartridge, inkjet printer, inkjet recording method and recorded matter using the ink set.

2. Background Art

The inkjet recording has rapidly spread in recent years and is still continuing development for the reasons that the materials are inexpensive, high speed recording is possible, noise during recording is little, and color recording is easy.

The inkjet recording method includes a continuous method of continuously jetting droplets, and an on-demand method of jetting droplets according to image information signal. Ejecting methods of droplets include a method of ejecting droplets by the application of pressure by means of a piezo element, a method of ejecting droplets by generating bubbles in ink by heating, a method of using ultrasonic wave, and a method of suction/ejection of droplets by electrostatic force.

As the ink for inkjet recording, aqueous inks, oil inks and solid (melting type) inks are used.

Such dyestuffs used in the inkjet recording ink are required to be excellent in solubility or dispersibility in a solvent, to be capable of high density recording, to have good hue, to be fast to light, heat, and active gases in the environment (NOx, oxidizing gases such as ozone, and SOx), to have excellent resistance to water and chemicals, to have good fixing ability to image-receiving materials and hardly bleed, to be excellent in preservation stability as the ink, to be nontoxic, to have high purity, and to be inexpensively available.

For example, bis-azo dyestuffs showing good hue and having high fastness to light, ozone, and wet heat are disclosed in Japanese Patent No. 4402917 as yellow dyes.

Further, in recent years, obtaining recorded matters by making color images by an inkjet recording method using plural color ink compositions is performed. Color images are generally formed with three colors of a yellow ink composition, a magenta ink composition, and a cyan ink composition, and further, if necessary, four colors by adding a black ink composition thereto. In addition, there are cases where color images are formed with six colors including the above four colors plus a light cyan ink composition and a light magenta ink composition, and further, with seven colors of the above six colors plus a dark yellow ink composition. Those obtained by combination of two or more kinds of ink compositions as above are ink sets (for example, refer to JP-A-2007-138124).

It is required of the ink sets for use in the formation of color images as described above that the ink composition itself of every color has a good coloring property and, in addition, a good intermediate color can be developed when plural ink compositions are used in combination, and the obtained recorded matters are not discolored or decolored during preservation.

Further, when the light fastness and ozone resistance of a specific ink composition are conspicuously lower than the light fastness and ozone resistance of other ink composition in an ink set, the color formed by the specific ink composition is discolored or decolored faster than other colors, and the tone balance of the image at large worsens. As a result, observers come to be capable of recognizing deterioration of picture quality of the image in a shorter time than the time to be capable of recognizing discoloration of an image formed with a single ink composition.

Accordingly, in an ink set, in addition to the improvement of light fastness and ozone resistance of each ink composition constituting the ink set, it is preferred that light fastness and ozone resistance levels of each ink composition, i.e., deterioration speeds due to light and ozone of an image formed with each ink composition, for example, discoloration speed, is equal as far as possible. That is to say, it is preferred that light fastness and ozone resistance of each ink composition constituting the ink set are excellent and, at the same time, the difference in light fastness and ozone resistance between each ink composition is small.

An image having various color densities can be obtained by constituting an ink set including two kinds of dark and light ink compositions of the same system of colors different in color density, so that an image free of the feeling of graininess has come to be capable of being obtained. Such an ink set containing two kinds of ink compositions different in color density is mainly used in printing of a photographic image. In the formation of a photographic image, for relieving or solving the feeling of graininess of an image, an ink composition of low color density is generally used in many cases. Also in evaluation of the above-described light fastness and ozone resistance, a pattern of the evaluation sample of optical density in the vicinity of 1.0 is formed with an ink composition of low color density. Accordingly, for the purpose of the improvement of light fastness and ozone resistance of the photographic image of the recorded matter and light fastness and ozone resistance as ink set at large, it is preferred to improve light fastness and ozone resistance of ink composition of low color density.

On the other hand, since high color density ink compositions are used in printing of an image of brilliant colors and a graphic art pattern, it is also necessary to improve light fastness and ozone resistance of these ink compositions.

Further, a black ink composition performs an important role in an image from the viewpoint of obtaining the contrast of an image. Accordingly, a black ink composition is contained in an ink set in many cases.

Therefore, when a black ink composition is contained in an ink set, it is desired that the black ink composition has excellent light fastness and ozone resistance and also the speed of deterioration of the black ink composition due to light and ozone is not conspicuously different from the speeds of deterioration of other ink compositions constituting the ink set.

SUMMARY OF THE INVENTION

As described above, it is desired in an ink set that not only light fastness and ozone resistance of each ink composition itself constituting the ink set are good, but also light fastness and ozone resistance between each ink composition are well balanced, and when a specific color is exposed to light and ozone, the specific color is not discolored and/or decolored faster than other colors. Thus, since the balance of performance between ink compositions is important in an ink set, an ink composition which is high in performance singly is not necessarily suitable for an ink set.

In the ink set described in JP-A-2007-138124, light fastness and ozone resistance of each ink composition are improved, but room for improvement of the balance of light fastness and ozone resistance between ink compositions is left, and further improvement of preservation stability of inks is demanded.

An object of the invention is to provide an ink set having good light fastness and ozone resistance, capable of recording an image excellent in color balance, and excellent in preservation stability. Further objects are to provide an ink cartridge housing the ink set, an inkjet printer loaded with the ink cartridge, a recording method using the ink set, and a recorded matter recorded with the ink set.

As a result of precise studies of dyes having good hue, solubility, high light fastness, ozone resistance, and preservation stability, the present inventors have found that the above objects can be achieved by combining dyes of various colors each having a specific structure, thus the invention has been accomplished. Means for achieving the above objects are as follows.

[1] An ink set comprising at least a yellow ink composition, a magenta ink composition, and a cyan ink composition, wherein the yellow ink composition contains as a colorant at least one selected from the group consisting of a compound represented by formula (Y-I) and a salt thereof:

Formula (Y-I):

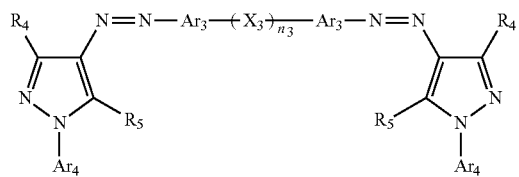

wherein $R_4$ represents a monovalent group; $R_5$ represents —$OR_6$ or —$NHR_7$; each of $R_6$ and $R_7$ represents a hydrogen atom or a monovalent group; $X_3$ represents a divalent linking group; $n_3$ represents 0 or 1; $Ar_3$ represents a divalent heterocyclic group; and $Ar_4$ represents an alkyl group, an aryl group, or a monovalent triazine ring group.

[2] The ink set as described in [1], wherein the yellow ink composition contains the colorant in an amount of 1.0% by mass to 6.0% by mass to the gross mass of the yellow ink composition.

[3] The ink set as described in [1] or [2], wherein the magenta ink composition contains as a colorant at least one selected from the group consisting of a compound represented by formula (M-1) and a salt thereof:

Formula (M-1):

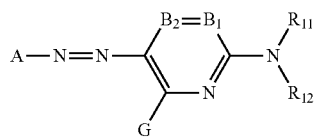

wherein
A represents a 5-membered heterocyclic group;
each of $B_1$ and $B_2$ independently represents —$CR_{13}$= or —$CR_{14}$=, or either one of $B_1$ and $B_2$ represents a nitrogen atom and the other represents —$CR_{13}$= or —$CR_{14}$=;

each of $R_{11}$ and $R_{12}$ independently represents a hydrogen atom, an alkyl group, a cycloalkyl group, an alkenyl group, an alkynyl group, an aralkyl group, an aryl group, a heterocyclic group, an acyl group, an alkoxycarbonyl group, an aryloxycarbonyl group, a carbamoyl group, an alkylsulfonyl group, an arylsulfonyl group, or a sulfamoyl group, and each group may further have a substituent; and each of G, $R_{13}$ and $R_{14}$ independently represents a hydrogen atom, a halogen atom, an alkyl group, an alkenyl group, an alkynyl group, an aralkyl group, an aryl group, a heterocyclic group, a cyano group, a carboxyl group, a carbamoyl group, an alkoxycarbonyl group, an aryloxycarbonyl group, an acyl group, a hydroxyl group, an alkoxy group, an aryloxy group, a silyloxy group, an acyloxy group, a carbamoyloxy group, a heterocyclic oxy group, an alkoxycarbonyloxy group, an aryloxycarbonyloxy group, an amino group substituted with an alkyl group or aryl group or heterocyclic group, an acylamino group, a ureido group, a sulfamoylamino group, an alkoxycarbonylamino group, an aryloxycarbonylamino group, an alkylsulfonylamino group, an arylsulfonylamino group, a nitro group, an alkylthio group, an arylthio group, an alkylsulfonyl group, an arylsulfonyl group, an alkylsulfinyl group, an arylsulfinyl group, a sulfamoyl group, a heterocyclic thio group, or an ionic hydrophilic group, each of which may further be substituted, and $R_{13}$ and $R_{14}$, or $R_{11}$ and $R_{12}$ may be bonded to form a 5- or 6-membered ring, provided that formula (M-1) has at least one ionic hydrophilic group.

[4] The ink set as described in [3], wherein the magenta ink composition includes two magenta ink compositions different in color density, and at least one of the two magenta ink compositions contains as a colorant at least one selected from the group consisting of a compound represented by formula (M-1) and a salt thereof.

[5] The ink set as described in [4], wherein, of the two magenta ink compositions different in color density, a magenta ink composition having a lower color density contains as a colorant at least one selected from the group consisting of a compound represented by formula (M-1) and a salt thereof, and the magenta ink composition having the lower color density contains the colorant in an amount of 0.5% by mass to 3.5% by mass to the gross mass of the magenta ink composition having the lower color density.

[6] The ink set as described in [4] or [5], wherein, of the two magenta ink compositions different in color density, a magenta ink composition having a higher color density contains as a colorant at least one selected from the group consisting of a compound represented by formula (M-1) and a salt thereof, and the magenta ink composition having the higher color density contains the colorant in an amount of 3% by mass to 10% by mass to the gross mass of the magenta ink composition having the higher color density.

[7] The ink set as described in any one of [4] to [6], wherein, in the two magenta ink compositions different in color density, a ratio of a concentration (% by mass) of the colorant contained in a magenta ink composition having a lower color density to a concentration (% by mass) of the colorant contained in a magenta ink composition having a higher color density (% by mass) is in a range of ½ to ⅛.

[8] The ink set as described in any one of [1] to [7], wherein the cyan ink composition contains as a colorant at least one selected from the group consisting of a compound represented by formula (C-1) and a salt thereof:

Formula (C-1):

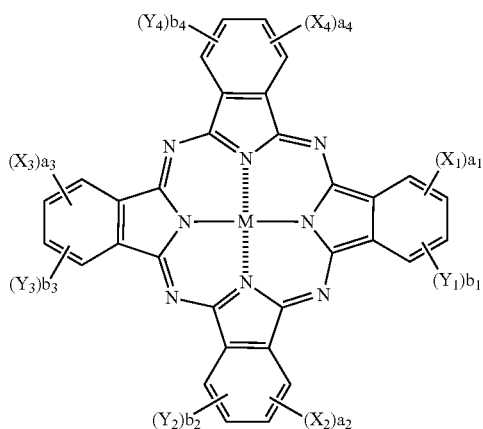

wherein each of $X_1$, $X_2$, $X_3$ and $X_4$ independently represents —SO—Z, —SO$_2$—Z, —SO$_2$NV$_1$V$_2$, —CO$_2$NV$_1$V$_2$, —CO$_2$Z, —CO—Z, or a sulfo group, wherein Z represents an alkyl group, a cycloalkyl group, an alkenyl group, an alkynyl group, an aralkyl group, an aryl group, or a heterocyclic group, and each group may further have a substituent; $V_1$ and $V_2$, which may be the same or different, and each independently represents a hydrogen atom, an alkyl group, a cycloalkyl group, an alkenyl group, an alkynyl group, an aralkyl group, an aryl group, or a heterocyclic group, and each group may further have a substituent;

each of $Y_1$, $Y_2$, $Y_3$ and $Y_4$ independently represents a hydrogen atom, a halogen atom, an alkyl group, a cycloalkyl group, an alkenyl group, an aralkyl group, an aryl group, a heterocyclic group, a cyano group, a hydroxyl group, a nitro group, an amino group, an alkylamino group, an alkoxy group, an aryloxy group, an amido group, an arylamino group, a ureido group, a sulfamoylamino group, an alkylthio group, an arylthio group, an alkoxycarbonylamino group, a sulfonamido group, a carbamoyl group, a sulfamoyl group, an alkoxycarbonyl group, a heterocyclic oxy group, an azo group, an acyloxy group, a carbamoyloxy group, a silyloxy group, an aryloxycarbonyl group, an aryloxycarbonylamino group, an imido group, a heterocyclic thio group, a phosphoryl group, an acyl group, or an ionic hydrophilic group, and each of these groups may further have a substituent;

each of $a_1$ to $a_4$ and $b_1$ to $b_4$ represents the number of substituents of $X_1$ to $X_4$ and $Y_1$ to $Y_4$, respectively, each of $a_1$ to $a_4$ independently represents an integer of 0 to 4, and all of $a_1$ to $a_4$ do not represent 0 at the same time, and each of $b_1$ to $b_4$ independently represents an integer of 0 to 4; and M represents a hydrogen atom or a metal atom or an oxide, hydroxide, or halide thereof, provided that at least one of $X_1$, $X_2$, $X_3$, $X_4$, $Y_1$, $Y_2$, $Y_3$ and $Y_4$ is an ionic hydrophilic group or a group having an ionic hydrophilic group as a substituent.

[9] The ink set as described in [8], wherein the cyan ink composition includes two cyan ink compositions different in color density, and at least one of the two cyan ink compositions contains as a colorant at least one selected from the group consisting of a compound represented by formula (C-1) and a salt thereof.

[10] The ink set as described in [9], wherein, of the two cyan ink compositions different in color density, a cyan ink composition having a lower color density contains as a colorant at least one selected from the group consisting of a compound represented by formula (C-1) and a salt thereof, and the cyan ink composition having the lower color density contains the colorant in an amount of 0.4% by mass to 3.0% by mass to the gross mass of the cyan ink composition having the lower color density.

[11] The ink set as described in [9] or [10], wherein, of the two cyan ink compositions different in color density, a cyan ink composition having a higher color density contains as a colorant at least one selected from the group consisting of a compound represented by formula (C-1) and a salt thereof, and the cyan ink composition having the higher color density contains the colorant in an amount of 2.0% by mass to 10.0% by mass to the gross mass of the cyan ink composition having the higher color density.

[12] The ink set as described in any one of [9] to [11], wherein, in the two cyan ink compositions different in color density, a ratio of a concentration (% by mass) of the colorant contained in a cyan ink composition having a lower color density to a concentration (% by mass) of the colorant contained in a cyan ink composition having a higher color density is in an range of ½ to ⅛.

[13] The ink set as described in [1] to [12], which further comprises a black ink composition, wherein the black ink composition contains as a colorant at least one selected from the group consisting of a compound represented by formula (BkII-1) or (BkIII-1) and a salt thereof:

Formula (BkII-1):

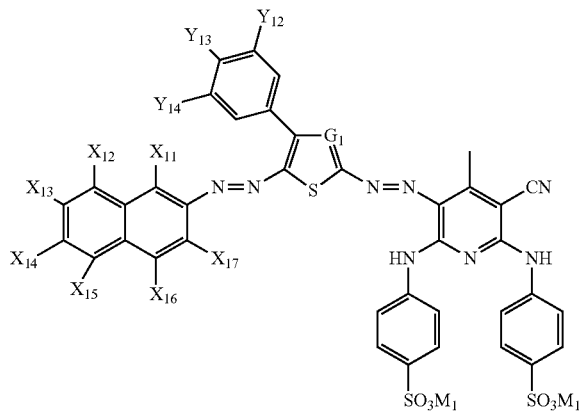

wherein $G_1$ represents a nitrogen atom or —C(R$_{12}$)═; R$_{12}$ represents a hydrogen atom, a sulfo group, a carboxyl group, a substituted or unsubstituted carbamoyl group, or a cyano group; each of $X_{11}$, $X_{12}$, $X_{13}$, $X_{14}$, $X_{15}$, $X_{16}$ and $X_{17}$ independently represents a hydrogen atom or a monovalent substituent; each of $Y_{12}$, $Y_{13}$ and $Y_{14}$ independently represents a hydrogen atom or a monovalent substituent, and $Y_{12}$, $Y_{13}$ and $Y_{14}$ may be bonded to each other to form a ring; and each of $M_1$ independently represents a hydrogen atom or a monovalent counter cation;

Formula (BkIII-1):

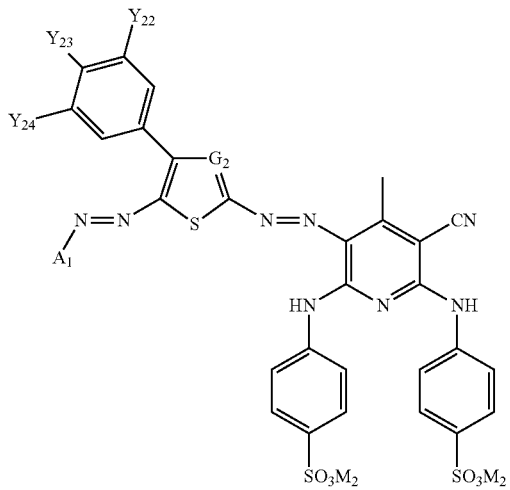

wherein $A_1$ represents an aryl group or a nitrogen-containing 5-membered heterocyclic group; $G_2$ represents a nitrogen atom or —$C(R_{22})$=; $R_{22}$ represents a hydrogen atom, a sulfo group, a carboxyl group, a substituted or unsubstituted carbamoyl group, or a cyano group; each of $Y_{22}$, $Y_{23}$ and $Y_{24}$ independently represents a hydrogen atom or a monovalent substituent, and $Y_{22}$, $Y_{23}$ and $Y_{24}$ may be bonded to each other to form a ring; and each of $M_2$ independently represents a hydrogen atom or a monovalent counter cation.

[14] The ink set as described in [13], wherein the black ink composition further contains a compound represented by formula (B-14):

Formula (B-14):

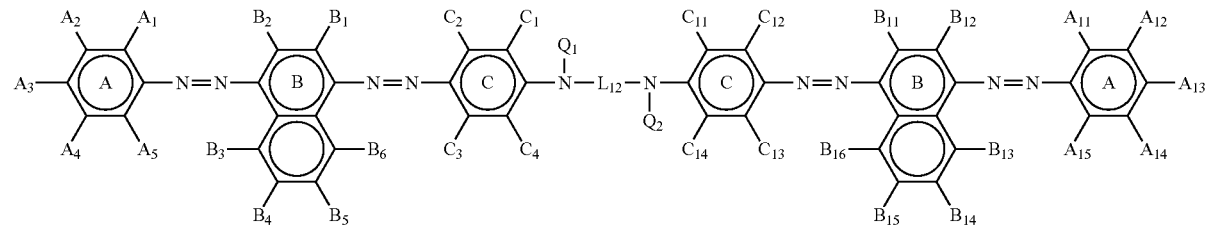

wherein each of ring A, ring B and ring C independently represents a substituted or unsubstituted aryl group or heterocyclic group; each of $A_1$, $A_2$, $A_3$, $A_4$, $A_5$, $A_{11}$, $A_{12}$, $A_{13}$, $A_{14}$, $A_{15}$, $B_1$, $B_2$, $B_3$, $B_4$, $B_5$, $B_6$, $B_{11}$, $B_{12}$, $B_{13}$, $B_{14}$, $B_{15}$, $B_{16}$, $C_1$, $C_2$, $C_3$, $C_4$, $C_{11}$, $C_{12}$, $C_{13}$ and $C_{14}$ independently represents a hydrogen atom or a substituent; each of $Q_1$ and $Q_2$ independently represents a hydrogen atom or a substituent; and $L_{12}$ represents a divalent linking group, provided that the compound represented by formula (B-14) has at least one ionic hydrophilic group.

[15] An ink cartridge housing an ink set as described in any one of [1] to [14].

[16] An inkjet printer loaded with an ink cartridge as described in [15].

[17] An inkjet recording method comprising recording with an ink set as described in any one of [1] to [14] or an ink cartridge as described in [15].

[18] An inkjet recording method comprising forming an image with an ink set as described in any one of [1] to [14] or an ink cartridge as described in [15].

[19] A recorded matter recorded with an ink set as described in any one of [1] to [14] or an ink cartridge as described in [15].

DETAILED DESCRIPTION OF THE INVENTION

By the use of a specific compound as a colorant of a yellow ink composition, an ink set of the invention excellent in ink preservation stability can be obtained. An image obtained with the ink set is excellent in light fastness and ozone resistance, and has good color balance.

<Ink Set>

An ink set according to the invention is an ink set containing at least a yellow ink composition, a magenta ink composition, and a cyan ink composition, and the yellow ink composition contains as a colorant at least one selected from the group consisting of a compound represented by formula (Y-I) and a salt thereof:

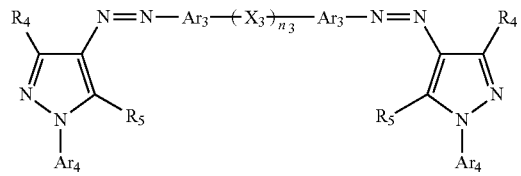

In formula (Y-I), $R_4$ represents a monovalent group; $R_5$ represents —$OR_6$ or —$NHR_7$; each of $R_6$ and $R_7$ independently represents a hydrogen atom or a monovalent substituent; $X_3$ represents a divalent linking group; $n_3$ represents 0 or 1; $Ar_3$ represents a divalent heterocyclic group; and $Ar_4$ represents an alkyl group, an aryl group, or a monovalent triazine ring group.

The present inventors have constituted ink sets by combining various kinds of ink compositions of plural colors, and investigated preservation stability of the inks and improvement of the light fastness and ozone resistance of the images formed. As a result, it has been found that the ink sets containing the yellow ink compositions using the colorant having the above specific structure are excellent in the preservation stability of the inks, and when images are recorded with the ink sets, the images of recorded matters are excellent in light fastness and ozone resistance and the difference in deterioration speed of yellow due to light and ozone is little. Accordingly, it has been found that ink sets which hardly make observers feel deterioration of images at large even when deterioration of the images due to light and ozone progresses to some degree can be obtained.

Every ink composition contained in the ink sets of the invention will be described below.

In the first place, a colorant contained in each ink composition is described below with every ink composition.

A Hammett's substituent constant σp value used in the specification of the invention will be explained briefly. The Hammett's rule is a rule of thumb proposed by L. P. Hammett in 1935 for quantitatively discussing the influence of a substituent affecting the reaction or equilibrium of a benzene derivative, and the validity of which is widely recognized today. In the substituent constant required of the Hammett's rule are a σp value and a σm value, and these values are found in many ordinary publications. For example, these values are described in detail in J. A. Dean compiled, *Lange's Handbook of Chemistry*, Ed. 12 (1979), McGraw Hill, and *Kagaku no Ryoiki* (*Region of Chemistry*), Extra Edition, Vol. 122, pp. 96-103 (1979), Nankodo Co., Ltd. Incidentally, in the invention, each substituent is limited or explained by Hammett's substituent constant σp value, but this does not mean to be limited to solely the substituents having known values as found in the above publications. A substituent that is supposed to be included within the range if measured in conformity with Hammett's rule is also included of course, even when the value thereof is unknown in the publications. The compounds represented by general formulae in the invention are not benzene derivatives, but σp value is used as an index showing the electronic effect of the substituent irrespective of substitution position. In the invention, σp value is hereinafter used in such a meaning (Yellow)

Colorants used in the yellow ink composition constituting the ink set in the invention are described below.

The yellow ink composition according to the invention contains as a colorant at least a compound represented by the following formula (Y-I) or a salt thereof which is used as a yellow dye.

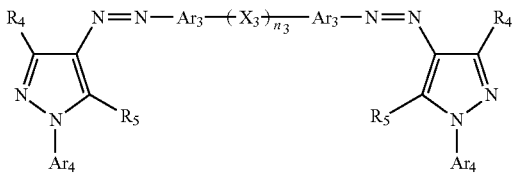

In formula (Y-I), $R_4$ represents a monovalent group; $R_5$ represents —$OR_6$ or —$NHR_7$; each of $R_6$ and $R_7$ independently represents a hydrogen atom or a monovalent group; $X_3$ represents a divalent linking group; $n_3$ represents 0 or 1; $Ar_3$ represents a divalent heterocyclic group; and $Ar_4$ represents an alkyl group, an aryl group, or a monovalent triazine ring group.

Formula (Y-I) will be described below.

(Substituents)

Substituents in formula (Y-I) are explained in the first place.

The substituents are not restricted so long as they are substitutable groups. The examples include a halogen atom, an alkyl group, a cycloalkyl group, an aralkyl group, an alkenyl group, an alkynyl group, an aryl group, a heterocyclic group, a cyano group, a hydroxyl group, a nitro group, a carboxyl group (or a salt thereof), an alkoxy group, an aryloxy group, a silyloxy group, a heterocyclic oxy group, an acyloxy group, a carbamoyloxy group, an alkoxycarbonyloxy group, an aryloxycarbonyloxy group, an amino group (including an anilino group), an acylamino group, an aminocarbonylamino group, an alkoxycarbonylamino group, an aryloxycarbonylamino group, a sulfamoylamino group, an alkylsulfonylamino group, arylsulfonylamino group, a mercapto group, an alkylthio group, an arylthio group, a heterocyclic thio group, a sulfamoyl group, a sulfo group (or a salt thereof), an alkylsulfinyl group, an arylsulfinyl group, an alkylsulfonyl group, an arylsulfonyl group, an acyl group, an aryloxycarbonyl group, an alkoxycarbonyl group, a carbamoyl group, an imido group, a phosphino group, a phosphinyl group, a phosphinyloxy group, a phosphinylamino group, and a silyl group.

Each of these substituents may further be substituted. As further substituents, groups selected from the above-described substituents can be exemplified. As the examples of the substituents having a further substituent, an alkylcarbonylaminosulfonyl group, an arylcarbonylaminosulfonyl group, an alkylsulfonylaminocarbonyl group, and an arylsulfonylaminocarbonyl group are exemplified. As the specific examples thereof, a methylsulfonylaminocarbonyl group, a p-methylphenylsulfonylaminocarbonyl group, an acetylaminosulfonyl group, and a benzoylaminosulfonyl group are exemplified.

In formula (Y-I), $R_4$ represents a monovalent substituent; $R_5$ represents —$OR_6$ or —$NHR_7$; each of $R_6$ and $R_7$ represents a hydrogen atom or a monovalent substituent.

As the monovalent groups represented by $R_4$, $R_6$ and $R_7$, e.g., a halogen atom, an alkyl group, a cycloalkyl group, an aralkyl group, an alkenyl group, an alkynyl group, an aryl group, a heterocyclic group, a cyano group, a hydroxyl group, a nitro group, a carboxyl group (or a salt thereof), an alkoxy group, an aryloxy group, a silyloxy group, a heterocyclic oxy group, an acyloxy group, a carbamoyloxy group, an alkoxycarbonyloxy group, an aryloxycarbonyloxy group, an amino group (including an anilino group), an acylamino group, an aminocarbonylamino group, an alkoxycarbonylamino group, an aryloxycarbonylamino group, a sulfamoylamino group, an alkylsulfonylamino or arylsulfonylamino group, a mercapto group, an alkylthio group, an arylthio group, a heterocyclic thio group, a sulfamoyl group, a sulfo group (or a salt thereof), an alkylsulfinyl group, an arylsulfinyl group, an alkylsulfonyl group, an arylsulfonyl group, an acyl group, an aryloxycarbonyl group, an alkoxycarbonyl group, a carbamoyl group, an imido group, a phosphino group, a phosphinyl group, a phosphinyloxy group, a phosphinylamino group, and a silyl group are exemplified.

The monovalent groups represented by $R_4$, $R_6$ and $R_7$ are described in further detail.

As the halogen atoms represented by $R_4$, $R_6$ and $R_7$, e.g., a chlorine atom, a bromine atom, and an iodine atom are exemplified.

Examples of the alkyl groups represented by $R_4$, $R_6$ and $R_7$ include substituted or unsubstituted alkyl groups. The alkyl groups represented by $R_4$, $R_6$ and $R_7$ are preferably substituted or unsubstituted alkyl groups each having 1 to 30 carbon atoms. As the examples of the substituents, the groups described above in the item of the substituents are exemplified, and preferably a hydroxyl group, an alkoxy group, a cyano group, a halogen atom, a sulfo group (which may take the form of a salt), and a carboxyl group (which may take the form of a salt) are exemplified. As the examples of the alkyl groups, a methyl group, an ethyl group, a propyl group, an n-butyl group, a t-butyl group, an n-octyl group, an eicosyl group, a 2-chloroethyl group, a hydroxyethyl group, a cyano ethyl group, and a 4-sulfobutyl group are exemplified.

Examples of the cycloalkyl groups represented by $R_4$, $R_6$ and $R_7$ include substituted or unsubstituted cycloalkyl groups. The cycloalkyl groups represented by $R_4$, $R_6$ and $R_7$ are preferably substituted or unsubstituted cycloalkyl groups each having 5 to 30 carbon atoms. As the examples of the substituents, the groups described above in the item of the substituents are exemplified. As the examples of the cycloalkyl groups, a cyclohexyl group, a cyclopentyl group, and a 4-n-dodecylcyclohexyl group are exemplified.

Examples of the aralkyl groups represented by $R_4$, $R_6$ and $R_7$ include substituted or unsubstituted aralkyl groups. The aralkyl groups represented by $R_4$, $R_6$ and $R_7$ are preferably substituted or unsubstituted aralkyl groups each having 7 to 30 carbon atoms. As the examples of the substituents, the groups described above in the item of the substituents are exemplified. As the examples of the aralkyl groups, a benzyl group and a 2-phenethyl group are exemplified.

Examples of the alkenyl groups represented by $R_4$, $R_6$ and $R_7$ include straight chain, branched or cyclic, substituted or unsubstituted alkenyl groups. The alkenyl groups represented by $R_4$, $R_6$ and $R_7$ are preferably substituted or unsubstituted alkenyl groups each having 2 to 30 carbon atoms. As the examples of the substituents, the groups described above in the item of the substituents are exemplified. As the examples of the alkenyl groups, a vinyl group, an allyl group, a prenyl group, a geranyl group, an oleyl group, a 2-cyclopenten-1-yl group, and a 2-cyclohexen-1-yl group are exemplified.

Examples of the alkynyl groups represented by $R_4$, $R_6$ and $R_7$ include substituted or unsubstituted alkynyl groups. The alkynyl groups represented by $R_4$, $R_6$ and $R_7$ are preferably substituted or unsubstituted alkynyl groups each having 2 to 30 carbon atoms. As the examples of the substituents, the groups described above in the item of the substituents are exemplified. As the examples of the alkynyl groups, an ethynyl group, and a propargyl group are exemplified.

Examples of the aryl groups represented by $R_4$, $R_6$ and $R_7$ include substituted or unsubstituted aryl groups. The aryl groups represented by $R_4$, $R_6$ and $R_7$ are preferably substituted or unsubstituted aryl groups each having 6 to 30 carbon atoms. As the examples of the substituents, the groups described above in the item of the substituents are exemplified. As the examples of the aryl groups, a phenyl group, a p-tolyl group, a naphthyl group, an m-chlorophenyl group, and an o-hexadecanoylaminophenyl group are exemplified.

Examples of the heterocyclic groups represented by $R_4$, $R_6$ and $R_7$ include substituted or unsubstituted heterocyclic groups. The heterocyclicaryl groups represented by $R_4$, $R_6$ and $R_7$ are preferably monovalent groups obtained by removing one hydrogen atom from 5- or 6-membered, substituted or unsubstituted, aromatic or non-aromatic heterocyclic compounds, and more preferably 5- or 6-membered aromatic heterocyclic groups having 3 to 30 carbon atoms. As the examples of the substituents, the groups described above in the item of the substituents are exemplified. As the examples of the heterocyclic groups, a 2-furyl group, a 2-thienyl group, a 2-pyrimidinyl group, and a 2-benzothiazolyl group are exemplified.

Examples of the alkoxy groups represented by $R_4$, $R_6$ and $R_7$ include substituted or unsubstituted alkoxy groups. The alkoxy groups represented by $R_4$, $R_6$ and $R_7$ are preferably substituted or unsubstituted alkoxy groups each having 1 to 30 carbon atoms. As the examples of the substituents, the groups described above in the item of the substituents are exemplified. As the examples of the alkoxy groups, a methoxy group, an ethoxy group, an isopropoxy group, an n-octyloxy group, a methoxyethoxy group, a hydroxyethoxy group, and a 3-carboxypropoxy group are exemplified.

Examples of the aryloxy groups represented by $R_4$, $R_6$ and $R_7$ include substituted or unsubstituted aryloxy groups. The aryloxy groups represented by $R_4$, $R_6$ and $R_7$ are preferably substituted or unsubstituted aryloxy groups each having 6 to 30 carbon atoms. As the examples of the substituents, the groups described above in the item of the substituents are exemplified. As the examples of the aryloxy groups, a phenoxy group, a 2-methylphenoxy group, a 4-t-butylphenoxy group, a 3-nitrophenoxy group, and a 2-tetradecanoylaminophenoxy group are exemplified.

Examples of the silyloxy groups represented by $R_4$, $R_6$ and $R_7$ include substituted or unsubstituted silyloxy groups. The silyloxy groups represented by $R_4$, $R_6$ and $R_7$ are preferably substituted or unsubstituted silyloxy groups each having 3 to 20 carbon atoms. As the examples of the substituents, the groups described above in the item of the substituents are exemplified. As the examples of the silyloxy groups, a trimethylsilyloxy group and a t-butyldimethylsilyloxy group are exemplified.

Examples of the heterocyclic oxy groups represented by $R_4$, $R_6$ and $R_7$ include substituted or unsubstituted heterocyclic oxy groups. The heterocyclic oxy groups represented by $R_4$, $R_6$ and $R_7$ are preferably substituted or unsubstituted heterocyclic oxy groups each having 2 to 30 carbon atoms. As the examples of the substituents, the groups described above in the item of the substituents are exemplified. As the examples of the heterocyclic oxy groups, a 1-phenyltetrazol-5-oxy group and a 2-tetrahydropyranyloxy group are exemplified.

Examples of the acyloxy groups represented by $R_4$, $R_6$ and $R_7$ include substituted or unsubstituted acyloxy groups. The alkyloxy groups represented by $R_4$, $R_6$ and $R_7$ are preferably formyloxy groups, substituted or unsubstituted alkylcarbonyloxy groups each having 2 to 30 carbon atoms, and substituted or unsubstituted arylcarbonyloxy groups each having 6 to 30 carbon atoms. As the examples of the substituents, the groups described above in the item of the substituents are exemplified. As the examples of the acyloxy groups, a formyloxy group, an acetyloxy group, a pivaloyloxy group, a stearoyloxy group, a benzoyloxy group, and a p-methoxyphenylcarbonyloxy group are exemplified.

Examples of the carbamoyloxy groups represented by $R_4$, $R_6$ and $R_7$ include substituted or unsubstituted carbamoyloxy groups. The carbamoyloxy groups represented by $R_4$, $R_6$ and $R_7$ are preferably substituted or unsubstituted carbamoyloxy groups each having 1 to 30 carbon atoms. As the examples of the substituents, the groups described above in the item of the substituents are exemplified. As the examples of the carbamoyloxy groups, an N,N-dimethylcarbamoyloxy group, an N,N-diethylcarbamoyloxy group, a morpholinocarbonyloxy group, an N,N-di-n-octylaminocarbonyloxy group, and an N-n-octylcarbamoyloxy group are exemplified.

Examples of the alkoxycarbonyloxy groups represented by $R_4$, $R_6$ and $R_7$ include substituted or unsubstituted alkoxycarbonyloxy groups. The alkoxycarbonyloxy groups represented by $R_4$, $R_6$ and $R_7$ are preferably substituted or unsubstituted alkoxycarbonyloxy groups each having 2 to 30 carbon atoms. As the examples of the substituents, the groups described above in the item of the substituents are exemplified. As the examples of the alkoxycarbonyloxy groups, a methoxycarbonyloxy group, an ethoxycarbonyloxy group, a t-butoxycarbonyloxy group, and an n-octylcarbonyloxy group are exemplified.

Examples of aryloxycarbonyloxy groups represented by $R_4$, $R_6$ and $R_7$ include substituted or unsubstituted aryloxycarbonyloxy groups. The aryloxycarbonyloxy groups represented by $R_4$, $R_6$ and $R_7$ are preferably substituted or unsubstituted aryloxycarbonyloxy groups each having 7 to 30 carbon atoms. As the examples of the substituents, the groups described above in the item of the substituents are exemplified. As the examples of the aryloxycarbonyloxy groups, a phenoxycarbonyloxy group, a p-methoxyphenoxycarbonyloxy group, and a p-(n-hexadecyloxy)phenoxycarbonyloxy group are exemplified.

Examples of the amino groups represented by $R_4$, $R_6$ and $R_7$ include substituted or unsubstituted amino groups. The amino groups represented by $R_4$, $R_6$ and $R_7$ are preferably substituted or unsubstituted alkylamino groups each having 1 to 30 carbon atoms and substituted or unsubstituted anilino groups each having 6 to 30 carbon atoms. As the examples of the substituents, the groups described above in the item of the substituents are exemplified. As the examples of the amino groups, an amino group, a methylamino group, a dimethylamino group, an anilino group, an N-methylanilino group, and a diphenylamino group are exemplified.

Examples of the acylamino groups represented by $R_4$, $R_6$ and $R_7$ include substituted or unsubstituted acylamino groups. The acylamino groups represented by $R_4$, $R_6$ and $R_7$ are preferably formylamino groups, substituted or unsubstituted alkylcarbonylamino groups each having 1 to 30 carbon atoms, and substituted or unsubstituted arylcarbonylamino groups each having 6 to 30 carbon atoms. As the examples of the substituents, the groups described above in the item of the substituents are exemplified. As the examples of the acylamino groups, a formylamino group, an acetylamino group, a pivaloylamino group, a lauroylamino group, a benzoylamino group, and a 3,4,5-tri-n-octyloxyphenylcarbonylamino group are exemplified.

Examples of the aminocarbonylamino groups represented by $R_4$, $R_6$ and $R_7$ include substituted or unsubstituted aminocarbonylamino groups. The aminocarbonylamino groups represented by $R_4$, $R_6$ and $R_7$ are preferably substituted or unsubstituted aminocarbonylamino groups each having 1 to 30 carbon atoms. As the examples of the substituents, the groups described above in the item of the substituents are exemplified. As the examples of the aminocarbonylamino groups, a carbamoylamino group, an N,N-dimethylaminocarbonylamino group, an N,N-diethylaminocarbonylamino group, and a morpholinocarbonylamino group are exemplified.

Examples of the alkoxycarbonylamino groups represented by $R_4$, $R_6$ and $R_7$ include substituted or unsubstituted alkoxycarbonylamino groups. The alkoxycarbonylamino groups represented by $R_4$, $R_6$ and $R_7$ are preferably substituted or unsubstituted alkoxycarbonylamino groups each having 2 to 30 carbon atoms. As the examples of the substituents, the groups described above in the item of the substituents are exemplified. As the examples of the alkoxycarbonylamino groups, a methoxycarbonylamino group, an ethoxycarbonylamino group, a t-butoxycarbonylamino group, an n-octadecyloxycarbonylamino group, and an N-methylmethoxycarbonyamino group are exemplified.

Examples of the aryloxycarbonylamino groups represented by $R_4$, $R_6$ and $R_7$ include substituted or unsubstituted aryloxycarbonylamino groups. The aryloxycarbonylamino groups represented by $R_4$, $R_6$ and $R_7$ are preferably substituted or unsubstituted aryloxycarbonylamino groups each having 7 to 30 carbon atoms. As the examples of the substituents, the groups described above in the item of the substituents are exemplified. As the examples of the aryloxycarbonylamino groups, a phenoxycarbonylamino group, a p-chlorophenoxycarbonylamino group, and an m-(n-octyloxy)phenoxycarbonylamino group are exemplified.

Examples of the sulfamoylamino groups represented by $R_4$, $R_6$ and $R_7$ include substituted or unsubstituted sulfamoylamino groups. The sulfamoylamino groups represented by $R_4$, $R_6$ and $R_7$ are preferably substituted or unsubstituted sulfamoylamino groups each having 0 to 30 carbon atoms. As the examples of the substituents, the groups described above in the item of the substituents are exemplified. As the examples of the sulfamoylamino groups, a sulfamoylamino group, an N,N-dimethylaminosulfonylamino group, and an N-n-octylaminosulfonylamino group are exemplified.

Examples of the alkylsulfonylamino or arylsulfonylamino groups represented by $R_4$, $R_6$ and $R_7$ include substituted or unsubstituted alkylsulfonylamino or arylsulfonylamino groups. The alkylsulfonylamino or arylsulfonylamino groups represented by $R_4$, $R_6$ and $R_7$ are preferably substituted or unsubstituted alkylsulfonylamino groups each having 1 to 30 carbon atoms and substituted or unsubstituted arylsulfonylamino groups each having 6 to 30 carbon atoms. As the examples of the substituents, the groups described above in the item of the substituents are exemplified. As the examples of the alkylsulfonylamino or arylsulfonylamino groups, a methylsulfonylamino group, a butylsulfonylamino group, a phenylsulfonyl-amino group, a 2,3,5-trichlorophenylsulfonylamino group, and a p-methylphenyl-sulfonylamino group are exemplified.

Examples of the alkylthio groups represented by $R_4$, $R_6$ and $R_7$ include substituted or unsubstituted alkylthio groups. The alkylthio groups represented by $R_4$, $R_6$ and $R_7$ are preferably substituted or unsubstituted alkylthio groups each having 1 to 30 carbon atoms. As the examples of the substituents, the groups described above in the item of the substituents are exemplified. As the examples of the alkylthio groups, a methylthio group, an ethylthio group, and an n-hexadecylthio group are exemplified.

Examples of the arylthio groups represented by $R_4$, $R_6$ and $R_7$ include substituted or unsubstituted arylthio groups. The arylthio groups represented by $R_4$, $R_6$ and $R_7$ are preferably substituted or unsubstituted arylthio groups each having 6 to 30 carbon atoms. As the examples of the substituents, the groups described above in the item of the substituents are exemplified. As the examples of the arylthio groups, a phenylthio group, a p-chlorophenylthio group, and an m-methoxyphenylthio group are exemplified.

Examples of the heterocyclic thio groups represented by $R_4$, $R_6$ and $R_7$ include substituted or unsubstituted heterocyclic thio groups. The heterocyclic thio groups represented by $R_4$, $R_6$ and $R_7$ are preferably substituted or unsubstituted heterocyclic thio groups each having 2 to 30 carbon atoms. As the examples of the substituents, the groups described above in the item of the substituents are exemplified. As the examples of the heterocyclic thio groups, a 2-benzothiazolylthio group and a 1-phenyltetrazol-5-ylthio group are exemplified.

Examples of the sulfamoyl groups represented by $R_4$, $R_6$ and $R_7$ include substituted or unsubstituted sulfamoyl groups. The sulfamoyl groups represented by $R_4$, $R_6$ and $R_7$ are preferably substituted or unsubstituted sulfamoyl groups each having 0 to 30 carbon atoms. As the examples of the substituents, the groups described above in the item of the substituents are exemplified. As the examples of the sulfamoyl groups, an N-ethylsulfamoyl group, an N-(3-dodecyloxypropyl)sulfamoyl group, an N,N-dimethylsulfamoyl group, an N-acetylsulfamoyl group, an N-benzoylsulfamoyl group, and an N—(N'-phenylcarbamoyl)sulfamoyl group are exemplified.

Examples of the alkylsulfinyl or arylsulfinyl groups represented by $R_4$, $R_6$ and $R_7$ include substituted or unsubstituted alkylsulfiny or arylsulfinyl groups. The alkylsulfinyl or arylsulfinyl groups represented by $R_4$, $R_6$ and $R_7$ are preferably substituted or unsubstituted alkylsulfinyl groups each having 1 to 30 carbon atoms and substituted or unsubstituted arylsulfinyl groups each having 6 to 30 carbon atoms. As the examples of the substituents, the groups described above in the item of the substituents are exemplified. As the examples of the alkylsulfinyl or arylsulfinyl groups, a methylsulfinyl group, an ethylsulfinyl group, a phenylsulfinyl group, and a p-methylphenylsulfinyl group are exemplified.

Examples of the alkylsulfonyl or arylsulfonyl groups represented by $R_4$, $R_6$ and $R_7$ include substituted or unsubstituted alkylsulfonyl or arylsulfonyl groups. The alkylsulfonyl or arylsulfonyl groups represented by $R_4$, $R_6$ and $R_7$ are preferably substituted or unsubstituted alkylsulfonyl groups each having 1 to 30 carbon atoms and substituted or unsubstituted arylsulfonyl groups each having 6 to 30 carbon atoms. As the examples of the substituents, the groups described above in the item of the substituents are exemplified. As the examples of the alkylsulfonyl or arylsulfonyl groups, a methylsulfonyl group, an ethylsulfonyl group, a phenylsulfonyl group, and a p-methylphenylsulfonyl group are exemplified.

Examples of the acyl groups represented by $R_4$, $R_6$ and $R_7$ include substituted or unsubstituted acyl groups. The acyl groups represented by $R_4$, $R_6$ and $R_7$ are preferably formyl groups, substituted or unsubstituted alkylcarbonyl groups each having 2 to 30 carbon atoms, substituted or unsubstituted arylcarbonyl groups each having 7 to 30 carbon atoms, and substituted or unsubstituted heterocyclic carbonyl groups each having 4 to 30 carbon atoms being bonded to a carbonyl group via a carbon atom. As the examples of the substituents, the groups described above in the item of the substituents are exemplified. As the examples of the acyl groups, an acetyl group, a pivaloyl group, a 2-chloroacetyl group, a stearoyl group, a benzoyl group, a p-(n-octyloxy)phenylcarbonyl group, a 2-pyridylcarbonyl group, and a 2-furylcarbonyl group are exemplified.

Examples of the aryloxycarbonyl groups represented by $R_4$, $R_6$ and $R_7$ include substituted or unsubstituted aryloxycarbonyl groups. The aryloxycarbonyl groups represented by $R_4$, $R_6$ and $R_7$ are preferably substituted or unsubstituted aryloxy-carbonyl groups each having 7 to 30 carbon atoms. As the examples of the substituents, the groups described above in the item of the substituents are exemplified. As the examples of the aryloxycarbonyl groups, a phenoxycarbonyl group, an o-chlorophenoxycarbonyl group, an m-nitrophenoxycarbonyl group, and a p-(t-butyl)-phenoxycarbonyl group are exemplified.

Examples of the alkoxycarbonyl groups represented by $R_4$, $R_6$ and $R_7$ include substituted or unsubstituted alkoxycarbonyl groups. The alkoxycarbonyl groups represented by $R_4$, $R_6$ and $R_7$ are preferably substituted or unsubstituted alkoxycarbonyl groups each having 2 to 30 carbon atoms. As the examples of the substituents, the groups described above in the item of the substituents are exemplified. As the examples of the alkoxycarbonyl groups, a methoxycarbonyl group, an ethoxycarbonyl group, a t-butoxycarbonyl group, and an n-octadecyloxycarbonyl group are exemplified.

Examples of the carbamoyl groups represented by $R_4$, $R_6$ and $R_7$ include substituted or unsubstituted carbamoyl groups. The carbamoyl groups represented by $R_4$, $R_6$ and $R_7$ are preferably substituted or unsubstituted carbamoyl groups each having 1 to 30 carbon atoms. As the examples of the substituents, the groups described above in the item of the substituents are exemplified. As the examples of the carbamoyl groups, a carbamoy group, an N-methylcarbamoyl group, an N,N-dimethylcarbamoyl group, an N,N-di-n-octylcarbamoyl group, and an N-(methylsulfonyl)carbamoyl group are exemplified.

Examples of the phosphino groups represented by $R_4$, $R_6$ and $R_7$ include substituted or unsubstituted phosphino groups. The phosphino groups represented by $R_4$, $R_6$ and $R_7$ are preferably substituted or unsubstituted phosphino groups each having 2 to 30 carbon atoms. As the examples of the substituents, the groups described above in the item of the substituents are exemplified. As the examples of the phosphino groups, a dimethylphosphino group, a diphenylphosphino group, and a methylphenoxyphosphino group are exemplified.

Examples of the phosphinyl groups represented by $R_4$, $R_6$ and $R_7$ include substituted or unsubstituted phosphinyl groups. The phosphinyl groups represented by $R_4$, $R_6$ and $R_7$ are preferably substituted or unsubstituted phosphinyl groups each having 2 to 30 carbon atoms. As the examples of the substituents, the groups described above in the item of the substituents are exemplified. As the examples of the phosphinyl groups, a phosphinyl group, a dioctyloxyphosphinyl group and a diethoxyphosphinyl group are exemplified.

Examples of the phosphinyloxy groups represented by $R_4$, $R_6$ and $R_7$ include substituted or unsubstituted phosphinyloxy groups. The phosphinyloxy groups represented by $R_4$, $R_6$ and $R_7$ are preferably substituted or unsubstituted phosphinyloxy groups each having 2 to 30 carbon atoms. As the examples of the substituents, the groups described above in the item of the substituents are exemplified. As the examples of the phosphinyloxy groups, a diphenoxyphosphinyloxy group and a dioctyloxyphosphinyloxy group are exemplified.

Examples of the phosphinylamino groups represented by $R_4$, $R_6$ and $R_7$ include substituted or unsubstituted phosphinylamino groups. The phosphinylamino groups represented by $R_4$, $R_6$ and $R_7$ are preferably substituted or unsubstituted phosphinylamino groups each having 2 to 30 carbon atoms. As the examples of the substituents, the groups described above in the item of the substituents are exemplified. As the examples of the phosphinylamino groups, a dimethoxyphosphinylamino group and a dimethylaminophosphinylamino group are exemplified.

Examples of the silyl groups represented by $R_4$, $R_6$ and $R_7$ include substituted or unsubstituted silyl groups. The silyl groups represented by $R_4$, $R_6$ and $R_7$ are preferably substituted or unsubstituted silyl groups each having 3 to 30 carbon atoms. As the examples of the substituents, the groups described above in the item of the substituents are exemplified. As the examples of the silyl groups, a trimethylsilyl group, a t-butyldimethylsilyl group, and a phenyldimethylsilyl group are exemplified.

In formula (Y-I), $R_4$ preferably represents an alkyl group, an aryl group or a heterocyclic group, more preferably an alkyl group, still more preferably a methyl group, an ethyl group, a propyl group, an n-butyl group, or a t-butyl group, and still further preferably a t-butyl group.

$R_5$ preferably represents —$NHR_7$.

Each of $R_6$ and $R_7$ preferably represents a hydrogen atom, an alkyl group, an acyl group, an alkylsulfonyl group, or an arylsulfonyl group, more preferably a hydrogen atom, an alkyl group, or an acyl group, and especially preferably a hydrogen atom.

In formula (Y-I), $X_3$ represents a divalent linking group. As the divalent linking group represented by $X_3$, an alkylene group (e.g., a methylene group, an ethylene group, a propylene group, a butylene group, a pentylene group), an alkenylene group (e.g., an ethenylene group, a propenylene group), an alkynylene group (e.g., an ethynylene group, a propynylene group), an arylene group (e.g., a phenylene group, a naphthylene group), a divalent heterocyclic group (e.g., a 6-chloro-1,3,5-triazine-2,4-diyl group, a pyrimidine-2,4-diyl group, a quinoxaline-2,3-diyl group), —O—, —CO—, —NR— (wherein R represents a hydrogen atom, an alkyl group or an aryl group), —S—, —SO$_2$—, —SO— and combinations of these groups are exemplified.

Each of the alkylene group, alkenylene group, alkynylene group, arylene group, divalent heterocyclic group, and the alkyl group and aryl group represented by R may have a substituent. As the examples of the substituents, the groups described above in the item of the substituents are exemplified, and preferably a hydroxyl group, an alkoxy group, a cyano group, a halogen atom, a sulfo group (which may take the form of a salt), and a carboxyl group (which may take the form of a salt).

X$_3$ preferably represents an alkylene group having 10 or less carbon atoms, an alkenylene group having 10 or less carbon atoms, an alkynylene group having 10 or less carbon atoms, an arylene group having 6 or more and 10 or less carbon atoms, a divalent heterocyclic group, —O—, —S—, or a combination of these groups.

The gross number of carbon atoms of the divalent linking group represented by X$_3$ is preferably 0 to 50, more preferably 0 to 30, and most preferably 0 to 10.

n$_3$ represents 0 or 1, and preferably 1.

Ar$_3$ represents a divalent heterocyclic group. As the hetero ring, a 5- or 6-membered ring is preferred, which may be a condensed ring, and may be an aromatic hetero ring or a non-aromatic hetero ring. Specifically, pyridine, pyrazine, pyrimidine, pyridazine, triazine, quinoline, isoquinoline, quinazoline, cinnoline, phthalazine, quinoxaline, pyrrole, indole, furan, benzofuran, thiophene, benzothiophene, pyrazole, imidazole, benzimidazole, triazole, oxazole, benzoxazole, thiazole, benzothiazole, isothiazole, benzisothiazole, thiadiazole, isoxazole, benzisoxazole, pyrrolidine, piperidine, piperazine, imidazolidine, and thiazoline are exemplified as such hetero rings.

Of the above, the aromatic heterocyclic group is preferred, pyridine, pyrazine, pyrimidine, pyridazine, triazine, pyrazole, imidazole, benzimidazole, triazole, thiazole, benzothiazole, isothiazole, benzisothiazole, and thiadiazole are more preferred, and thiadiazole is most preferred.

The divalent heterocyclic group represented by Ar$_3$ may have a substituent, and the groups described above in the item of the substituents are exemplified as the substituents.

Ar$_4$ represents an alkyl group, an aryl group, or a monovalent triazine ring group.

The alkyl group and aryl group represented by Ar$_4$ have the same meanings as the alkyl group and aryl group represented by R$_4$, R$_6$ and R$_7$, and preferred ranges are also the same.

Ar$_4$ preferably represents an aryl group or a monovalent triazine ring group, more preferably an aryl group, and still more preferably a phenyl group.

The alkyl group, aryl group, and monovalent triazine ring group represented by Ar$_4$ may further have a substituent. The groups described above in the item of the substituents are exemplified as the substituents, and a sulfo group and a carboxyl group are preferred above all.

In formula (Y-I), plural R$_4$, plural R$_5$, plural Ar$_4$, and plural Ar$_3$ may be the same with or different from each other.

The compound represented by formula (Y-I) of the invention is used as a yellow dye. Accordingly, for the purpose of increasing solubility, it is preferred for R$_4$, R$_6$ or R$_7$ to have an ionic hydrophilic group, or for R$_4$, R$_6$, R$_7$, Ar$_4$ or Ar$_3$ to have an ionic hydrophilic group as a substituent.

Here, a sulfo group, a carboxyl group, a phosphono group and a quaternary ammonium group are included in the ionic hydrophilic group. As the ionic hydrophilic group, a carboxyl group, a phosphono group and a sulfo group are preferred, and a carboxyl group and a sulfo group are especially preferred. The carboxyl group, phosphono group and sulfo group may take the form of a salt. The examples of counter ions for forming a salt include an ammonium ion, an alkali metal ion (e.g., a lithium ion, a sodium ion, a potassium ion), and an organic cation (e.g., a tetramethylammonium ion, a tetramethylguanidium ion, a tetramethylphosphonium ion). Of the counter ions, alkali metal salts are preferred. Of the alkali metal salts, a potassium ion, a sodium ion and a lithium ion are preferred, and a sodium ion and a potassium ion are most preferred.

In formula (Y-I), it is especially preferred that Ar$_4$ has an ionic hydrophilic group.

The specific examples of the dyes represented by formula (Y-I) are shown below, but the invention is not restricted thereto.

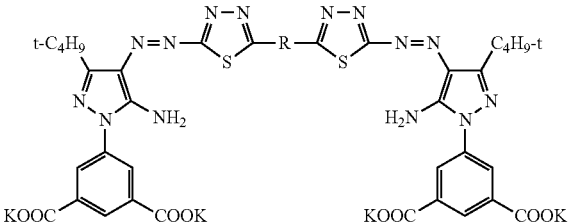

| Dye | R |
|---|---|
| 1 | —SCH$_2$S— |
| 2 | —SCH$_2$CH$_2$S— |
| 3 | —SCH$_2$CH$_2$CH$_2$S— |
| 4 | —SCH$_2$CH$_2$CH$_2$CH$_2$CH$_2$S— |
| 5 | —SCH$_2$CH(CH$_3$)S— |
| 6 | —SCH$_2$CH$_2$CH(CH$_3$)S— |
| 7 | —SC$_2$H$_4$OC$_2$H$_4$S— |
| 8 | —SC$_2$H$_4$OC$_2$H$_4$OC$_2$H$_4$S— |

-continued
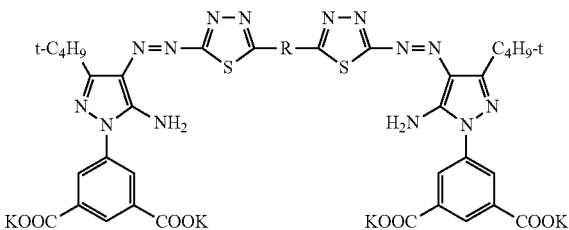
| Dye | R |
|---|---|
| 9 | —SCH₂CH(OH)CH₂S— |
| 10 | —SCH₂CH(CH₂OH)S— |
| 11 | —SCH(COONa)CH₂S— |
| 12 | —SCH(COONa)CH₂CH₂CH(COONa)S— |
| 13 | —SCH(COONa)—CH(COONa)S— |
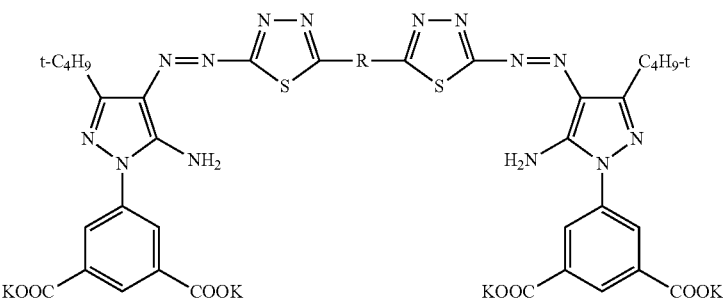
| Dye | R |
|---|---|
| 14 | 1,4-phenylene |
| 15 | 1,3-(4-methyl)phenylene |
| 16 | bis(3-methylphenyl)-NHCONH- linkage |
| 17 | bis(4-phenylene)-NHCONH- linkage |

| Dye | Ar | R |
|---|---|---|
| 18 | 2-methyl-1,4-bis(COOK)phenyl | —SC₃H₆S— |
| 19 | 3-methyl-1,2-bis(COOK), with additional COOK phenyl | —SC₃H₆S— |
| 20 | biphenyl with COOK groups | —SC₃H₆S— |
| 21 | phenyl with COOK and SO₃K groups | —SC₃H₆S— |
| 22 | 3,5-bis(SO₃K)phenyl | —SC₃H₆S— |
| 23 | triazine-linked bis(3,5-di-COOK-anilino) | —SC₃H₆S— |

| Dye | M |
|---|---|
| 24 | Na |
| 25 | Li |
| 26 | NH₄ |
| 27 | HN(Et)₃ |

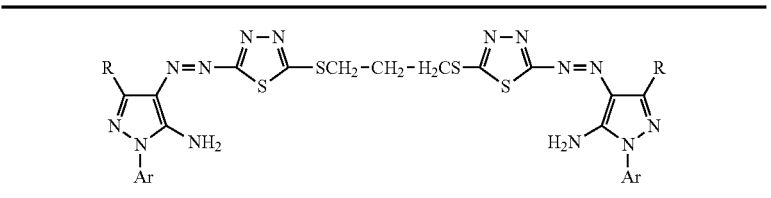
| Dye | R | Ar |
|---|---|---|
| 28 | OEt | 3,5-di(COOK)phenyl |
| 29 | Ph | 3,5-di(COOK)phenyl |
| 30 | t-C$_4$H$_9$ | C$_3$H$_6$SO$_3$K |
| Dye | R |
|---|---|
| 31 | —SCH$_2$CH$_2$S— |
| 32 | —SCH$_2$CH$_2$CH$_2$S— |
| 33 | —SCH$_2$CH$_2$CH$_2$CH$_2$CH$_2$S— |
| 34 | 1,3-phenylene |

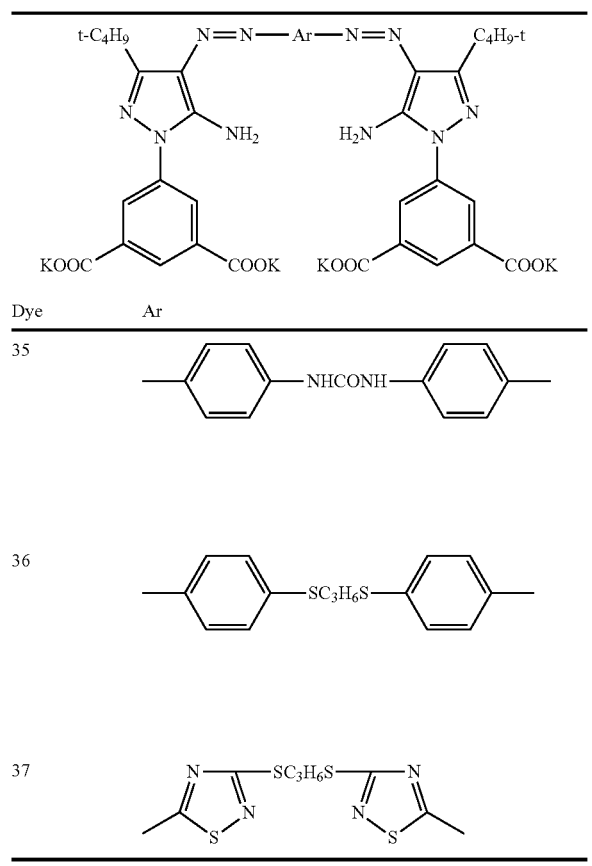
| Dye | Ar |
|---|---|
| 35 | -C6H4-NHCONH-C6H4- |
| 36 | -C6H4-SC3H6S-C6H4- |
| 37 | (5-methyl-1,2,4-thiadiazol-3-yl)-SC3H6S-(5-methyl-1,2,4-thiadiazol-3-yl) |
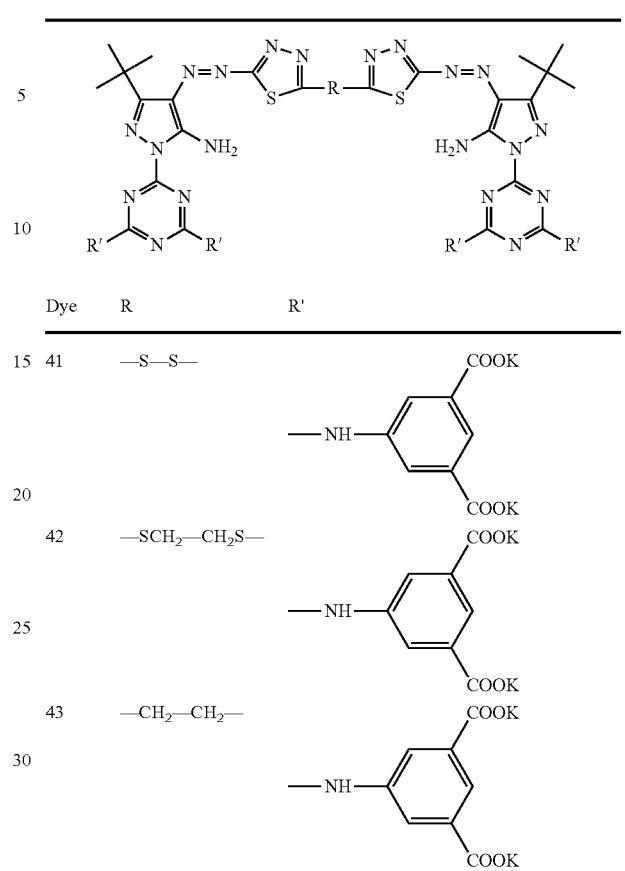
| Dye | R | R' |
|---|---|---|
| 41 | —S—S— | —NH-C6H3(COOK)2 (3,5-dicarboxy) |
| 42 | —SCH2—CH2S— | —NH-C6H3(COOK)2 (3,5-dicarboxy) |
| 43 | —CH2—CH2— | —NH-C6H3(COOK)2 (3,5-dicarboxy) |
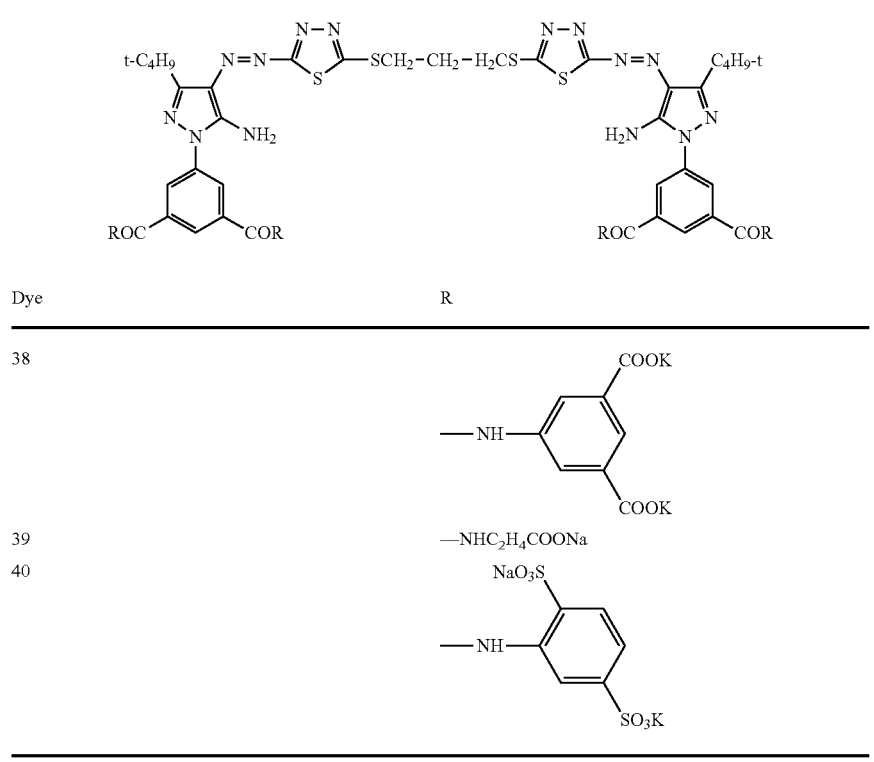
| Dye | R |
|---|---|
| 38 | —NH-C6H3(COOK)2 (3,5-dicarboxy) |
| 39 | —NHC2H4COONa |
| 40 | —NH-C6H3(SO3Na)(SO3K) |

-continued

| Dye | R | R' |
|---|---|---|
| 44 | —C$_2$H$_4$—C$_2$H$_4$— | —NH-(3,5-di-COOK-phenyl) |
| 45 | —SCH$_2$—CH$_2$S— | —NHC$_4$H$_9$ |
| 46 | —SCH$_2$—CH$_2$S— | —N(C$_4$H$_9$)$_2$ |

| Dye | R | R' |
|---|---|---|
| 47 | (pyrazole-triazine-azo-thiadiazole-S— structure with two KOOC-phenyl-NH groups on triazine) | —NHC$_2$H$_4$SO$_3$K |
| 48 | (same R as 47) | —NH-(3,5-di-COOK-phenyl) |
| 49 | (same R as 47) | Cl |

Each of the compounds represented by formula (Y-I) of the invention can be synthesized according to the methods disclosed in JP-A-2004-83903.

When the compound represented by formula (Y-I) is used as a yellow dye, from the viewpoint of color reproducibility, the compound preferably has maximum absorption wavelength (λmax) of 380 nm to 490 nm in an aqueous solution, more preferably λmax of 400 nm to 480 nm, and especially preferably λmax of 420 nm to 460 nm.

Further, for the purpose of adjusting the hue or the like of a yellow ink composition, other yellow dyes can also be used in the invention besides the compound represented by formula (Y-I) in such an extent of not greatly damaging light fastness and ozone resistance.

Yellow dyes which are used in combination include, for example, C.I. Direct Yellow 8, 9, 11, 12, 27, 28, 29, 33, 35, 39, 41, 44, 50, 53, 59, 68, 87, 93, 95, 96, 98, 100, 106, 108, 109, 110, 130, 142, 144, 161, 163, C.I. Acid Yellow 17, 19, 23, 25, 39, 40, 42, 44, 49, 50, 61, 64, 76, 79, 110, 127, 135, 143, 151, 159, 169, 174, 190, 195, 196, 197, 199, 218, 219, 222, 227, C.I. Reactive Yellow 2, 3, 13, 14, 15, 17, 18, 23, 24, 25, 26, 27, 29, 35, 37, 41, 42, C.I. Basic Yellow 1, 2, 4, 11, 13, 14, 15, 19, 21, 23, 24, 25, 28, 29, 32, 36, 39, 40, but the invention is not restricted thereto.

In the invention, the content of a colorant in a yellow ink composition (sum total when two or more colorants are used) can be optionally determined according to the color value of the compound to be used as a colorant (dye), and the content is preferably 1.0% by mass to 6.0% by mass to the gross mass of the yellow ink composition. By making the content of the colorant in a yellow ink composition 1.0% by mass or more, a good color developing property can be obtained, while by making the content of the colorant 6.0% by mass or less, characteristics required of the ink composition for use in an inkjet recording method, such as ejection of the ink from the nozzle, can be bettered, and clogging of the ink nozzle can be prevented.

In particular, the content of the compound represented by formula (Y-I) or a salt thereof in a yellow ink composition is preferably 1.5% by mass to 5.5% by mass to the gross mass of the yellow ink composition, and more preferably 2.0% by mass to 5.5% by mass.

Since the dye of the invention, i.e., the compound represented by formula (Y-I) or a salt thereof, is very excellent in light fastness and ozone resistance, by making an ink set by combining with a cyan ink and magenta ink in the invention and, further, if necessary, a black ink, light fastness and ozone resistance of each color can be conspicuously improved, so that color balance of the image is not disordered after a light/ozone exposure test, and god picture quality of the image can be maintained for a long period of time.

Further, in a yellow ink composition, it becomes possible to further preferably adjust color balance by the combination of the dye, the compound represented by formula (Y-I) or a salt thereof, with a yellow dye usable in the invention (e.g., C.I. Direct Yellow 58), and good picture quality of the printed matter can be maintained for a further long period of time.

(Magenta)

Colorants used in the magenta ink composition constituting the ink set in the invention are described below.

In the ink set in the invention, the colorants used in a magenta ink composition are not limited to colorants having a specific structure, but it is preferred that the difference between the light fastness and ozone resistance of the ink compositions of other colors and the light fastness and ozone resistance of the magenta ink composition is small.

From the above aspect, a magenta dye to be used as a colorant in a magenta ink composition in the invention is preferably selected from the group consisting of a compound represented by the following formula (M-1) and the salts thereof

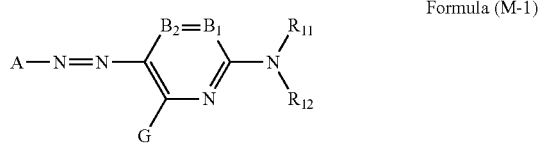

Formula (M-1)

In formula (M-1), A represents a 5-membered heterocyclic group.

Each of $B_1$ and $B_2$ represents $-CR_{13}=$ or $-CR_{14}=$, or either one represents a nitrogen atom and the other represents $-CR_{13}=$ or $-CR_{14}=$.

Each of $R_{11}$ and $R_{12}$ independently represents a hydrogen atom, an alkyl group, a cycloalkyl group, an alkenyl group, an alkynyl group, an aralkyl group, an aryl group, a heterocyclic group, an acyl group, an alkoxycarbonyl group, an aryloxycarbonyl group, a carbamoyl group, an alkylsulfonyl group, an arylsulfonyl group, or a sulfamoyl group, and each group may further have a substituent, provided that $R_{11}$ and $R_{12}$ do not represent a hydrogen atom at the same time.

Each of G, $R_{13}$ and $R_{14}$ independently represents a hydrogen atom, a halogen atom, an alkyl group, an alkenyl group, an alkynyl group, an aralkyl group, an aryl group, a heterocyclic group, a cyano group, a carboxyl group, a carbamoyl group, an alkoxycarbonyl group, an aryloxycarbonyl group, an acyl group, a hydroxyl group, an alkoxy group, an aryloxy group, a silyloxy group, an acyloxy group, a carbamoyloxy group, a heterocyclic oxy group, an alkoxycarbonyloxy group, an aryloxycarbonyloxy group, an amino group substituted with an alkyl group or aryl group or heterocyclic group, an acylamino group, a ureido group, a sulfamoylamino group, an alkoxycarbonylamino group, an aryloxycarbonylamino group, an alkylsulfonylamino group, an arylsulfonylamino group, a nitro group, an alkylthio group, an arylthio group, an alkylsulfonyl group, an arylsulfonyl group, an alkylsulfinyl group, an arylsulfinyl group, a sulfamoyl group, a heterocyclic thio group, or an ionic hydrophilic group, and each of these groups may further be substituted. $R_{13}$ and $R_{14}$, or $R_{11}$ and $R_{12}$ may be bonded to form a 5- or 6-membered ring, provided that formula (M-1) has at least one ionic hydrophilic group.

Formula (M-1) will be described below.

A represents a 5-membered heterocyclic group. As the hetero atoms of the 5-membered hetero ring, N, O and S are exemplified. A preferably represents a nitrogen-containing 5-membered hetero ring, and an aliphatic ring, an aromatic ring or other hetero rings may be condensed with the hetero ring. The examples of preferred hetero rings represented by A include a pyrazole ring, an imidazole ring, a triazole ring, a thiazole ring, an isothiazole ring, a thiadiazole ring, a benzothiazole ring, a benzoxazole ring, and a benzisothiazole ring. Each heterocyclic group may further have a substituent. Hetero rings represented by any of the following formulae (a) to (i) are preferred above all.

(a)

(b)

(c)

(d)

-continued

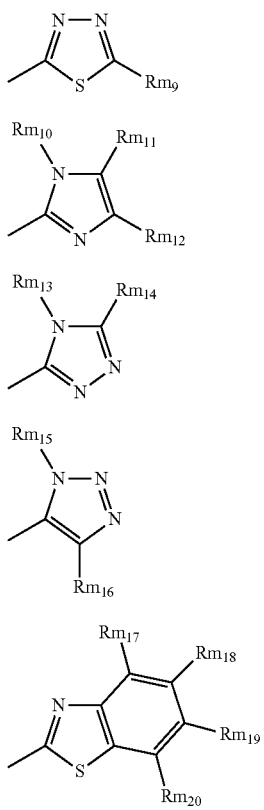

In formulae (a) to (i), $Rm_1$ to $Rm_{20}$ have the same meaning with $R_{13}$ and $R_{14}$ in formula (M-1).

Of formulae (a) to (i), (a) to (h) are preferred, (a) to (e), (g) and (h) are more preferred, and (a) is especially preferred.

$Rm_1$ preferably represents an electron-withdrawing group having a Hammett's substituent constant σp value of 0.20 or more, more preferably a cyano group, an alkylsulfonyl group, an arylsulfonyl group, a nitro group, or a halogen atom, still more preferably a cyano group, an alkylsulfonyl group, or an arylsulfonyl group, and most preferably a cyano group.

$Rm_2$ preferably represents a hydrogen atom, an alkyl group, a cycloalkyl group, an aralkyl group, an aryl group, a heterocyclic group, or an acyl group, more preferably an alkyl group, still more preferably an alkyl group having 1 to 12 carbon atoms, and especially preferably an alkyl group having 1 to 6 carbon atoms.

$Rm_3$ preferably represents a hydrogen atom, an alkyl group, an alkenyl group, an alkynyl group, an aralkyl group, an aromatic group, or a heterocyclic group, more preferably an aryl group or heterocyclic group substituted with an electron withdrawing group, and still more preferably a heterocyclic group substituted with an electron-withdrawing group (preferably an electron-withdrawing group having a Hammett's substituent constant σp value of 0.20 or more). As the hetero rings, a benzothiazole ring and a benzoxazole ring are preferred, and a benzothiazole ring is more preferred. Each of these groups may further have a substituent.

Each of $Rm_4$ to $Rm_{20}$ preferably represents a hydrogen atom, an alkyl group, a cyano group, a carboxyl group, a carbamoyl group, an alkoxycarbonyl group or a heterocyclic group, and more preferably a hydrogen atom, an alkyl group, a cyano group, a carboxyl group, or a heterocyclic group.

In formula (M-1), each of $B_1$ and $B_2$ represents $—CR_{13}=$ or $—CR_{14}=$, or either one represents a nitrogen atom and the other represents $—CR_{13}=$ or $—CR_{14}=$. A case where each of $B_1$ and $B_2$ represents $—CR_{13}=$ or $—CR_{14}=$ is preferred in the point of capable of exhibiting more excellent performance.

Each of $R_{11}$ and $R_{12}$ independently preferably represents a hydrogen atom, a substituted or unsubstituted cycloalkyl group, a substituted or unsubstituted aryl group, a substituted or unsubstituted heterocyclic group, a substituted or unsubstituted acyl group, a substituted or unsubstituted alkylsulfonyl group, or a substituted or unsubstituted arylsulfonyl group, more preferably a hydrogen atom, a substituted aryl group, or a substituted heterocyclic group, and a substituted aryl group or a substituted heterocyclic group is especially preferred, provided that $R_{11}$ and $R_{12}$ do not represent a hydrogen atom at the same time. As the substituted aryl group, a substituted phenyl group is preferred, and an alkyl group (e.g., a methyl group, an ethyl group, a t-butyl group and the like), a carboxyl group and a sulfo group can be exemplified as the substituent. As the hetero rings of the above substituted heterocyclic group, a pyrazole ring, an imidazole ring, a triazole ring, a thiazole ring, an isothiazole ring, a thiadiazole ring, a benzothiazole ring, a benzoxazole ring, and a benzisothiazole ring are exemplified, and a benzothiazole ring is preferred. As the substituent of the substituted heterocyclic group, an alkyl group, a carboxyl group and a sulfo group are exemplified, and a sulfo group is preferred.

Each of G, $R_{13}$ and $R_{14}$ independently represents a hydrogen atom, a halogen atom, an alkyl group, an alkenyl group, an alkynyl group, an aralkyl group, an aryl group, a heterocyclic group, a cyano group, a carboxyl group, a carbamoyl group, an alkoxycarbonyl group, an aryloxycarbonyl group, an acyl group, a hydroxyl group, an alkoxy group, an aryloxy group, a silyloxy group, an acyloxy group, a carbamoyloxy group, a heterocyclic oxy group, an alkoxycarbonyloxy group, an aryloxycarbonyloxy group, an amino group substituted with an alkyl group or aryl group or heterocyclic group, an acylamino group, a ureido group, a sulfamoylamino group, an alkoxycarbonylamino group, an aryloxycarbonylamino group, an alkylsulfonylamino group, an arylsulfonylamino group, a nitro group, an alkylthio group, an arylthio group, an alkylsulfonyl group, an arylsulfonyl group, an alkylsulfinyl group, an arylsulfinyl group, a sulfamoyl group, a heterocyclic thio group, or an ionic hydrophilic group, and each of these groups may further be substituted with any of these substituents.

As the halogen atom represented by G, $R_{13}$ and $R_{14}$, e.g., a fluorine atom, a chlorine atom, a bromine atom, and an iodine atom are exemplified.

As the alkyl group represented by G, $R_{13}$ and $R_{14}$, straight chain, branched or cyclic, substituted or unsubstituted alkyl groups are exemplified, and a cycloalkyl group, a bicycloalkyl group, and a tricyclic structure having more ring structures are also included therein. The alkyl groups in the substituents described hereafter (e.g., an alkyl group in an alkoxy group and an alkylthio group) represent alkyl groups having such a concept. In detail, the alkyl group is preferably an alkyl group having 1 to 30 carbon atoms, and, for example, a methyl group, an ethyl group, an n-ropyl group, an isopropyl group, a t-butyl group, an n-octyl group, an eicosyl group, a 2-chloroethyl group, a 2-cyanoethyl group, and a 2-ethylhexyl group are exemplified. The cycloalkyl group is preferably a substituted or unsubstituted cycloalkyl group having 3 to 30 carbon atoms, and, for example, a cyclohexyl group, a cyclopentyl group, and a 4-n-dodecylcyclohexyl group are exemplified. The bicycloalkyl group is preferably a substituted or unsubstituted bicycloalkyl group having 5 to 30 carbon atoms, i.e., a monovalent group obtained by removing one hydrogen atom from bicycloalkane having 5 to 30 carbon atoms, and, for example, a bicycle[1,2,2]heptan-2-yl group, and a bicycle[2,2,2]octan-3-yl group are exemplified.

The alkenyl group represented by G, $R_{13}$ and $R_{14}$ is preferably a straight chain, branched or cyclic, substituted or unsubstituted alkenyl group, and a cycloalkenyl group and a bicycloalkenyl group are included. In detail, as the alkenyl group, a substituted or unsubstituted alkenyl group having 2 to 30 carbon atoms, e.g., a vinyl group, an allyl group, a prenyl group, a geranyl group, and an oleyl group can be preferably exemplified. As the cycloalkenyl group, a substituted or unsubstituted cycloalkenyl group having 3 to 30 carbon atoms, i.e., a monovalent group obtained by removing one hydrogen atom from cycloalkene having 3 to 30 carbon atoms, e.g., a 2-cyclopenten-1-yl group and a 2-cyclohexen-1-yl group can be preferably exemplified. As the bicycloalkenyl group, a substituted or unsubstituted bicycloalkenyl group having 5 to 30 carbon atoms, i.e., a monovalent group obtained by removing one hydrogen atom from bicycloalkene having one double bond, e.g., a bicycle[2,2,1]-hepto-2-en-1-yl group and a bicycle[2,2,2]octo-2-en-4-yl group can be preferably exemplified.

As the alkynyl group represented by G, $R_{13}$ and $R_{14}$, preferably a substituted or unsubstituted alkynyl group having 2 to 30 carbon atoms, e.g., an ethynyl group, a propargyl group, and a trimethylsilylethynyl group can be exemplified.

As the aralkyl group represented by G, $R_{13}$ and $R_{14}$, a substituted or unsubstituted aralkyl group can be exemplified, and as the substituted or unsubstituted aralkyl group, an aralkyl group having 7 to 30 carbon atoms is preferred, and, e.g., a benzyl group and a 2-phenethyl group can be exemplified.

As the aryl group represented by G, $R_{13}$ and $R_{14}$, preferably a substituted or unsubstituted aryl group having 6 to 30 carbon atoms, e.g., a phenyl group, a p-tolyl group, a naphthyl group, an m-chlorophenyl group, and an o-hexadecanoylaminophenyl group can be exemplified.

As the heterocyclic group represented by G, $R_{13}$ and $R_{14}$, preferably a monovalent group obtained by removing one hydrogen atom from a 5- or 6-membered, substituted or unsubstituted, aromatic or non-aromatic heterocyclic compound, and more preferably a 5- or 6-membered aromatic heterocyclic group having 3 to 30 carbon atoms, e.g., a 2-furyl group, a 2-thienyl group, a 2-pyrimidinyl group, and a 2-benzothiazolyl group can be exemplified.

As the carbamoyl group represented by G, $R_{13}$ and $R_{14}$, preferably a substituted or unsubstituted carbamoyl group having 1 to 30 carbon atoms, e.g., a carbamoyl group, an N-methylcarbamoyl group, an N,N-dimethylcarbamoyl group, an N,N-di-n-octylcarbamoyl group, and an N-(methylsulfonyl)carbamoyl group can be exemplified.

As the alkoxycarbonyl group represented by G, $R_{13}$ and $R_{14}$, preferably a substituted or unsubstituted alkoxycarbonyl group having 2 to 30 carbon atoms, e.g., a methoxycarbonyl group, an ethoxycarbonyl group, a t-butoxycarbonyl group, and an n-octadecyloxycarbonyl group can be exemplified.

As the aryloxycarbonyl group represented by G, $R_{13}$ and $R_{14}$, preferably a substituted or unsubstituted aryloxycarbonyl group having 7 to 30 carbon atoms, e.g., a phenoxycarbony group, an o-chlorophenoxycarbonyl group, an m-nitrophenoxycarbonyl group, and a p-t-butylphenoxycarbonyl group can be exemplified.

As the acyl group represented by G, $R_{13}$ and $R_{14}$, preferably a formyl group, a substituted or unsubstituted alkylcarbonyl group having 2 to 30 carbon atoms, a substituted or unsubstituted arylcarbonyl group having 7 to 30 carbon atoms, and a substituted or unsubstituted heterocyclic carbonyl group having 2 to 30 carbon atoms being bonded to a carbonyl group via a carbon atom, e.g., an acetyl group, a pivaloyl group, a 2-chloroacetyl group, a stearoyl group, a benzoyl group, a p-n-octyloxyphenylcarbonyl group, a 2-pyridylcarbonyl group, and a 2-furylcarbonyl group can be exemplified.

As the alkoxy group represented by G, $R_{13}$ and $R_{14}$, preferably a substituted or unsubstituted alkoxy group having 1 to 30 carbon atoms, e.g., a methoxy group, an ethoxy group, an isopropoxy group, a t-butoxy group, an n-octyloxy group, and a 2-methoxyethoxy group can be exemplified.

As the aryloxy group represented by G, $R_{13}$ and $R_{14}$, preferably a substituted or unsubstituted aryloxy group having 6 to 30 carbon atoms, e.g., a phenoxy group, a 2-methylphenoxy group, a 4-t-butylphenoxy group, a 3-nitrophenoxy group, and a 2-tetradecanoylaminophenoxy group can be exemplified.

As the silyloxy group represented by G, $R_{13}$ and $R_{14}$, preferably a substituted or unsubstituted silyloxy group having 0 to 20 carbon atoms, e.g., a trimethylsilyloxy group and a diphenylmethylsilyloxy group can be exemplified.

As the acyloxy group represented by G, $R_{13}$ and $R_{14}$, preferably a formyloxy group, a substituted or unsubstituted alkylcarbonyloxy group having 2 to 30 carbon atoms, and a substituted or unsubstituted arylcarbonyloxy group having 6 to 30 carbon atoms, e.g., an acetyloxy group, a pivaloyloxy group, a stearoyloxy group, a benzoyloxy group, and a p-methoxyphenylcarbonyloxy group can be exemplified.

As the carbamoyloxy group represented by G, $R_{13}$ and $R_{14}$, preferably a substituted or unsubstituted carbamoyloxy group having 1 to 30 carbon atoms, e.g., an N,N-dimethylcarbamoyloxy group, an N,N-diethylcarbamoyloxy group, a morpholinocarbonyloxy group, an N,N-di-n-octylaminocarbonyloxy group, and an N-n-octylcarbamoyloxy group can be exemplified.

As the heterocyclic oxy group represented by G, $R_{13}$ and $R_{14}$, preferably a substituted or unsubstituted heterocyclic oxy group having 2 to 30 carbon atoms, e.g., a 1-phenyltetrazol-5-oxy group and a 2-tetrahydropyranyloxy group can be exemplified.

As the alkoxycarbonyloxy group represented by G, $R_{13}$ and $R_{14}$, preferably a substituted or unsubstituted alkoxycarbonyloxy group having 2 to 30 carbon atoms, e.g., a methoxycarbonyloxy group, an ethoxycarbonyloxy group, a t-butoxycarbonyloxy group, and n-octylcarbonyloxy group can be exemplified.

As the aryloxycarbonyloxy group represented by G, $R_{13}$ and $R_{14}$, preferably a substituted or unsubstituted aryloxycarbonyloxy group having 7 to 30 carbon atoms, e.g., a phenoxycarbonyloxy group, a p-methoxyphenoxycarbonyloxy group, and a p-n-hexadecyloxyphenoxycarbonyloxy group can be exemplified.

In the amino group represented by G, $R_{13}$ and $R_{14}$ are included an alkylamino group, an arylamino group and a heterocyclic amino group, and preferably an amino group, a substituted or unsubstituted alkylamino group having 1 to 30 carbon atoms, and a substituted or unsubstituted anilino group having 6 to 30 carbon atoms, e.g., a methylamino group, a dimethylamino group, an anilino group, an N-methylanilino group, and a diphenylamino group can be exemplified.

As the acylamino group represented by G, $R_{13}$ and $R_{14}$, preferably a formylamino group, a substituted or unsubstituted alkylcarbonylamino group having 1 to 30 carbon atoms, and a substituted or unsubstituted arylcarbonylamino group having 6 to 30 carbon atoms, e.g., an acetylamino group, a pivaloylamino group, a lauroylamino group, a benzoylamino group, and a 3,4,5-tri-n-octyloxyphenylcarbonylamino group can be exemplified.

As the sulfamoylamino group represented by G, $R_{13}$ and $R_{14}$, preferably a substituted or unsubstituted sulfamoylamino group having 0 to 30 carbon atoms, e.g., a sulfamoylamino group, an N,N-dimethylaminosulfonylamino group, and an N-n-octylaminosulfonylamino group can be exemplified.

As the alkoxycarbonylamino group represented by G, $R_{13}$ and $R_{14}$, preferably a substituted or unsubstituted alkoxycarbonylamino group having 2 to 30 carbon atoms, e.g., a methoxycarbonylamino group, an ethoxycarbonylamino group, a t-butoxycarbonylamino group, an n-octadecyloxycarbonylamino group, and an N-methylmethoxycarbonylamino group can be exemplified.

As the aryloxycarbonylamino group represented by G, $R_{13}$ and $R_{14}$, preferably a substituted or unsubstituted aryloxycarbonylamino group having 7 to 30 carbon atoms, e.g., a phenoxycarbonylamino group, a p-chlorophenoxycarbonylamino group, and an m-n-octyloxyphenoxycarbonylamino group can be exemplified.

As the alkylsulfonylamino or arylsulfonylamino group represented by G, $R_{13}$ and $R_{14}$, preferably a substituted or unsubstituted alkylsulfonylamino group having 1 to 30 carbon atoms, and a substituted or unsubstituted arylsulfonylamino group having 6 to 30 carbon atoms, e.g., a methylsulfonylamino group, a butylsulfonylamino group, a phenylsulfonylamino group, a 2,3,5-trichlorophenylsulfonylamino group, and a p-methylphenylsulfonylamino group can be exemplified.

As the alkylthio group represented by G, $R_{13}$ and $R_{14}$, preferably a substituted or unsubstituted alkylthio group having 1 to 30 carbon atoms, e.g., a methylthio group, an ethylthio group, and an n-hexadecylthio group can be exemplified.

As the arylthio group represented by G, $R_{13}$ and $R_{14}$, preferably a substituted or unsubstituted arylthio group having 6 to 30 carbon atoms, e.g., a phenylthio group, a p-chlorophenylthio group, and an m-methoxyphenylthio group can be exemplified.

As the alkylsulfonyl or arylsulfonyl group represented by G, $R_{13}$ and $R_{14}$, preferably a substituted or unsubstituted alkylsulfonyl group having 1 to 30 carbon atoms, and a substituted or unsubstituted arylsulfonyl group having 6 to 30 carbon atoms, e.g., a methylsulfonyl group, an ethylsulfonyl group, a phenylsulfonyl group, and a p-methylphenylsulfonyl group can be exemplified.

As the alkylsulfinyl or arylsulfinyl group represented by G, $R_{13}$ and $R_{14}$, preferably a substituted or unsubstituted alkylsulfinyl group having 1 to 30 carbon atoms, and a substituted or unsubstituted arylsulfinyl group having 6 to 30 carbon atoms, e.g., a methylsulfinyl group, an ethylsulfinyl group, a phenylsulfinyl group, and a p-methylphenylsulfinyl group can be exemplified.

As the sulfamoyl group represented by G, $R_{13}$ and $R_{14}$, preferably a substituted or unsubstituted sulfamoyl group having 0 to 30 carbon atoms, e.g., an N-ethylsulfamoyl group, an N-(3-dodecyloxypropyl)sulfamoyl group, an N,N-dimethylsulfamoyl group, an N-acetylsulfamoyl group, an N-benzoylsulfamoyl group, and an N—(N'-phenylcarbamoyl)sulfamoyl group can be exemplified.

As the heterocyclic thio group represented by G, $R_{13}$ and $R_{14}$, preferably a substituted or unsubstituted heterocyclic thio group having 2 to 30 carbon atoms, e.g., a 2-benzothiazolylthio group, a 1-phenyltetrazol-5-ylthio group can be exemplified.

G preferably represents a hydrogen atom, a halogen atom, an alkyl group, an alkenyl group, an alkynyl group, an aralkyl group, an aryl group, a hydroxyl group, an alkoxy group, an aryloxy group, an acyloxy group, a heterocyclic oxy group, an amino group substituted with an alkyl group or aryl group or heterocyclic group, an acylamino group, a ureido group, a sulfamoylamino group, an alkoxycarbonylamino group, an aryloxycarbonylamino group, an alkylsulfonylamino group, an arylsulfonylamino group, an alkylthio group, an arylthio group, a heterocyclic thio group, or an ionic hydrophilic group. Each of these groups may further be substituted.

G more preferably represents a hydrogen atom, a halogen atom, an alkyl group, a hydroxyl group, an alkoxy group, an aryloxy group, an acyloxy group, an amino group substituted with an alkyl group or aryl group or heterocyclic group, or an acylamino group. G especially preferably represents a hydrogen atom, an amino group substituted with an aryl group (preferably a phenyl group) or a heterocyclic group, or an acylamino group. G most preferably represents an amino group substituted with an aryl group having a substituent (as the substituent, a halogen atom, an alkyl group (preferably an alkyl group having 1 to 4 carbon atoms), an alkoxy group, and an ionic hydrophilic group are exemplified, and when the aryl group has two or more substituents, these substituents may be bonded to each other to form a ring).

Each of $R_{13}$ and $R_{14}$ independently preferably represents a hydrogen atom, an alkyl group, a cyano group, a carboxyl group, a carbamoyl group, or an alkoxycarbonyl group. Each group may further be substituted. Each of $R_{13}$ and $R_{14}$ more preferably represents a hydrogen atom, an alkyl group, a cyano group, or a carboxyl group. Still more preferably $R_{13}$ represents a hydrogen atom, and $R_{14}$ represents an alkyl group, and most preferably $R_{13}$ represents a hydrogen atom, and $R_{14}$ represents a methyl group.

As the compound represented by formula (M-1), especially preferred combinations are the following (i) to (iv).

(i) The examples of preferred hetero rings represented by A include a pyrazole ring, an imidazole ring, a triazole ring, a thiazole ring, an isothiazole ring, a thiadiazole ring, a benzothiazole ring, a benzoxazole ring, and a benzisothiazole ring, more preferred examples include a pyrazole ring, an imidazole ring, a triazole ring, a thiazole ring, an isothiazole ring, and a thiadiazole ring. Of the above, a pyrazole ring, a triazole ring, a thiazole ring, an isothiazole ring, and a thiadiazole ring are preferred, and a pyrazole ring is most preferred.

(ii) The case where each of $B_1$ and $B_2$ represents —$CR_{13}$= or —$CR_{14}$= is preferred, the case where $R_{13}$ represents a hydrogen atom ($B_1$ is an unsubstituted carbon atom), and $R_{14}$ represents a hydrogen atom or an alkyl group ($B_2$ is an unsubstituted carbon atom or a carbon atom substituted with an alkyl group) is more preferred, and the case where $R_{13}$ represents a hydrogen atom ($B_1$ is an unsubstituted carbon atom), and $R_{14}$ represents a methyl group ($B_2$ is a carbon atom substituted with a methyl group) is most preferred.

(iii) Each of $R_{11}$ and $R_{12}$ independently preferably represents a hydrogen atom, a substituted or unsubstituted cycloalkyl group, a substituted or unsubstituted aryl group, a substituted or unsubstituted heterocyclic group, a substituted or unsubstituted acyl group, a substituted or unsubstituted alkylsulfonyl group, or a substituted or unsubstituted arylsulfonyl group, each more preferably represents a hydrogen atom, a substituted aryl group, or a substituted heterocyclic group, still more preferably a substituted aryl group or a substituted heterocyclic group, still further preferably an aryl group substituted with a sulfo group, or a heterocyclic group substituted with a sulfo group, and especially preferably a phenyl group substituted with a sulfo group, or a benzothiazole group substituted with a sulfo group.

(iv) Preferred examples of G include a hydrogen atom, a halogen atom, an alkyl group, an alkenyl group, an alkynyl group, an aralkyl group, an aryl group, a hydroxyl group, an alkoxy group, an aryloxy group, an acyloxy group, a heterocyclic oxy group, an amino group substituted with an alkyl group or aryl group or heterocyclic group, an acylamino group, a ureido group, a sulfamoylamino group, an alkoxycarbonylamino group, an aryloxycarbonylamino group, an alkylsulfonylamino group, an arylsulfonylamino group, an alkylthio group, an arylthio group, a heterocyclic thio group, or an ionic hydrophilic group, more preferred examples include a hydrogen atom, a halogen atom, an alkyl group, a hydroxyl group, an alkoxy group, an aryloxy group, an acyloxy group, an amino group substituted with an alkyl group or aryl group or heterocyclic group, and an acylamino group, especially preferred are a hydrogen atom, an amino group substituted with an aryl group or a heterocyclic group, and an acylamino group, still further preferred is an amino group substituted with an aryl group having a substituent, and most preferred is an amino group substituted with a phenyl group having a substituent (e.g., an ethyl group, an isopropyl group or a sulfo group).

As for preferred combination of the substituents of the compound represented by formula (M-1), a compound in which at least one of various substituents is the above preferred group is preferred, a compound in which various substituents are the above preferred groups is more preferred, and a compound in which all the substituents are the above preferred groups is most preferred.

In the invention, the compound represented by formula (M-1) is preferably represented by the following formula (M-2).

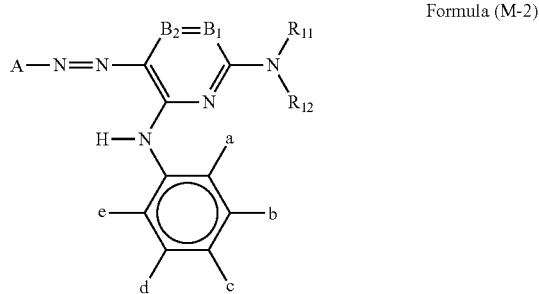

Formula (M-2)

In formula (M-2), A, $B_1$, $B_2$, $R_{11}$ and $R_{12}$ have the same meaning with A, $B_1$, $B_2$, $R_{11}$ and $R_{12}$ in formula (M-1), respectively.

Each of a and e independently represents an alkyl group, an alkoxy group or a halogen atom. When both a and e represent an alkyl group, the sum total of number of carbon atoms constituting the alkyl groups is 3 or more, and they may be further substituted.

Each of b, c and d independently has the same meaning with $R_{11}$ and $R_{12}$, and a and b, or e and d, may be bonded to each other to form a ring, provided that formula (M-2) has at least one ionic hydrophilic group.

In formula (M-2), A has the same meaning with A in formula (M-1) and preferred examples are also the same.

$B_1$ and $B_2$ have the same meaning with $B_1$ and $B_2$ in formula (M-1) and preferred examples are also the same.

$R_{11}$ and $R_{12}$ have the same meaning with $R_{11}$ and $R_{12}$ in formula (M-1) and preferred examples are also the same.

Each of a and e independently represents an alkyl group, an alkoxy group or a halogen atom. When both a and e represent an alkyl group, the sum total of number of carbon atoms constituting the alkyl groups is 3 or more, and they may be further substituted.

Preferably, each of a and e independently represents a methyl group, an ethyl group, or an isopropyl group, more preferably an ethyl group or an isopropyl group, and most preferably a=e=ethyl group or isopropyl group.

Each of b, c and d independently has the same meaning with $R_{13}$ and $R_{14}$ in formula (M-1), and a and b, or e and d, may be bonded to each other to form a ring, provided that formula (M-2) has at least one ionic hydrophilic group.

More preferably, c represents a hydrogen atom or an alkyl group, and especially preferably a hydrogen atom or a methyl group.

Each of b and d preferably represents a hydrogen atom or an ionic hydrophilic group, more preferably a hydrogen atom, a sulfo group or a carboxyl group, and especially preferably the combination of b and d is a hydrogen atom and a sulfo group.

As the compound represented by formula (M-2), especially preferred combinations are the following (i) to (iv).

(i) The meaning of the hetero ring of A is the same with A in formula (M-1) and preferred examples are also the same.

(ii) Each of $B_1$ and $B_2$ has the same meaning with $B_1$ and $B_2$ in formula (M-1) and preferred examples are also the same.

(iii) Each of $R_{11}$ and $R_{12}$ has the same meaning with $R_{11}$ and $R_{12}$ in formula (M-1) and preferred examples are also the same.

(iv) Each of a and e preferably represents an alkyl group or a halogen atom. When both a and e represent an alkyl group, the alkyl group is an unsubstituted alkyl group, and the sum total of the carbon atom number of a and e is 3 or more (preferably 5 or less). The case in which each of a, b, c and d represents a hydrogen atom, a halogen atom, an alkyl group, or an ionic hydrophilic group (preferably each is a hydrogen atom, an alkyl group having 1 to 4 carbon atoms, an ionic hydrophilic group) is preferred. More preferably, each of a and e independently represents a methyl group, an ethyl group, or an isopropyl group, still more preferably an ethyl group or an isopropyl group, and most preferably a=e=ethyl group or isopropyl group. Further, c preferably represents a hydrogen atom or an alkyl group, and especially preferably a hydrogen atom or a methyl group. Each of b and d preferably represents a hydrogen atom or an ionic hydrophilic group, especially preferably a hydrogen atom, a sulfo group or a carboxyl group, and most preferably the combination of b and d is a hydrogen atom and a sulfo group.

As for preferred combination of the substituents of the compound represented by formula (M-2), a compound in which at least one of various substituents is the above preferred group is preferred, a compound in which various substituents are the above preferred groups is more preferred, and a compound in which all the substituents are the above preferred groups is most preferred.

In the invention, the compound represented by formula (M-2) is preferably represented by the following formula (M-3).

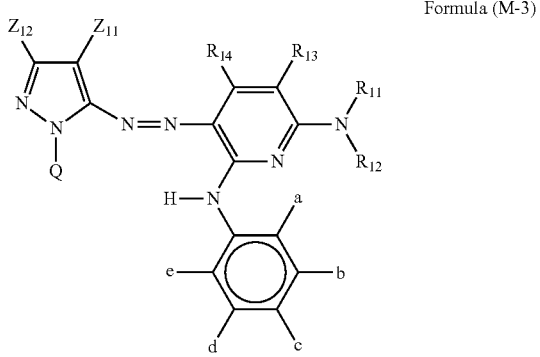

Formula (M-3)

In formula (M-3), $Z_{11}$ represents an electron-withdrawing group having a Hammett's substituent constant σp value of 0.2 or more. $Z_{12}$ represents a hydrogen atom, an alkyl group, an alkenyl group, an alkynyl group, an aralkyl group, an aromatic group, a heterocyclic group, or an acyl group. Each of $R_{11}$, $R_{12}$, a, b, c, d and e is the same with the case in formula (M-2). $R_{13}$ and $R_{14}$ have the same meaning with $R_{11}$ and $R_{12}$ in formula (M-2). Q represents a hydrogen atom, an alkyl group, an alkenyl group, an alkynyl group, an aralkyl group, an aromatic group, or a heterocyclic group. Each group represented by $Z_{11}$, $Z_{12}$ and Q may further have a substituent, provided that formula (M-3) has at least one ionic hydrophilic group.

In formula (M-3), A has the same meaning with A in formula (M-1) and preferred examples are also the same.

$R_{13}$ and $R_{14}$ have the same meaning with $R_{13}$ and $R_{14}$ in formula (M-1) and preferred examples are also the same.

$R_{11}$ and $R_{12}$ have the same meaning with $R_{11}$ and $R_{12}$ in formula (M-1) and preferred examples are also the same.

a, b, c, d and e respectively have the same meaning with a, b, c, d and e in formula (M-2) and preferred examples are also the same.

In formula (M-3), the electron-withdrawing group represented by of $Z_{11}$ is an electron-withdrawing group having a Hammett's substituent constant σp value of 0.2 or more, and preferably 0.3 or more. The least upper bound of the σp value is preferably 1 or less.

The specific examples of electron-withdrawing groups having σp value of 0.2 or more include an acyl group, an acyloxy group, a carbamoyl group, an alkyloxycarbonyl group, an aryloxycarbonyl group, a cyano group, a nitro group, a dialkylphosphono group, a diarylphosphono group, a diarylphosphinyl group, an alkylsulfinyl group, an arylsulfinyl group, an alkylsulfonyl group, an arylsulfonyl group, a sulfonyloxy group, an acylthio group, a sulfamoyl group, a thiocyanate group, a thiocarbonyl group, a halogenated alkyl group, a halogenated alkoxy group, a halogenated aryloxy group, a halogenated alkylamino group, a halogenated alkylthio group, a heterocyclic group, a halogen atom, an azo group, a selenocyanate group, and an aryl group substituted with other electron-withdrawing group having σp value of 0.2 or more.

$Z_{11}$ preferably represents a cyano group, an alkylsulfonyl group, an arylsulfonyl group, a nitro group, or a halogen atom, more preferably a cyano group, an alkylsulfonyl group, or an arylsulfonyl group, and most preferably a cyano group.

$Z_{12}$ preferably represents a hydrogen atom, an alkyl group, a cycloalkyl group, an aralkyl group, an aryl group, a heterocyclic group, or an acyl group, and more preferably an alkyl group. Each substituent may further be substituted.

More specifically, in the alkyl group represented by $Z_{12}$ are included an alkyl group having a substituent and an unsubstituted alkyl group. The alkyl group is preferably an alkyl group having 1 to 12 carbon atoms exclusive of the carbon atoms of the substituent, and more preferably an alkyl group having 1 to 6 carbon atoms.

The examples of the substituents of $Z_{12}$ include a hydroxyl group, an alkoxy group, a cyano group, a halogen atom, and an ionic hydrophilic group.

The examples of the alkyl groups represented by $Z_{12}$ include a methyl group, an ethyl group, a butyl group, an isopropyl group, a t-butyl group, a hydroxyethyl group, a methoxyethyl group, a cyanoethyl group, a trifluoromethyl group, a 3-sulfopropyl group, and a 4-sulfobutyl group, preferably a methyl group, an ethyl group, an isopropyl group, and a t-butyl group, especially preferably an isopropyl group and a t-butyl group, and most preferably a t-butyl group.

In the cycloalkyl group represented by $Z_{12}$ are included a cycloalkyl group having a substituent and an unsubstituted cycloalkyl group. The cycloalkyl group is preferably a cycloalkyl group having 5 to 12 carbon atoms exclusive of the carbon atoms of the substituent. The examples of substituents include an ionic hydrophilic group. The examples of the cycloalkyl groups include a cyclohexyl group.

In the aralkyl group represented by $Z_{12}$ are included an aralkyl group having a substituent and an unsubstituted aralkyl group. The aralkyl group is preferably an aralkyl group having 7 to 12 carbon atoms exclusive of the carbon atoms of the substituent. The examples of substituents include an ionic hydrophilic group. The examples of the aralkyl groups include a benzyl group and a 2-phenethyl group.

In the aryl group represented by $Z_{12}$ are included an aryl group having a substituent and an unsubstituted aryl group. The aryl group is preferably an aryl group having 6 to 12 carbon atoms exclusive of the carbon atoms of the substituent. The examples of substituents include an alkyl group, an alkoxy group, a halogen atom, an alkylamino group, an amido group, a carbamoyl group, a sulfamoyl group, a sulfonamide group, a hydroxyl group, an ester group, and an ionic hydrophilic group. The examples of the aryl groups include a phenyl group, a p-tolyl group, a p-methoxyphenyl group, an o-chlorophenyl group, and an m-(3-sulfopropylamino)phenyl group.

In the heterocyclic group represented by $Z_{12}$ are included a heterocyclic group having a substituent and an unsubstituted heterocyclic group. The heterocyclic group is preferably a 5- or 6-membered heterocyclic group. The examples of substituents include an amido group, a carbamoyl group, a sulfamoyl group, a sulfonamide group, a hydroxyl group, an ester group, and an ionic hydrophilic group. The examples of the heterocyclic groups include a 2-pyridyl group, a 2-thienyl group, a 2-thiazolyl group, a 2-benzothiazolyl group, and a 2-furyl group.

In the acyl group represented by $Z_{12}$ are included an acyl group having a substituent and an unsubstituted acyl group. The acyl group is preferably an acyl group having 1 to 12 carbon atoms exclusive of the carbon atoms of the substituent. The examples of substituents include an ionic hydrophilic group. The examples of the acyl groups include an acetyl group and a benzoyl group.

In formula (M-3), Q represents a hydrogen atom, an alkyl group, an alkenyl group, an alkynyl group, an aralkyl group, an aromatic group, or a heterocyclic group. Each of these substituents may further be substituted. The details of these substituents are the same with the case of $R_{13}$ and $R_{14}$.

Q preferably represents an aryl group or a heterocyclic group each substituted with an electron-withdrawing group. The electron-withdrawing group of the substituent of Q is an electron-withdrawing group having a Hammett's substituent constant σp value of 0.2 or more, and preferably 0.3 or more. The least upper bound of the σp value is preferably 1 or less.

The specific examples of the electron-withdrawing groups having a Hammett's substituent constant σp value of 0.2 or more are the same as described in $Z_{11}$ in formula (M-3).

In further detail, Q preferably represents a heterocyclic group substituted with an electron-withdrawing group, more preferably represents a benzoxazole ring or a benzothiazole ring substituted with a sulfo group, a substituted or unsubstituted carbamoyl group, or a substituted or unsubstituted sulfamoyl group, and especially preferably a benzothiazole ring substituted with a sulfo group or a substituted sulfamoyl group.

As the compound represented by formula (M-3), especially preferred combinations are the following (i) to (vi).

(i) $Z_{11}$ is an electron-withdrawing group having a Hammett's substituent constant σp value of 0.2 or more, and preferably 0.3 or more. The least upper bound of the σp value is preferably 1 or less. $Z_{11}$ more preferably represents a cyano group, an alkylsulfonyl group, an arylsulfonyl group, a nitro group, or a halogen atom, still more preferably a cyano group, an alkylsulfonyl group, or an arylsulfonyl group, and most preferably a cyano group.

(ii) $Z_{12}$ preferably represents a hydrogen atom, an alkyl group, a cycloalkyl group, an aralkyl group, an aryl group, a heterocyclic group, or an acyl group, and more preferably an alkyl group. Each substituent may further be substituted. In further detail, in the alkyl group represented by $Z_{12}$ are included an alkyl group having a substituent and an unsubstituted alkyl group. The alkyl group is preferably an alkyl group having 1 to 12 carbon atoms exclusive of the carbon atoms of the substituent, and more preferably an alkyl group having 1 to 6 carbon atoms. The examples of the substituents of $Z_{12}$ include a hydroxyl group, an alkoxy group, a cyano group, a halogen atom, and an ionic hydrophilic group. The examples of the alkyl groups represented by $Z_{12}$ include preferably a methyl group, an ethyl group, a butyl group, an isopropyl group, a t-butyl group, a hydroxyethyl group, a methoxyethyl group, a cyanoethyl group, a trifluoromethyl group, a 3-sulfopropyl group, and a 4-sulfobutyl group, especially preferably an isopropyl group and a t-butyl group, and most preferably a t-butyl group.

(iii) Q represents a hydrogen atom, an alkyl group, an alkenyl group, an alkynyl group, an aralkyl group, an aromatic group, or a heterocyclic group. These substituents may further be substituted. Further, Q preferably represents an aryl group or a heterocyclic group each substituted with an electron-withdrawing group. The electron-withdrawing group of the substituent of Q is an electron-withdrawing group having a Hammett's substituent constant σp value of 0.2 or more, and preferably 0.3 or more. The least upper bound of the σp value is preferably 1 or less. In more detail, Q preferably represents a heterocyclic group substituted with an electron-withdrawing group, more preferably represents a benzoxazole ring or a benzothiazole ring substituted with a sulfo group, a substituted or unsubstituted carbamoyl group, or a substituted or unsubstituted sulfamoyl group, and especially preferably a benzothiazole ring substituted with a sulfo group or a substituted sulfamoyl group.

(iv) a, b, c, d and e respectively have the same meaning with a, b, c, d and e in formula (M-2) and preferred examples are also the same.

(v) $R_{13}$ and $R_{14}$ have the same meaning with $R_{13}$ and $R_{14}$ in formula (M-2) and preferred examples are also the same.

(vi) $R_{11}$ and $R_{12}$ have the same meaning with $R_{11}$ and $R_{12}$ in formula (M-2) and preferred examples are also the same.

As for preferred combination of the substituents of the compound represented by formula (M-3), a compound in which at least one of various substituents is the above preferred group is preferred, a compound in which various substituents are the above preferred groups is more preferred, and a compound in which all the substituents are the above preferred groups is most preferred.

The compound represented by any of formulae (M-1), (M-2) and (M-3) (azo dyestuff) has at least one (preferably 3 or more and 6 or less) ionic hydrophilic group in the molecule thereof.

A sulfo group, a carboxyl group, a phosphono group and a quaternary ammonium group are included in the ionic hydrophilic group. As the ionic hydrophilic group, a carboxyl group, a phosphono group and a sulfo group are preferred, and a carboxyl group and a sulfo group are especially preferred. In particular, it is most preferred that at least one is a sulfo group. The carboxyl group, phosphono group and sulfo group may take the form of a salt. The examples of counter ions for forming a salt include an ammonium ion, an alkali metal ion (e.g., a lithium ion, a sodium ion, a potassium ion), and an organic cation (e.g., a tetramethylammonium ion, a tetramethylguanidium ion, a tetramethylphosphonium ion). Of the counter ions, alkali metal salts are preferred. Of the alkali metal salts, a potassium ion, a sodium ion and a lithium ion are preferred, and a lithium ion is most preferred. For improving solubility and inhibiting bronzing in inkjet recording, it is most preferred to combine a sulfo group as the ionic hydrophilic group and a lithium ion as the counter ion.

It is preferred for the compound represented by any of formulae (M-1), (M-2) and (M-3) to have 3 or more and 6 or less ionic hydrophilic groups in the molecule thereof, to have 3 or more and 6 or less sulfo groups is more preferred, and to have 3 or more and 5 or less sulfo groups is still more preferred.

The magenta ink composition according to the invention contains as a colorant at least one of a compound represented by any of formulae (M-1), (M-2) and (M-3) and the salt thereof.

An ink set in the invention can contain, as a magenta ink composition, a dark magenta ink composition and a light magenta ink composition. When both a dark magenta ink composition and a light magenta ink composition are contained in an ink set, it is preferred that at least one of both compositions contains a compound of formula (M-1), (M-2) or (M-3), or the salt thereof as a colorant, and it is more preferred for the light magenta ink composition to contain a compound of formula (M-1), (M-2) or (M-3), or the salt thereof as a colorant. By improving the light fastness and ozone resistance of the light magenta ink composition, the light fastness and ozone resistance of the image of recorded matter at large can be increased. It is most preferred that both of the dark magenta ink composition and the light magenta ink composition contain a compound of formula (M-1), (M-2) or (M-3) or the salt thereof as a colorant.

In the ink set of the invention, the content of a magenta dye in a magenta ink composition can be optionally determined based on the color value of the compound of formula (M-1), (M-2) or (M-3) to be used (dye). When a magenta ink composition of one kind alone is contained in an ink set, the content of the compound of formula (M-1), (M-2) or (M-3) or the salt thereof in the magenta ink composition is generally preferably 2.0% by mass to 10% by mass. By making the content of the dye in the magenta ink composition 2.0% by mass or more, a sufficient color developing property as the ink can be obtained, while by making the content of the dye 10% by mass or less, it becomes easy to secure an ink ejecting property from the nozzle and prevent clogging of the ink nozzle as the ink composition used in an inkjet recording method.

When a dark magenta ink composition and a light magenta ink composition are contained in an ink set, the content of a colorant in the light magenta ink composition can be optionally determined based on the color value of the compound of formula (M-1), (M-2) or (M-3) (dye) for use as a colorant. The content of the compound of formula (M-1), (M-2) or (M-3) or the salt thereof in the light magenta ink composition is generally preferably 0.5% by mass to 3.5% by mass, and more preferably 1.0% by mass to 3.0% by mass. By making the content of the dye in the light magenta ink composition 0.5% by mass or more, a color developing property necessary as the light magenta ink composition can be obtained, while by making the content of the dye 3.5% by mass or less, the feeling of graininess in the image of the recorded matter recorded with the light magenta ink composition can be reduced or prevented.

Further, when a dark magenta ink composition and a light magenta ink composition are contained in an ink set, the content of a colorant in the dark magenta ink composition can be optionally determined based on the color value of the compound of formula (M-1), (M-2) or (M-3) (dye) for use as a colorant. The content of the compound of formula (M-1), (M-2) or (M-3) or the salt thereof in the dark magenta ink composition is generally preferably 3% by mass to 10% by mass. By making the content of the dye in the dark magenta ink composition 3% by mass or more, a color developing property necessary as the dark magenta ink composition can be obtained, while by making the content of the dye 10% by mass or less, the feeling of graininess in the image of the recorded matter recorded with the dark magenta ink composition can be reduced or prevented.

When a dark magenta ink composition and a light magenta ink composition are contained in an ink set, the ratio of the content (% by mass) of the colorant contained in the light magenta ink composition to the content (% by mass) of the colorant contained in the dark magenta ink composition is preferably in the range of ½ to ⅛. By constituting the contents of the colorants in this ratio, the feeling of graininess in the image recorded with these ink compositions can be reduced. Further, by the ink composition having the above ratio of the colorants and densities in the above ranges, good color balance can be realized between the dark magenta ink composition and the light magenta ink composition and, further, clogging of ink jet nozzles can be inhibited.

In an ink set in the invention, the content of colorants selected from the group consisting of the compound represented by formula (M-1), (M-2) or (M-3) and the salts thereof in a magenta ink composition, a dark magenta ink composition, or a light magenta ink composition is determined by the kinds of each substituent in formula (M-1), (M-2) or (M-3) and the kinds of solvents, but the total content of all the colorants contained in the ink composition, including at least one dye selected from the group consisting of the compound of formula (M-1), (M-2) or (M-3) and the salts thereof contained in the ink composition, is preferably 0.1% by mass to 10% by mass to the gross mass of the ink composition, and more preferably 0.5% by mass to 5% by mass. By making the content of the colorants in the ink composition 0.1% by mass or more, a color developing property or image density on a recording medium can be secured, while when by making it 10% by mass or less, adjustment of viscosity of the ink composition becomes easy, and ejection reliability and characteristics such as prevention of clogging and the like can be easily secured.

In a magenta ink composition, a dark magenta ink composition, or a light magenta ink composition in an ink set in the invention, besides the dyes selected from the group consisting of the compound of formula (M-1), (M-2) or (M-3) and the salts thereof, other magenta dyes can be used in combination. Magenta dyes which can be used in combination include C.I. Direct Red 2, 4, 9, 23, 26, 31, 39, 62, 63, 72, 75, 76, 79, 80, 81, 83, 84, 89, 92, 95, 111, 173, 184, 207, 211, 212, 214, 218, 221, 223, 224, 225, 226, 227, 232, 233, 240, 241, 242, 243, 247, C.I. Direct Violet 7, 9, 47, 48, 51, 66, 90, 93, 94, 95, 98, 100, 101, C.I. Acid Red 35, 42, 52, 57, 62, 80, 82, 111, 114, 118, 119, 127, 128, 131, 143, 151, 154, 158, 249, 254, 257, 261, 263, 266, 289, 299, 301, 305, 336, 337, 361, 396, 397, C.I. Acid Violet 5, 34, 43, 47, 48, 90, 103, 126, C.I. Reactive Red 3, 13, 17, 19, 21, 22, 23, 24, 29, 35, 37, 40, 41, 43, 45, 49, 55, C.I. Reactive Violet 1, 3, 4, 5, 6, 7, 8, 9, 16, 17, 22, 23, 24, 26, 27, 33, 34, C.I. Basic Red 12, 13, 14, 15, 18, 22, 23, 24, 25, 27, 29, 35, 36, 38, 39, 45, 46, C.I. Basic Violet 1, 2, 3, 7, 10, 15, 16, 20, 21, 25, 27, 28, 35, 37, 39, 40, 48 and the like. In addition, as coupling components (hereinafter referred to as coupler components), heteryl or arylazo dyes having hetero rings such as phenols, naphthols, anilines or pyrazine, or open chain-type active methylene compounds (the compound represented by the following formula (M-11)); azo methine dyes having, for example, open chain-type active methylene compounds as coupler components; and anthrapyridone dyes (the compound represented by the following formula (M-12)) (e.g., Compound No. 20 in Table 1 in U.S. Patent 2004/0,239, 739A1, and Compound (13) in WO 04/104108) are exemplified.

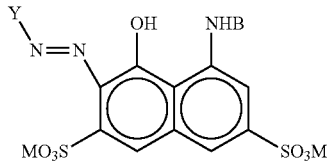

Formula (M-11)

In formula (M-11), Y represents an alkyl group having 1 to 4 carbon atoms, an alkoxy group, a phenyl group substituted with OH, SO₃H or COOM, or a naphthyl group; and B represents a hydrogen atom or the following formula:

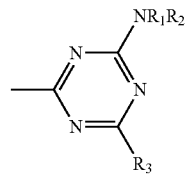

In the above formula, R¹ represents an alkyl group having 1 to 4 carbon atoms substituted with H, OH or COOH; R² represents an alkyl group having 1 to 4 carbon atoms substituted with OH, OCH₃, OC₂H₅, SO₃M or COOM; M represents H, Li, Na, K, ammonium, or organic amines; and R³ represents a substituent.

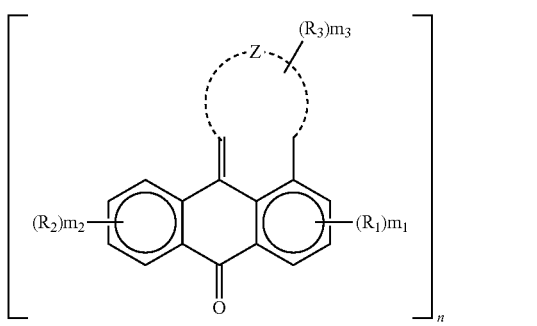

Formula (M-12)

In formula (M-12), Z represents a nonmetal atomic group necessary to form a nitrogen-containing 5- or 6-membered hetero ring; each of $R_1$, $R_2$ and $R_3$ independently represents a substituent, and each of these substituents may further have a substituent; $m_1$ represents an integer of 0 to 3, $m_2$ represents an integer of 0 to 4, $m_3$ represents an integer of 0 to 2, and there is no case where $m_1$, $m_2$ and $m_3$ represent 0 at the same time. When $m_1$ is 2 or more, two or more $R_1$ may be the same with or different from each other. When $m_2$ is 2 or more, two or more $R_2$ may be the same with or different from each other. When $m_3$ is 2 or more, two or more $R_3$ may be the same with or different from each other. n represents an integer of 1 to 4. When n is 2 or more, the other nucleus of the dye may form a dimer, a trimer or a tetramer via $R_1$, $R_2$ and $R_3$.

(Cyan)

Colorants used in the cyan ink composition constituting the ink set in the invention are described below.

In the ink set in the invention, the colorants used in a cyan ink composition are not limited to colorants having a specific structure, but it is preferred that the difference between the light fastness and ozone resistance of the ink compositions of other colors and the light fastness and ozone resistance of the cyan ink composition is small.

From the above aspect, a cyan dye to be used as a colorant in a cyan ink composition in the invention is preferably selected from the group consisting of a phthalocyanine compound represented by the following formula (C-1) and the salts thereof.

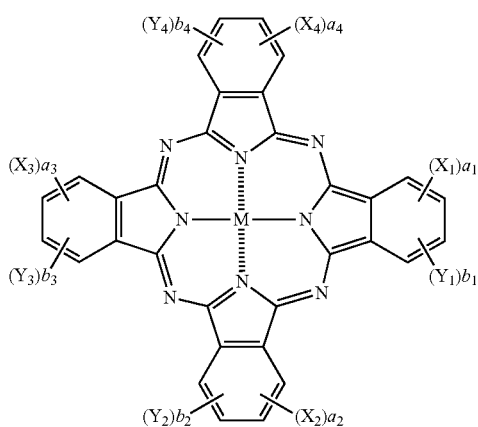

Formula (C-1)

In formula (C-1), each of $X_1$, $X_2$, $X_3$ and $X_4$ independently represents —SO—Z, —SO$_2$—Z, —SO$_2$NV$_1$V$_2$, —CO$_2$NV$_1$V$_2$, —CO$_2$Z, —CO—Z, or a sulfo group, wherein Z represents an alkyl group, a cycloalkyl group, an alkenyl group, an alkynyl group, an aralkyl group, an aryl group, or a heterocyclic group, and each group may further have a substituent; $V_1$ and $V_2$, which may be the same or different, and each represents a hydrogen atom, an alkyl group, a cycloalkyl group, an alkenyl group, an alkynyl group, an aralkyl group, an aryl group, or a heterocyclic group, and each group may further have a substituent; each of $Y_1$, $Y_2$, $Y_3$ and $Y_4$ independently represents a hydrogen atom, a halogen atom, an alkyl group, a cycloalkyl group, an alkenyl group, an aralkyl group, an aryl group, a heterocyclic group, a cyano group, a hydroxyl group, a nitro group, an amino group, an alkylamino group, an alkoxy group, an aryloxy group, an amido group, an arylamino group, a ureido group, a sulfamoylamino group, an alkylthio group, an arylthio group, an alkoxycarbonylamino group, a sulfonamido group, a carbamoyl group, a sulfamoyl group, an alkoxycarbonyl group, a heterocyclic oxy group, an azo group, an acyloxy group, a carbamoyloxy group, a silyloxy group, an aryloxycarbonyl group, an aryloxycarbonylamino group, an imido group, a heterocyclic thio group, a phosphoryl group, an acyl group, or an ionic hydrophilic group, and each of these groups may further have a substituent; each of $a_1$ to $a_4$ and $b_1$ to $b_4$ represents the number of substituents of $X_1$ to $X_4$ and $Y_1$ to $Y_4$ respectively, each of $a_1$ to $a_4$ independently represents an integer of 0 to 4, and all of $a_1$ to $a_4$ do not represent 0 at the same time, and each of $b_1$ to $b_4$ independently represents an integer of 0 to 4; M represents a hydrogen atom, a metal atom or an oxide thereof, a hydroxide, or a halide; provided that at least one of $X_1$, $X_2$, $X_3$, $X_4$, $Y_1$, $Y_2$, $Y_3$ and $Y_4$ is an ionic hydrophilic group or a group having an ionic hydrophilic group as a substituent.

Formula (C-1) will be described below.

Each of $a_1$, $a_2$, $a_3$ and $a_4$ preferably represents 0 or 1. Preferably, each of $a_1$, $a_2$, $a_3$ and $a_4$ is 0 or 1, two or more of $a_1$, $a_2$, $a_3$ and $a_4$ is 1 and, further, each of $b_1$, $b_2$, $b_3$ and $b_4$ is an integer such that the sum of $b_1$, $b_2$, $b_3$ and $b_4$ and $a_1$, $a_2$, $a_3$ and $a_4$ is 4 respectively.

Each of $X_1$, $X_2$, $X_3$ and $X_4$ independently represents —SO—Z, —SO$_2$—Z, —SO$_2$NV$_1$V$_2$, —CO$_2$NV$_1$V$_2$, —CO$_2$Z, —CO—Z, or a sulfo group.

Z represents an alkyl group, a cycloalkyl group, an alkenyl group, an alkynyl group, an aralkyl group, an aryl group, or a heterocyclic group, and each group may further have a substituent. Two or more Z may be the same or different.

Z preferably represents a substituted or unsubstituted alkyl group, a substituted or unsubstituted aryl group, or a substituted or unsubstituted heterocyclic group, more preferably a substituted alkyl group, a substituted aryl group, or a substituted heterocyclic group, and most preferably a substituted alkyl group.

$V_1$ and $V_2$, which may be the same or different, and each represents a hydrogen atom, an alkyl group, a cycloalkyl group, an alkenyl group, an alkynyl group, an aralkyl group, an aryl group, or a heterocyclic group, and each group may further have a substituent.

Each of $V_1$ and $V_2$ preferably represents a hydrogen atom, a substituted or unsubstituted alkyl group, a substituted or unsubstituted aryl group, or a substituted or unsubstituted heterocyclic group, and most preferably a hydrogen atom, a substituted alkyl group, a substituted aryl group, or a substituted heterocyclic group The examples of the substituents that Z, $V_1$ and $V_2$ may have include a halogen atom (e.g., a chlorine atom, a bromine atom); a straight chain or branched chain alkyl group having 1 to 12 carbon atoms, an aralkyl group having 7 to 18 carbon atoms, an alkenyl group having 2 to 12 carbon atoms, a straight chain or branched chain alkynyl group having 2 to 12 carbon atoms, a cycloalkyl group having 3 to 12 carbon atoms which may have a side chain, a cycloalkenyl group having 3 to 12 carbon atoms which may have a side chain (as these groups, e.g., a methyl group, an ethyl group, a propyl group, an isopropyl group, a t-butyl group, a 2-methanesulfonylethyl group, a 3-phenoxypropyl group, a trifluoromethyl group, a cyclopentyl group); an aryl group (e.g., a phenyl group, a 4-t-butylphenyl group, a 2,4-di-t-amylphenyl group); a heterocyclic group (e.g., an imidazolyl group, a pyrazolyl group, a triazolyl group, a 2-furyl group, a 2-thienyl group, a 2-pyrimidinyl group, a 2-benzothiazolyl group); an alkyloxy group (e.g., a methoxy group, an ethoxy group, a 2-methoxyethoxy group, a 2-methanesulfonylethoxy group); an aryloxy group (e.g., a phenoxy group, a 2-methylphenoxy group, a 4-t-butylphenoxy group, a 3-nitrophenoxy group, a 3-t-butyloxycarbamoylphenoxy group, a 3-methoxycarbamoyl group); an acylamino group e.g., an acetamido group, a benzamido group, a 4-(3-t-butyl-4-hydroxyphenoxy)butanamido group); an alkylamino group (e.g., a methylamino group, a butylamino group, a diethylamino group, a methylbutylamino group); an anilino group (e.g., a phenylamino group, a 2-chloroanilino group); a ureido group (e.g., a phenylureido group, a methylureido group, an N,N-dibutylureido group); a sulfamoylamino group (e.g., an N,N-dipropylsulfamoylamino group); an alkylthio group (e.g., a methylthio group, an octylthio group, a 2-phenoxyethylthio group); an arylthio group (e.g., a phenylthio group, a 2-butoxy-5-t-octylphenylthio group, a 2-carboxyphenylthio group); an alkyloxycarbonylamino group (e.g., a methoxycarbonylamino group); a sulfonamido group (e.g., a methanesulfonamido group, a benzenesulfonamido group, a p-toluenesulfonamido group, an octadecane group); a carbamoyl group (e.g., an N-ethylcarbamoyl group, an N,N-dibutylcarbamoyl group); a sulfamoyl group (e.g., an N-ethylsulfamoyl group, an N,N-dipropylsulfamoyl group, an N,N-diethylsulfamoyl group); a sulfonyl group (e.g., a methanesulfonyl group, an octanesulfonyl group, a benzenesulfonyl group, a toluenesulfonyl group); an alkyloxycarbonyl group (e.g., a methoxycarbonyl group, a butyloxycarbonyl group); a heterocyclic oxy group (e.g., a 1-phenyltetrazol-5-oxy group, a 2-tetrahydropyranyloxy group); an azo group (e.g., a phenylazo group, a 4-methoxyphenylazo group, a 4-pivaloylaminophenylazo group, a 2-hydroxy-4-propanoylphenylazo group); an acyloxy group (e.g., an acetoxy group); a carbamoyloxy group (e.g., an N-methylcarbamoyloxy group, an N-phenylcarbamoyloxy group); a silyloxy group (e.g., a trimethylsilyloxy group, a dibutylmethylsilyloxy group); an aryloxycarbonylamino group (e.g., a phenoxycarbonylamino group); an imido group (e.g., an N-succinimido group, an N-phthalimido group); a heterocyclic thio group (e.g., a 2-benzothiazolylthio group, a 2,4-diphenoxy-1,3,5-triazole-6-thio group, a 2-pyridylthio group); a sulfinyl group (e.g., a 3-phenoxypropylsulfinyl group); a phosphonyl group (e.g., a phenoxyphosphonyl group, an octyloxyphosphonyl group, a phenylphosphonyl group); an aryloxycarbonyl group (e.g., a phenoxycarbonyl group); an acyl group (e.g., an acetyl group, a 3-phenylpropanoyl group, a benzoyl group); an ionic hydrophilic group (e.g., a carboxyl group, a sulfo group, a quaternary ammonium group); a cyano group; a hydroxyl group; a nitro group; and an amino group.

The substituted or unsubstituted alkyl group represented by $Z$, $V_1$ and $V_2$ is preferably an alkyl group having 1 to 30 carbon atoms. A branched alkyl group is particularly preferred for the reason that solubility of dye and stability of ink can be increased, and the case of having asymmetric carbon atoms (use as racemate) is particularly preferred. In regard to the examples of substituents, the above exemplified substituents that $Z$, $V_1$ and $V_2$ may have can be used, and a hydroxyl group, an ether group, an ester group, a cyano group, an amino group, an amido group and a sulfonamido group are especially preferred for the reason of capable of increasing aggregation property of dye and improving fastness. In addition, $Z$, $V_1$ and $V_2$ may have halogen ions and ionic hydrophilic groups.

The substituted or unsubstituted cycloalkyl group represented by $Z$, $V_1$ and $V_2$ is preferably a cycloalkyl group having 5 to 30 carbon atoms. For the reason of capable of increasing solubility of dye and stability of ink, the case of having asymmetric carbon atoms (use as racemate) is particularly preferred. In regard to the examples of substituents, the above exemplified substituents that $Z$, $V_1$ and $V_2$ may have can be used, and a hydroxyl group, an ether group, an ester group, a cyano group, an amino group, an amido group and a sulfonamido group are especially preferred for the reason of capable of increasing aggregation property of dye and improving fastness. In addition, $Z$, $V_1$ and $V_2$ may have halogen ions and ionic hydrophilic groups.

The substituted or unsubstituted alkenyl group represented by $Z$, $V_1$ and $V_2$ is preferably an alkenyl group having 2 to 30 carbon atoms. A branched alkenyl group is particularly preferred for the reason that solubility of dye and stability of ink can be increased, and the case of having asymmetric carbon atoms (use as racemate) is particularly preferred. In regard to the examples of substituents, the above exemplified substituents that $Z$, $V_1$ and $V_2$ may have can be used, and a hydroxyl group, an ether group, an ester group, a cyano group, an amino group, an amido group and a sulfonamido group are especially preferred for the reason of capable of increasing aggregation property of dye and improving fastness. In addition, $Z$, $V_1$ and $V_2$ may have halogen ions and ionic hydrophilic groups.

The substituted or unsubstituted alkynyl group represented by $Z$, $V_1$ and $V_2$ is preferably an alkynyl group having 2 to 30 carbon atoms. A branched alkynyl group is particularly preferred for the reason that solubility of dye and stability of ink can be increased, and the case of having asymmetric carbon atoms (use as racemate) is particularly preferred. In regard to the examples of substituents, the above exemplified substituents that $Z$, $V_1$ and $V_2$ may have can be used, and a hydroxyl group, an ether group, an ester group, a cyano group, an amino group, an amido group and a sulfonamido group are especially preferred for the reason of capable of increasing aggregation property of dye and improving fastness. In addition, $Z$, $V_1$ and $V_2$ may have halogen ions and ionic hydrophilic groups.

The substituted or unsubstituted aralkyl group represented by $Z$, $V_1$ and $V_2$ is preferably an aralkyl group having 7 to 30 carbon atoms. A branched aralkyl group is particularly preferred for the reason that solubility of dye and stability of ink can be increased, and the case of having asymmetric carbon atoms (use as racemate) is particularly preferred. In regard to the examples of substituents, the above exemplified substituents that $Z$, $V_1$ and $V_2$ may have can be used, and a hydroxyl group, an ether group, an ester group, a cyano group, an amino group, an amido group and a sulfonamido group are especially preferred for the reason of capable of increasing aggregation property of dye and improving fastness. In addition, $Z$, $V_1$ and $V_2$ may have halogen ions and ionic hydrophilic groups.

The substituted or unsubstituted aryl group represented by $Z$, $V_1$ and $V_2$ is preferably an aryl group having 6 to 30 carbon atoms. In regard to the examples of substituents, the above exemplified substituents that $Z$, $V_1$ and $V_2$ may have can be used, and an electron-withdrawing group is especially preferred for the reason of capable of making oxidation potential of the dye nobler and improving fastness.

The heterocyclic group represented by Z, $V_1$ and $V_2$ is preferably a 5- or 6-membered ring, and the ring may further be condensed. The heterocyclic group may be an aromatic hetero ring or a non-aromatic hetero ring. The examples of the heterocyclic groups represented by Z, $V_1$ and $V_2$ are shown below in the form of hetero rings by omitting substitution positions. The substitution positions are not restricted. For example, pyridine can be substituted at 2-, 3- or 4-position. Specifically, pyridine, pyrazine, pyrimidine, pyridazine, triazine, quinoline, isoquinoline, quinazoline, cinnoline, phthalazine, quinoxaline, pyrrole, indole, furan, benzofuran, thiophene, benzothiophene, pyrazole, imidazole, benzimidazole, triazole, oxazole, benzoxazole, thiazole, benzothiazole, isothiazole, benzisothiazole, thiadiazole, isoxazole, benzisoxazole, pyrrolidine, piperidine, piperazine, imidazolidine, and thiazoline are exemplified as such hetero rings. Aromatic heterocyclic rings are preferred above all, and preferred examples thereof are shown below similarly to the above. Pyridine, pyrazine, pyrimidine, pyridazine, triazine, pyrazole, imidazole, benzimidazole, triazole, thiazole, benzothiazole, isothiazole, benzisothiazole, and thiadiazole are exemplified as aromatic hetero rings. These rings may have a substituent. As the examples of the substituents, the above exemplified substituents that Z, $V_1$ and $V_2$ may have can be exemplified. Preferred substituents and more preferred substituents are the same with preferred substituents of the aryl group and more preferred substituents of the aryl group respectively.

Each of $Y_1$, $Y_2$, $Y_3$ and $Y_4$ independently represents a hydrogen atom, a halogen atom, an alkyl group, a cycloalkyl group, an alkenyl group, an aralkyl group, an aryl group, a heterocyclic group, a cyano group, a hydroxyl group, a nitro group, an amino group, an alkylamino group, an alkoxy group, an aryloxy group, an amido group, an arylamino group, a ureido group, a sulfamoylamino group, an alkylthio group, an arylthio group, an alkoxycarbonylamino group, a sulfonamido group, a carbamoyl group, a sulfamoyl group, an alkoxycarbonyl group, a heterocyclic oxy group, an azo group, an acyloxy group, a carbamoyloxy group, a silyloxy group, an aryloxycarbonyl group, an aryloxycarbonylamino group, an imido group, a heterocyclic thio group, a phosphoryl group, an acyl group, or an ionic hydrophilic group, and each of these groups may further have a substituent.

Of the above groups, a hydrogen atom, a halogen atom, an alkyl group, an aryl group, a heterocyclic group, a cyano group, a hydroxyl group, a nitro group, a carbamoyl group, a sulfamoyl group, a sulfinyl group, a sulfonyl group, an alkoxycarbonyl group, an aryloxycarbonyl group, a phosphoryl group, an acyl group, or an ionic hydrophilic group are preferred, a hydrogen atom, a halogen atom, a cyano group, a hydroxyl group, a sulfamoyl group, a sulfinyl group, a sulfonyl group, or an ionic hydrophilic group are more preferred, and a hydrogen atom is most preferred.

Each of $Y_1$, $Y_2$, $Y_3$ and $Y_4$ may have a substituent, if possible. As the examples of the substituents, the above substituents that Z, $V_1$ and $V_2$ may have in formula (C-1) can be exemplified.

When a phthalocyanine dye of the invention is water-soluble, it is preferred for the phthalocyanine dye to have an ionic hydrophilic group. A sulfo group, a carboxyl group, a phosphono group and a quaternary ammonium group are included in the ionic hydrophilic group. As the ionic hydrophilic group, a carboxyl group, a phosphono group and a sulfo group are preferred, and a carboxyl group and a sulfo group are especially preferred. The carboxyl group, phosphono group and sulfo group may take the form of a salt. The examples of counter ions for forming a salt include an ammonium ion, an alkali metal ion (e.g., a lithium ion, a sodium ion, a potassium ion), and an organic cation (e.g., a tetramethylammonium ion, a tetramethylguanidium ion, a tetramethylphosphonium ion). Of the counter ions, alkali metal salts are preferred, and lithium salts are especially preferred for capable of heightening solubility of dye and improving stability of ink. The most preferred ionic hydrophilic group is a lithium salt of a sulfo group.

The number of the ionic hydrophilic groups to be contained is preferably at least two in one molecule of the phthalocyanine dye. It is especially preferred to have at least two sulfo groups and/or carboxyl groups.

In formula (C-1), M preferably represents a hydrogen atom, and as metal atoms, e.g., Li, Na, K, Mg, Ti, Zr, V, Nb, Ta, Cr, Mo, W, Mn, Fe, Co, Ni, Ru, Rh, Pd, Os, Ir, Pt, Cu, Ag, Au, Zn, Cd, Hg, Al, Ga, In, Si, Ge, Sn, Pb, Sb, and Bi are exemplified. As oxides, VO and GeO are exemplified. As hydroxides, $Si(OH)_2$, $Cr(OH)_2$ and $Sn(OH)_2$ are exemplified. As halides, AlCl, $SiCl_2$, VCl, $VCl_2$, VOCl, FeCl, GaCl and ZrCl are exemplified. Cu, Ni, Zn and Al are especially preferred as M, and Cu is most preferred.

Pc (phthalocyanine ring) may form a dimer (e.g., Pc-M-L-M-Pc) or a trimer through a divalent linking group L, and M at that time may be the same or different.

The divalent linking group represented by L is preferably an oxy group —O—, a thio group —S—, a carbonyl group —CO—, a sulfonyl group —$SO_2$—, an imino group —NH—, a methylene group —$CH_2$—, or a group formed by combining these groups.

As the chemical structure of the phthalocyanine dye in the invention, it is especially preferred to introduce an electron-withdrawing group, such as a sulfinyl group (—SO—Z), a sulfonyl group (—$SO_2$—Z), a sulfamoyl group (—$SO_2NV_1V_2$), a carbamoyl group (—$CONV_1V_2$), an alkoxycarbonyl group, an aryloxycarbonyl group, a heterocyclic oxycarbonyl group —$CO_2Z$), an acyl group (—CO—Z); or a sulfo group, into each benzene ring of phthalocyanine at least one by one so that σp value of the substituents of the phthalocyanine structure at large reaches 1.2 or more in total. Of the above groups, a sulfinyl group (—SO—Z), a sulfonyl group (—$SO_2$—Z) and a sulfamoyl group (—$SO_2NV_1V_2$) are preferred, a sulfonyl group (—$SO_2$—Z) and a sulfamoyl group (—$SO_2NV_1V_2$) are more preferred, and a sulfonyl group (—$SO_2$—Z) is most preferred.

As for preferred combination of the substituents of the compound represented by formula (C-1), a compound in which at least one of various substituents is the above preferred group is preferred, a compound in which various substituents are the above preferred groups is more preferred, and a compound in which all the substituents are the above preferred groups is most preferred.

In the invention, the compound represented by formula (C-1) is preferably a compound selected from the group consisting of a compound represented by the following formula (C-2) and the salt thereof Formula (C-2)

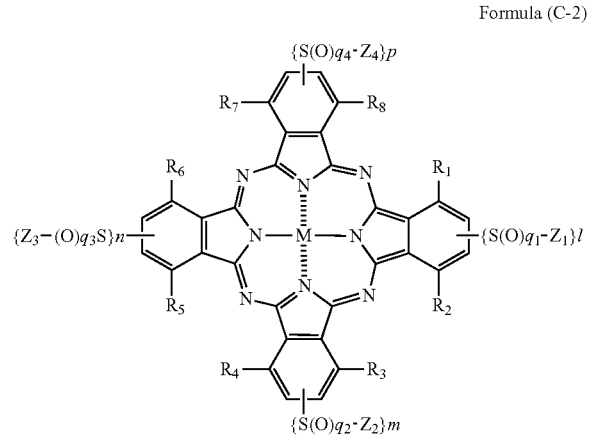

In formula (C-2), each of $R_1$, $R_2$, $R_3$, $R_4$, $R_5$, $R_6$, $R_7$ and $R_8$ independently represents a hydrogen atom, a halogen atom, an alkyl group, a cycloalkyl group, an alkenyl group, an aralkyl group, an aryl group, a heterocyclic group, a cyano group, a hydroxyl group, a nitro group, an amino group, an alkylamino group, an alkoxy group, an aryloxy group, an amido group, an arylamino group, a ureido group, a sulfamoylamino group, an alkylthio group, an arylthio group, an alkoxycarbonylamino group, a sulfonamido group, a carbamoyl group, a sulfamoyl group, a sulfinyl group, a sulfonyl group, an alkoxycarbonyl group, a heterocyclic oxy group, an azo group, an acyloxy group, a carbamoyloxy group, a silyloxy group, an aryloxycarbonyl group, an aryloxycarbonylamino group, an imido group, a heterocyclic thio group, a phosphoryl group, an acyl group, or an ionic hydrophilic group, and each of these groups may further have a substituent.

Each of $Z_1$, $Z_2$, $Z_3$ and $Z_4$ independently represents an alkyl group, a cycloalkyl group, an alkenyl group, an alkynyl group, an aralkyl group, an aryl group, or a heterocyclic group, and each of these groups may further have a substituent. At least one of $Z_1$, $Z_2$, $Z_3$ and $Z_4$ has an ionic hydrophilic group as a substituent.

Each of l, m, n, p, $q_1$, $q_2$, $q_3$ and $q_4$ independently represents an integer of 1 or 2.

M has the same meaning as in Formula (C-1).

In the invention, in formula (C-2), each of l, m, n and p independently represents an integer of 1 or 2, preferably two or more of l, m, n and p represent 1, and most preferably l=m=n=p=1.

In formula (C-2), each of $q_1$, $q_2$, $q_3$ and $q_4$ independently represents an integer of 1 or 2, preferably two or more of $q_1$, $q_2$, $q_3$ and $q_4$ represent 2, and most preferably $q_1=q_2=q_3=q_4=2$.

In formula (C-2), each of $Z_1$, $Z_2$, $Z_3$ and $Z_4$ independently represents an alkyl group, a cycloalkyl group, an alkenyl group, an alkynyl group, an aralkyl group, an aryl group, or a heterocyclic group, and each of these groups may further have a substituent. At least one of $Z_1$, $Z_2$, $Z_3$ and $Z_4$ has an ionic hydrophilic group as a substituent. Each of $Z_1$, $Z_2$, $Z_3$ and $Z_4$ preferably represents a substituted or unsubstituted alkyl group, a substituted or unsubstituted aryl group, or a substituted or unsubstituted heterocyclic group, more preferably a substituted alkyl group, a substituted aryl group, or a substituted heterocyclic group, and most preferably a substituted alkyl group. In regard to the examples of substituents, the above described substituents that Z, $V_1$ and $V_2$ may have in formula (C-1) can be exemplified.

In formula (C-2), each of $R_1$, $R_2$, $R_3$, $R_4$, $R_5$, $R_6$, $R_7$ and $R_8$ independently represents a hydrogen atom, a halogen atom, an alkyl group, a cycloalkyl group, an alkenyl group, an aralkyl group, an aryl group, a heterocyclic group, a cyano group, a hydroxyl group, a nitro group, an amino group, an alkylamino group, an alkoxy group, an aryloxy group, an amido group, an arylamino group, a ureido group, a sulfamoylamino group, an alkylthio group, an arylthio group, an alkoxycarbonylamino group, a sulfonamido group, a carbamoyl group, a sulfamoyl group, a sulfinyl group, a sulfonyl group, an alkoxycarbonyl group, a heterocyclic oxy group, an azo group, an acyloxy group, a carbamoyloxy group, a silyloxy group, an aryloxycarbonyl group, an aryloxycarbonylamino group, an imido group, a heterocyclic thio group, a phosphoryl group, an acyl group, or an ionic hydrophilic group, preferably a hydrogen atom, a halogen atom, an alkyl group, an aryl group, a heterocyclic group, a cyano group, a hydroxyl group, a nitro group, a carbamoyl group, a sulfamoyl group, a sulfinyl group, a sulfonyl group, an alkoxycarbonyl group, an aryloxycarbonyl group, a phosphoryl group, an acyl group, or an ionic hydrophilic group, more preferably a hydrogen atom, a halogen atom, a cyano group, a hydroxyl group, a sulfamoyl group, a sulfinyl group, a sulfonyl group, or an ionic hydrophilic group, and most preferably a hydrogen atom.

Each of $R_1$, $R_2$, $R_3$, $R_4$, $R_5$, $R_6$, $R_7$ and $R_8$ may have a substituent, if possible. As the examples of the substituents, the above substituents that Z, $V_1$ and $V_2$ may have in formula (C-1) can be exemplified.

In formula (C-2), M has the same meaning with M in formula (C-1), and preferred examples are also the same.

As for preferred combination of the substituents of the compound represented by formula (C-2), a compound in which at least one of various substituents is the above preferred group is preferred, a compound in which various substituents are the above preferred groups is more preferred, and a compound in which all the substituents are the above preferred groups is most preferred.

In the invention, the compound represented by formula (C-2) is preferably a compound selected from the group consisting of a compound represented by the following formula (C-3) and the salt thereof Formula (C-3)

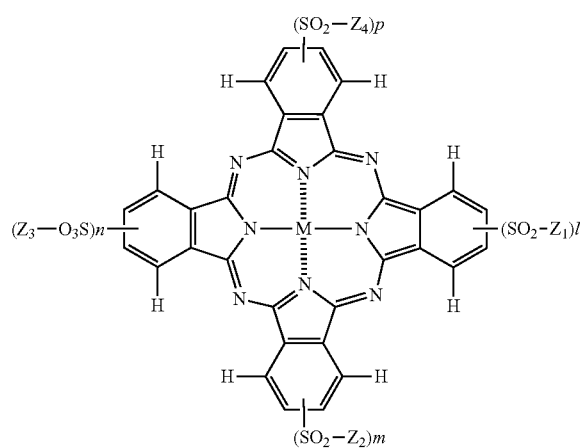

In formula (C-3), each of $Z_1$, $Z_2$, $Z_3$, $Z_4$, l, m, n, p and M has the same meaning with $Z_1$, $Z_2$, $Z_3$, $Z_4$, l, m, n, p and M in formula (C-2).

In formula (C-3), each of l, m, n and p independently represents an integer of 1 or 2, preferably two or more of l, m, n and p represent 1, and most preferably l=m=n=p=1.

In formula (C-3), each of $Z_1$, $Z_2$, $Z_3$ and $Z_4$ independently represents an alkyl group, a cycloalkyl group, an alkenyl group, an alkynyl group, an aralkyl group, an aryl group, or a heterocyclic group, and each of these groups may further have a substituent. At least one of $Z_1$, $Z_2$, $Z_3$ and $Z_4$ has an ionic hydrophilic group as a substituent. Each of $Z_1$, $Z_2$, $Z_3$ and $Z_4$ preferably represents a substituted or unsubstituted alkyl group, a substituted or unsubstituted aryl group, or a substituted or unsubstituted heterocyclic group, more preferably a substituted alkyl group, a substituted aryl group, or a substituted heterocyclic group, and most preferably a substituted alkyl group. In regard to the examples of substituents, the above described substituents that Z, $V_1$ and $V_2$ may have in formula (C-1) can be exemplified.

In further detail, each of $Z_1$, $Z_2$, $Z_3$ and $Z_4$ independently preferably represents $Z_{11}$ ($Z_{11}$ represents —$(CH_2)_3SO_3M_2$, and $M_2$ represents an alkali metal atom) or $Z_{12}$ ($Z_{12}$ represents —$(CH_2)_3SO_2NHCH_2CH(OH)CH_3$).

The cyan dye represented by formula (C-3) in the cyan ink composition is preferably a mixture of dyes having the molar ratio of $Z_{11}$ and $Z_{12}$ of $Z_{11}/Z_{12}$=4/0, 3/1, 2/2 or 1/3, and most preferably a mixture including $Z_{11}/Z_{12}$=3/1 as a main component, and/or $Z_{11}/Z_{12}$=2/2 as a main component. Here, "main component" mans the component that accounts for the largest rate in the dye mixture.

In —$(CH_2)_3SO_4M_2$ represented by $Z_{11}$, $M_2$ preferably represents an alkali metal atom, more preferably a lithium ion, a sodium ion or a potassium ion, and especially preferably a lithium ion.

In formula (C-3), M has the same meaning as M has in formula (C-2) and preferred examples are also the same.

As for preferred combination of the substituents of the compound represented by formula (C-3), a compound in which at least one of various substituents is the above preferred group is preferred, a compound in which various substituents are the above preferred groups is more preferred, and a compound in which all the substituents are the above preferred groups is most preferred.

In the invention, the content of a cyan dye contained in a cyan ink composition is determined depending upon the kinds of $X_1$ to $X_4$ and $Y_1$ to $Y_4$ in formula (C-1) and the kinds of the solvents used in manufacturing the ink composition, but the content of the compound represented by formula (C-1) or the salt thereof in the cyan ink composition is preferably 1% by mass to 10% by mass to the gross mass of the cyan ink composition, and more preferably 2% by mass to 6% by mass.

By making the content of the dye represented by formula (C-1) contained in a cyan ink composition 1% by mass or more, a color developing property of the ink on the recording medium can be bettered when printed, and required image density can be secured, while when by making the total content of the dye of formula (C-1) contained in the cyan ink composition 10% by mass or less, good ejection property of the cyan ink composition can be obtained when the cyan ink composition is used in an inkjet recording method, and further, an effect that clogging of the inkjet nozzles is difficultly caused can be obtained.

In the ink set in the invention, a cyan ink composition having high color density (a dark cyan ink composition) and a cyan ink composition having low color density (a light cyan ink composition) can be contained as the cyan ink composition.

When the dark cyan ink composition and the light cyan ink composition are contained in the ink set of the invention, it is preferred that at least one of the dark cyan ink composition and the light cyan ink composition contains at least one of the compound represented by formula (C-1), (C-2) or (C-3) and the salt thereof as a colorant.

It is preferred that the cyan ink composition having lower color density of the two kinds of cyan ink compositions different in color density is a mixture selected from the group consisting of the compound represented by formula (C-2) and the salt thereof, wherein each of $Z_1$, $Z_2$, $Z_3$ and $Z_4$ independently represents $Z_{11}$ ($Z_{11}$ represents —$(CH_2)_3SO_3M_2$, and $M_2$ represents an alkali metal atom) and/or $Z_{12}$ ($Z_{12}$ represents —$(CH_2)_3SO_2NHCH_2CH(OH)CH_3$). In particular, a dye mixture having the molar ratio of $Z_{11}$ and $Z_{12}$ contained in the cyan dye represented by formula (C-3) as a whole of $Z_{11}/Z_{12}$=4/0, 3/1, 2/2 or 1/3 is preferred, and a dye mixture of $Z_{11}/Z_{12}$=2/2 as a main component is most preferred.

On the other hand, it is also preferred for the cyan ink composition having lower color density of the two kinds of cyan ink compositions different in color density to use at least one compound selected from the group consisting of a compound represented by the following formula (C-4) and a salt thereof.

Formula (C-4)

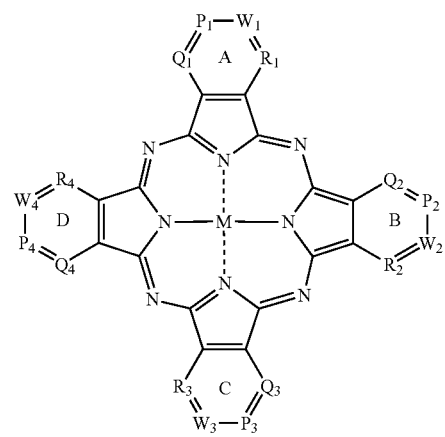

-continued

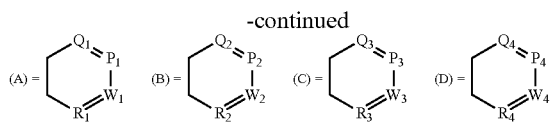

In formula (C-4), each of $Q_1$ to $Q_4$, $P_1$ to $P_4$, $W_1$ to $W_4$, and $R_1$ to $R_4$ independently represents (=CO($J_1$) or —N=), (=C($J_2$)— or —N=), (=C($J_3$)— or —N=), or (=C($J_4$)— or —N=). Each of $J_1$ to $J_4$ independently represents a hydrogen atom or a substituent. Of four rings containing ($Q_1$, $P_1$, $W_1$, $R_1$), ($Q_2$, $P_2$, $W_2$, $R_2$), ($Q_3$, $P_3$, $W_3$, $R_3$), ($Q_4$, $P_4$, $W_4$, $R_4$) [ring A: (A), ring B: (B), ring C: (C), ring D: (D)], at least one ring is a hetero ring. M represents a hydrogen atom, a metal atom or an oxide thereof, a hydroxide, or a halide.

Formula (C-4) is explained below.

It is preferred that at least one hetero ring of the four rings containing ($Q_1$, $P_1$, $W_1$, $R_1$), ($Q_2$, $P_2$, $W_2$, $R_2$), ($Q_3$, $P_3$, $W_3$, $R_3$), ($Q_4$, $P_4$, $W_4$, $R_4$) [ring A: (A), ring B: (B), ring C: (C), ring D: (D)] is a nitrogen-containing hetero ring, and the hetero ring is preferably a pyridine ring, a pyrazine ring, a pyrimidine ring, or a pyridazine ring, more preferably the hetero ring is a pyridine ring or a pyrazine ring, and most preferably a pyridine ring.

More preferably, in the cyan ink composition represented by formula (C-4), when any ring of the four rings containing ($Q_1$, $P_1$, $W_1$, $R_1$), ($Q_2$, $P_2$, $W_2$, $R_2$), ($Q_3$, $P_3$, $W_3$, $R_3$), ($Q_4$, $P_4$, $W_4$, $R_4$) [ring A: (A), ring B: (B), ring C: (C), ring D: (D)] represents an aromatic ring, the aromatic ring is preferably represented by the following formula.

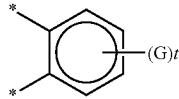

Formula (I)

In formula (I), * is the bonding position to a phthalocyanine structure. G represents —SO—$Z_1$, —$SO_2$—$Z_1$, —$SO_2NZ_2Z_3$, —$CONZ_2Z_3$, —$CO_2Z_1$, —$COZ_1$, or a sulfo group. t is an integer of 1 to 4.

$Z_1$, which may be the same or different, and each represents a substituted or unsubstituted alkyl group, a substituted or unsubstituted cycloalkyl group, a substituted or unsubstituted alkenyl group, a substituted or unsubstituted alkynyl group, a substituted or unsubstituted aralkyl group, a substituted or unsubstituted aryl group, or a substituted or unsubstituted heterocyclic group.

$Z_1$ preferably represents a substituted or unsubstituted alkyl group, a substituted or unsubstituted aryl group, or a substituted or unsubstituted heterocyclic group, and more preferably a substituted alkyl group or a substituted aryl group, and most preferably a substituted alkyl group.

$Z_2$ and $Z_3$, which may be the same or different, and each represents a hydrogen atom, a substituted or unsubstituted alkyl group, a substituted or unsubstituted cycloalkyl group, a substituted or unsubstituted alkenyl group, a substituted or unsubstituted alkynyl group, a substituted or unsubstituted aralkyl group, a substituted or unsubstituted aryl group, or a substituted or unsubstituted heterocyclic group.

Each of $Z_1$ and $Z_2$ independently preferably represents a hydrogen atom, a substituted or unsubstituted alkyl group, a substituted or unsubstituted aryl group, or a substituted or unsubstituted heterocyclic group, preferably a hydrogen atom, a substituted alkyl group, or a substituted aryl group, and most preferably either one of $Z_1$ and $Z_2$ represents a hydrogen atom, and the other represents a substituted alkyl group, or a substituted aryl group.

G preferably represents —SO—$Z_1$, —$SO_2$—$Z_1$, —$SO_2NZ_2Z_3$, —$CONZ_2Z_3$, —$CO_2Z_1$, or —$COZ_1$, more preferably —SO—$Z_1$, —$SO_2$—$Z_1$ or —$SO_2NZ_2Z_3$, and especially preferably —$SO_2$—$Z_1$.

t is preferably an integer of 1 to 3, more preferably an integer of 1 or 2, and most preferably 1.

In further detail, in the cyan ink composition represented by formula (C-4), it is preferred that arbitrary rings of ring A, ring B, ring C and ring D are aromatic rings, at least one aromatic ring is represented by the following formula (II).

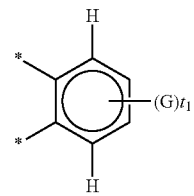

Formula (II)

In formula (II), * is the bonding position to a phthalocyanine structure. G has the same meaning with G in formula (I). $t_1$ is 1 or 2, and preferably 1.

In the ink set in the invention, it is especially preferred that both a dark cyan ink composition and a light cyan ink composition contain at least one dye of the dyes represented by formula (C-1), (C-2), (C-3) or (C-4) as a colorant.

As described above, when a dark cyan ink composition and a light cyan ink composition are contained in an ink set, the density of the colorant in the light cyan ink composition can be arbitrarily decided according to the kind of the dye used as a colorant so as to have preferred color balance at the time when the light cyan ink composition is combined with the dark cyan ink composition.

In general, it is preferred that the compound represented by formula (C-1), (C-2), (C-3) or (C-4) or a salt thereof is contained in the light cyan ink composition in total of 0.4% by mass to 3.0% by mass to the gross mass of the light cyan ink composition. By making the content of the colorant in the light cyan ink composition 0.4% by mass or more, an excellent color developing property can be obtained, while when by making the density of the colorant 3.0% by mass or less, the feeling of graininess of the image recorded with the light cyan ink composition can be reduced.

On the other hand, it is preferred that the compound represented by formula (C-1), (C-2), (C-3) or (C-4) or a salt thereof is contained in the dark cyan ink composition in total of 2.0% by mass to 10.0% by mass to the gross mass of the dark cyan ink composition.

Further, the ratio of the concentration (% by mass) of the colorant contained in the light cyan ink composition and the concentration (% by mass) of the colorant contained in the dark cyan ink composition is preferably ½ to ⅛.

Good color balance is realized between the light cyan ink composition and the dark cyan ink composition by satisfying these conditions and, further, clogging of inkjet nozzles can be prevented.

As described above, in a cyan ink composition, or a dark cyan ink composition and a light cyan ink composition in an ink set in the invention, for the purpose of adjusting the hue of ink, a dye, e.g., represented by the following formula (C-5), or other cyan dyes represented by a dye mixture can be used in such an extent of not greatly damaging light fastness and ozone resistance.

Formula (C-5)

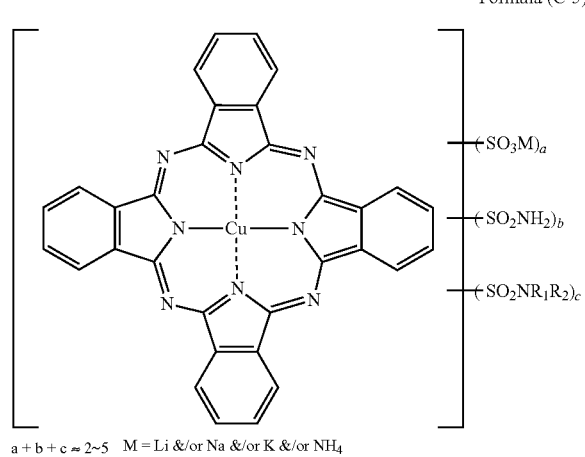

$a + b + c \approx 2\text{--}5$   M = Li &/or Na &/or K &/or NH$_4$

In formula (C-5), each of $R_1$ and $R_2$ independently represents a hydrogen atom or a monovalent substituent. The monovalent substituent may further have a substituent. a represents an integer of 0 to 5. b represents an integer of 0 to 5. c represents an integer of 0 to 5.

Other cyan dyes for use in the invention include, for example, C.I. Direct Blue 1, 10, 15, 22, 25, 55, 67, 68, 71, 76, 77, 78, 80, 84, 86, 87, 90, 98, 106, 108, 109, 151, 156, 158, 159, 160, 168, 189, 192, 193, 194, 199, 200, 201, 202, 203, 207, 211, 213, 214, 218, 225, 229, 236, 237, 244, 248, 249, 251, 252, 264, 270, 280, 288, 289, 291, C.I. Acid Blue 9, 25, 40, 41, 62, 72, 76, 78, 80, 82, 92, 106, 112, 113, 120, 127:1, 129, 138, 143, 175, 181, 205, 207, 220, 221, 230, 232, 247, 258, 260, 264, 271, 277, 278, 279, 280, 288, 290, 326, C.I. Reactive Blue 2, 3, 5, 8, 10, 13, 14, 15, 17, 18, 19, 21, 25, 26, 27, 28, 29, 38, C.I. Basic Blue 1, 3, 5, 7, 9, 22, 26, 41, 45, 46, 47, 54, 57, 60, 62, 65, 66, 69, 71, but the invention is not restricted thereto.

In an ink set in the invention, the total amount of all the colorant contained in a cyan ink composition, a dark cyan ink composition, or a light cyan ink composition is preferably 0.1% by mass to 10% by mass to the gross mass of the ink composition, and more preferably 0.5% by mass to 5% by mass. By making the content of the colorants in the ink composition 0.1% by mass or more, a color developing property or image density on a recording medium can be secured, while by making the content 10% by mass or less, adjustment of viscosity of the ink composition becomes easy, and ejection reliability and characteristics such as prevention of clogging and the like can be easily secured.

(Black)

An ink set in the invention can be constituted by containing a black ink composition, if necessary. By containing a black ink composition in an ink set in the invention, an image having good contrast can be formed on a recording medium.

The colorants used in a black ink composition for constituting an ink set in the invention are described below.

In an ink set in the invention, the colorants used in a black ink composition are not limited to colorants having a specific structure, but it is preferred that the difference between the light fastness and ozone resistance of the ink compositions of other colors and the light fastness and ozone resistance of the black ink composition is small.

From the above aspect, a black dye to be used as a colorant in a black ink composition in the invention is preferably selected from the group consisting of a compound represented by the following formula (BkII-1) or (BkIII-1) and the salts thereof.

<Compounds Represented by Formula (BkII-1)>

Compounds represented by formula (BkII-1) (hereinafter sometimes referred to as "azo compounds represented by formula (BkII-1)") are described below.

Substituent group J is defined as follows.

(Substituents)

The examples of substituents include a halogen atom, an alkyl group, an aralkyl group, an alkenyl group, an alkynyl group, an aryl group, a heterocyclic group, a cyano group, a hydroxyl group, a nitro group, an alkoxy group, an aryloxy group, a silyloxy group, a heterocyclic oxy group, an acyloxy group, a carbamoyloxy group, an alkoxycarbonyloxy group, an aryloxycarbonyloxy group, an amino group, an acylamino group, an aminocarbonylamino group, an alkoxycarbonylamino group, an aryloxycarbonylamino group, a sulfamoylamino group, an alkylsulfonylamino or arylsulfonylamino group, a mercapto group, an alkylthio group, an arylthio group, a heterocyclic thio group, a sulfamoyl group, an alkylsulfinyl group, an arylsulfinyl group, an alkylsulfonyl group, an arylsulfonyl group, an acyl group, an aryloxycarbonyl group, an alkoxycarbonyl group, a carbamoyl group, an aryl- or heterocyclic azo group, an imido group, a phosphino group, a phosphinyl group, a phosphinyloxy group, a phosphinylamino group, a silyl group, and an ionic hydrophilic group. These substituents may further be substituted. As further substituents, groups selected from the above-described substituent group J can be exemplified.

In further detail, as halogen atom, e.g., a fluorine atom, a chlorine atom, a bromine atom, and an iodine atom are exemplified.

As alkyl group, straight chain, branched or cyclic, substituted or unsubstituted alkyl groups are exemplified, and a cycloalkyl group, a bicycloalkyl group, and a tricyclic structure having more ring structures are also included therein. The alkyl groups in the substituents described hereafter (e.g., an alkyl group in an alkoxy group and an alkylthio group) represent alkyl groups having such a concept. In detail, the alkyl group is preferably an alkyl group having 1 to 30 carbon atoms, and, for example, a methyl group, an ethyl group, an n-ropyl group, an isopropyl group, a t-butyl group, an n-octyl group, an eicosyl group, a 2-chloroethyl group, a 2-cyanoethyl group, and a 2-ethylhexyl group are exemplified. The cycloalkyl group is preferably a substituted or unsubstituted cycloalkyl group having 3 to 30 carbon atoms, and, for example, a cyclohexyl group, a cyclopentyl group, and a 4-n-dodecylcyclohexyl group are exemplified. The bicycloalkyl group is preferably a substituted or unsubstituted bicycloalkyl group having 5 to 30 carbon atoms, i.e., a monovalent group obtained by removing one hydrogen atom from bicycloalkane having 5 to 30 carbon atoms, and, for example, a bicycle[1,2,2]heptan-2-yl group, and a bicycle[2,2,2]octan-3-yl group are exemplified.

As aralkyl group, a substituted or unsubstituted aralkyl group is exemplified. As the substituted or unsubstituted aralkyl group, an aralkyl group having 7 to 30 carbon atoms is preferred. For example, a benzyl group and a 2-phenethyl group are exemplified.

Alkenyl group is preferably a straight chain, branched or cyclic, substituted or unsubstituted alkenyl group, and a cycloalkenyl group and a bicycloalkenyl group are included.

In detail, as the alkenyl group, a substituted or unsubstituted alkenyl group having 2 to 30 carbon atoms, e.g., a vinyl group, an allyl group, a prenyl group, a geranyl group, and an oleyl group can be preferably exemplified. As the cycloalkenyl group, a substituted or unsubstituted cycloalkenyl group having 3 to 30 carbon atoms, i.e., a monovalent group obtained by removing one hydrogen atom from cycloalkene having 3 to 30 carbon atoms, e.g., a 2-cyclopenten-1-yl group and a 2-cyclohexen-1-yl group can be preferably exemplified. As the bicycloalkenyl group, a substituted or unsubstituted bicycloalkenyl group having 5 to 30 carbon atoms, i.e., a monovalent group obtained by removing one hydrogen atom from bicycloalkene having one double bond, e.g., a bicyclo[2,2,1]hepto-2-en-1-yl group and a bicyclo[2,2,2]octo-2-en-4-yl group can be preferably exemplified.

As alkynyl group, preferably a substituted or unsubstituted alkynyl group having 2 to 30 carbon atoms, e.g., an ethynyl group, a propargyl group, and a trimethylsilylethynyl group can be exemplified.

As aryl group, preferably a substituted or unsubstituted aryl group having 6 to 30 carbon atoms, e.g., a phenyl group, a p-tolyl group, a naphthyl group, an m-chlorophenyl group, and an o-hexadecanoylaminophenyl group can be exemplified.

As heterocyclic group, preferably a monovalent group obtained by removing one hydrogen atom from a 5- or 6-membered, substituted or unsubstituted, aromatic or non-aromatic heterocyclic compound, and more preferably a 5- or 6-membered aromatic heterocyclic group having 3 to 30 carbon atoms, e.g., a 2-furyl group, a 2-thienyl group, a 2-pyrimidinyl group, and a 2-benzothiazolyl group can be exemplified.

As alkoxy group, preferably a substituted or unsubstituted alkoxy group having 1 to 30 carbon atoms, e.g., a methoxy group, an ethoxy group, an isopropoxy group, a t-butoxy group, an n-octyloxy group, and a 2-methoxyethoxy group can be exemplified.

As aryloxy group, preferably a substituted or unsubstituted aryloxy group having 6 to 30 carbon atoms, e.g., a phenoxy group, a 2-methylphenoxy group, a 4-t-butylphenoxy group, a 3-nitrophenoxy group, and a 2-tetradecanoylaminophenoxy group can be exemplified.

As silyloxy group, preferably a substituted or unsubstituted silyloxy group having 0 to 20 carbon atoms, e.g., a trimethylsilyloxy group and a diphenylmethylsilyloxy group can be exemplified.

As heterocyclic oxy group, preferably a substituted or unsubstituted heterocyclic oxy group having 2 to 30 carbon atoms, e.g., a 1-phenyltetrazol-5-oxy group and a 2-tetrahydropyranyloxy group can be exemplified.

As acyloxy group, preferably a formyloxy group, a substituted or unsubstituted alkylcarbonyloxy group having 2 to 30 carbon atoms, and a substituted or unsubstituted arylcarbonyloxy group having 6 to 30 carbon atoms, e.g., an acetyloxy group, a pivaloyloxy group, a stearoyloxy group, a benzoyloxy group, and a p-methoxyphenylcarbonyloxy group can be exemplified.

As carbamoyloxy group, preferably a substituted or unsubstituted carbamoyloxy group having 1 to 30 carbon atoms, e.g., an N,N-dimethylcarbamoyloxy group, an N,N-diethylcarbamoyloxy group, a morpholinocarbonyloxy group, an N,N-di-n-octylaminocarbonyloxy group, and an N-n-octylcarbamoyloxy group can be exemplified.

As alkoxycarbonyloxy group, preferably a substituted or unsubstituted alkoxycarbonyloxy group having 2 to 30 carbon atoms, e.g., a methoxycarbonyloxy group, an ethoxycarbonyloxy group, a t-butoxycarbonyloxy group, and n-octylcarbonyloxy group can be exemplified.

As aryloxycarbonyloxy group, preferably a substituted or unsubstituted aryloxycarbonyloxy group having 7 to 30 carbon atoms, e.g., a phenoxycarbonyloxy group, a p-methoxyphenoxycarbonyloxy group, and a p-n-hexadecyloxyphenoxycarbonyloxy group can be exemplified.

In amino group are included an alkylamino group, an arylamino group and a heterocyclic amino group, and preferably an amino group, a substituted or unsubstituted alkylamino group having 1 to 30 carbon atoms, and a substituted or unsubstituted anilino group having 6 to 30 carbon atoms, e.g., a methylamino group, a dimethylamino group, an anilino group, an N-methylanilino group, and a diphenylamino group can be exemplified.

As acylamino group, preferably a formylamino group, a substituted or unsubstituted alkylcarbonylamino group having 1 to 30 carbon atoms, and a substituted or unsubstituted arylcarbonylamino group having 6 to 30 carbon atoms, e.g., an acetylamino group, a pivaloylamino group, a lauroylamino group, a benzoylamino group, and a 3,4,5-tri-n-octyloxyphenylcarbonylamino group can be exemplified.

As aminocarbonylamino group, preferably a substituted or unsubstituted aminocarbonylamino group having 1 to 30 carbon atoms, e.g., a carbamoylamino group, an N,N-dimethylaminocarbonylamino group, an N,N-diethylaminocarbonylamino group, and a morpholinocarbonylamino group can be exemplified.

As alkoxycarbonylamino group, preferably a substituted or unsubstituted alkoxycarbonylamino group having 2 to 30 carbon atoms, e.g., a methoxycarbonylamino group, an ethoxycarbonylamino group, a t-butoxycarbonylamino group, an n-octadecyloxycarbonylamino group, and an N-methylmethoxycarbonylamino group can be exemplified.

As aryloxycarbonylamino group, preferably a substituted or unsubstituted aryloxycarbonylamino group having 7 to 30 carbon atoms, e.g., a phenoxycarbonylamino group, a p-chlorophenoxycarbonylamino group, and an m-n-octyloxyphenoxycarbonylamino group can be exemplified.

As sulfamoylamino group, preferably a substituted or unsubstituted sulfamoylamino group having 0 to 30 carbon atoms, e.g., a sulfamoylamino group, an N,N-dimethylaminosulfonylamino group, and an N-n-octylaminosulfonylamino group can be exemplified.

As alkylsulfonylamin or arylsulfonylamino group, preferably a substituted or unsubstituted alkylsulfonylamino group having 1 to 30 carbon atoms, and a substituted or unsubstituted arylsulfonylamino group having 6 to 30 carbon atoms, e.g., a methylsulfonylamino group, a butylsulfonylamino group, a phenylsulfonylamino group, a 2,3,5-trichlorophenylsulfonylamino group, and a p-methylphenylsulfonylamino group can be exemplified.

As alkylthio group, preferably a substituted or unsubstituted alkylthio group having 1 to 30 carbon atoms, e.g., a methylthio group, an ethylthio group, and an n-hexadecylthio group can be exemplified.

As arylthio group, preferably a substituted or unsubstituted arylthio group having 6 to 30 carbon atoms, e.g., a phenylthio group, a p-chlorophenylthio group, and an m-methoxyphenylthio group can be exemplified.

As heterocyclic thio group, preferably a substituted or unsubstituted heterocyclic thio group having 2 to 30 carbon atoms, e.g., a 2-benzothiazolylthio group and a 1-phenyltetrazol-5-ylthio group can be exemplified.

As sulfamoyl group, preferably a substituted or unsubstituted sulfamoyl group having 0 to 30 carbon atoms, e.g., an N-ethylsulfamoyl group, an N-(3-dodecyloxypropyl)sulfamoyl group, an N,N-dimethylsulfamoyl group, an N-acetylsulfamoyl group, an N-benzoylsulfamoyl group, and an N—(N'-phenylcarbamoyl)sulfamoyl group can be exemplified.

As alkyllsulfinyl or arylsulfinyl group, preferably a substituted or unsubstituted alkylsulfinyl group having 1 to 30 carbon atoms, and a substituted or unsubstituted arylsulfinyl group having 6 to 30 carbon atoms, e.g., a methylsulfinyl group, an ethylsulfinyl group, a phenylsulfinyl group, and a p-methylphenylsulfinyl group can be exemplified.

As alkylsulfonyl or arylsulfonyl group, preferably a substituted or unsubstituted alkylsulfonyl group having 1 to 30 carbon atoms, and a substituted or unsubstituted arylsulfonyl group having 6 to 30 carbon atoms, e.g., a methylsulfonyl group, an ethylsulfonyl group, a phenylsulfonyl group, and a p-methylphenylsulfonyl group can be exemplified.

As acyl group, preferably a formyl group, a substituted or unsubstituted alkylcarbonyl group having 2 to 30 carbon atoms, a substituted or unsubstituted arylcarbonyl group having 7 to 30 carbon atoms, and a substituted or unsubstituted heterocyclic carbonyl group having 2 to 30 carbon atoms being bonded to a carbonyl group via a carbon atom, e.g., an acetyl group, a pivaloyl group, a 2-chloroacetyl group, a stearoyl group, a benzoyl group, a p-n-octyloxyphenylcarbonyl group, a 2-pyridylcarbonyl group, and a 2-furylcarbonyl group can be exemplified.

As aryloxycarbonyl group, preferably a substituted or unsubstituted aryloxycarbonyl group having 7 to 30 carbon atoms, e.g., a phenoxycarbony group, an o-chlorophenoxycarbonyl group, an m-nitrophenoxycarbonyl group, and a p-t-butylphenoxycarbonyl group can be exemplified.

As alkoxycarbonyl group, preferably a substituted or unsubstituted alkoxycarbonyl group having 2 to 30 carbon atoms, e.g., a methoxycarbonyl group, an ethoxycarbonyl group, a t-butoxycarbonyl group, and an n-octadecyloxycarbonyl group can be exemplified.

As carbamoyl group, preferably a substituted or unsubstituted carbamoyl group having 1 to 30 carbon atoms, e.g., a carbamoyl group, an N-methylcarbamoyl group, an N,N-dimethylcarbamoyl group, an N,N-di-n-octylcarbamoyl group, and an N-(methylsulfonyl)carbamoyl group can be exemplified.

As aryl- or heterocyclic azo group, preferably a substituted or unsubstituted arylazo group having 6 to 30 carbon atoms, and a substituted or unsubstituted heterocyclic azo group having 3 to 30 carbon atoms, e.g., a phenylazo group, a p-chlorophenylazo group, a 5-ethylthio-1,3,4-thiadiazol-2-ylazo group can be exemplified.

As imido group, preferably an N-succinimido group and an N-phthalimido group can be exemplified.

As phosphino group, preferably a substituted or unsubstituted phosphino group having 0 to 30 carbon atoms, e.g., a dimethylphosphino group, a diphenylphosphino group, and a methylphenoxyphosphino group can be exemplified.

As phosphinyl group, preferably a substituted or unsubstituted phosphinyl group having 0 to 30 carbon atoms, e.g., a phosphinyl group, a dioctyloxyphosphinyl group, and a diethoxyphosphinyl group can be exemplified.

As phosphinyloxy group, preferably a substituted or unsubstituted phosphinyloxy group having 0 to 30 carbon atoms, e.g., diphenoxyphosphinyloxy group and a dioctyloxyphosphinyloxy group can be exemplified.

As phosphinylamino group, preferably a substituted or unsubstituted phosphinylamino group having 0 to 30 carbon atoms, e.g., a dimethoxyphosphinylamino group and a dimethylaminophosphinylamino group can be exemplified.

As silyl group, preferably a substituted or unsubstituted silyl group having 0 to 30 carbon atoms, e.g., a trimethylsilyl group, a t-butyldimethylsilyl group, and a phenyldimethylsilyl group can be exemplified.

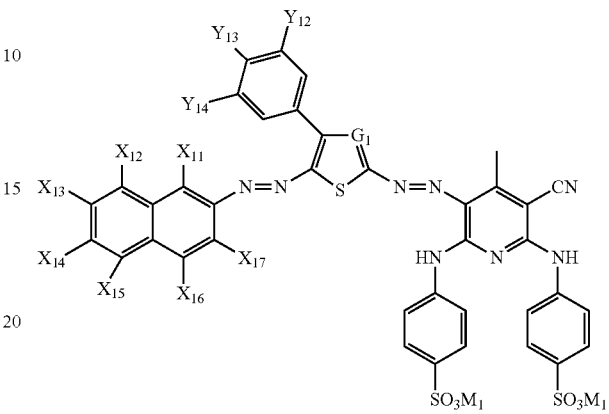

(BkII-1)

In formula (BkII-1), $G_1$ represents a nitrogen atom or —$C(R_{12})$=; $R_{12}$ represents a hydrogen atom, a sulfo group, a carboxyl group, a substituted or unsubstituted carbamoyl group, or a cyano group; each of $X_{11}$, $X_{12}$, $X_{13}$, $X_{14}$, $X_{15}$, $X_{16}$ and $X_{17}$ independently represents a hydrogen atom or a monovalent substituent; each of $Y_{12}$, $Y_{13}$ and $Y_{14}$ independently represents a hydrogen atom or a monovalent substituent, and $Y_{12}$, $Y_{13}$ and $Y_{14}$ may be bonded to each other to form a ring; and each of $M_1$ independently represents a hydrogen atom or a monovalent counter cation.

In formula (BkII-1), each of $Y_{12}$, $Y_{13}$ and $Y_{14}$ independently preferably represents a hydrogen atom, an ionic hydrophilic group, a substituted or unsubstituted carbamoyl group, a substituted or unsubstituted sulfamoyl group, a substituted or unsubstituted alkylsulfonylamino group, a substituted or unsubstituted arylsulfonylamino group, or an acylamino group, more preferably a hydrogen atom, an alkylsulfonylamino group having an ionic hydrophilic group as a substituent, an arylsulfonylamino group having an ionic hydrophilic group as a substituent, or an acylamino group having an ionic hydrophilic group as a substituent, and especially preferably a hydrogen atom, an arylsulfonylamino group having an ionic hydrophilic group as a substituent, or an acylamino group having an ionic hydrophilic group as a substituent.

When each of the carbamoyl group, sulfamoyl group, alkylsulfonylamino group, arylsulfonylamino group and acylamino group represented by $Y_{12}$, $Y_{13}$ or $Y_{14}$ has a substituent, each of the substituents is more preferably independently selected from ionic hydrophilic groups (e.g., —$CO_2M_{11}$, —$SO_3M_{11}$, where $M_{11}$ is a monovalent counter cation).

$Y_{12}$, $Y_{13}$ and $Y_{14}$ may be bonded to each other to form a ring, and as the ring formed by $Y_{12}$, $Y_{13}$ and $Y_{14}$ by bonding, a benzene ring and a naphthalene ring are exemplified, and is preferably a benzene ring.

$Y_{12}$, $Y_{13}$ and $Y_{14}$ may further have a substituent, and as such a substituent, the above substituent group J can be exemplified, preferably a hydroxyl group, an aryl group which may have an ionic hydrophilic group, or a heterocyclic group.

In formula (BkII-1), as the ionic hydrophilic group, —$SO_3M_{11}$ or —$CO_2M_{11}$ is preferred, —$SO_3M_{11}$ is more preferred, and —$SO_3Li$ is especially preferred.

Each of $M_1$ and $M_{11}$ independently represents a hydrogen atom or a monovalent counter cation. As the monovalent counter cation, e.g., an ammonium ion, an alkali metal ion (e.g., a lithium ion, a sodium ion, a potassium ion), and an organic cation (e.g., a tetramethylammonium ion, a tetramethylguanidium ion, a tetramethylphosphonium ion) are exemplified, a lithium salt, a sodium salt, a potassium salt and an ammonium salt are preferred, a lithium salt and a mixed salt including a lithium salt as the main component are more preferred, and a lithium salt is most preferred.

In formula (BkII-1), each of $X_{11}$, $X_{12}$, $X_{13}$, $X_{14}$, $X_{15}$, $X_{16}$ and $X_{17}$ independently represents a hydrogen atom or a monovalent substituent. As the substituents in the case where each of $X_{11}$, $X_{12}$, $X_{13}$, $X_{14}$, $X_{15}$, $X_{16}$ and $X_{17}$ represents a monovalent substituent, substituent group J can be exemplified.

Each of $X_{11}$, $X_{12}$, $X_{13}$, $X_{14}$, $X_{15}$, $X_{16}$ and $X_{17}$ independently preferably represents a hydrogen atom, an ionic hydrophilic group, a cyano group, a substituted or unsubstituted alkylsulfonyl group, a substituted or unsubstituted arylsulfonyl group, a nitro group, a substituted or unsubstituted alkoxycarbonyl group, a substituted or unsubstituted carbamoyl group, or a substituted or unsubstituted sulfamoyl group, more preferably a hydrogen atom, an ionic hydrophilic group, a cyano group, a methanesulfonyl group, a phenylsulfonyl group, a nitro group, a methoxycarbonyl group, or a carbamoyl group, and especially preferably a hydrogen atom, an ionic hydrophilic group, or a cyano group.

In formula (BkII-1), each of $X_{11}$, $X_{13}$, $X_{15}$ and $X_{17}$ independently preferably represents either a hydrogen atom or substituent group J, and further, at least one of $X_{12}$, $X_{14}$ and $X_{16}$ preferably represents an electron-withdrawing group having a Hammett's σp value of 0.3 or more.

As the compound represented by formula (BkII-1), especially preferred combinations are the following (i) to (v).

(i) $G_1$ represents a nitrogen atom or —C($R_{12}$)=, and preferably —C($R_{12}$)=. $R_{12}$ represents a hydrogen atom, a sulfo group, a carboxyl group, a substituted or unsubstituted carbamoyl group, or a cyano group, preferably a carbamoyl group (a —$CONH_2$ group) or a cyano group, and more preferably a cyano group.

(ii) Each of $Y_{12}$, $Y_{13}$ and $Y_{14}$ independently preferably represents a hydrogen atom, an ionic hydrophilic group, a substituted or unsubstituted carbamoyl group, a substituted or unsubstituted sulfamoyl group, a substituted or unsubstituted alkylsulfonylamino group, a substituted or unsubstituted arylsulfonylamino group, or an acylamino group, more preferably a hydrogen atom, an ionic hydrophilic group, a substituted or unsubstituted alkylsulfonylamino group, a substituted or unsubstituted arylsulfonylamino group, or an acylamino group, and especially preferably a hydrogen atom, an arylsulfonylamino group having an ionic hydrophilic group as a substituent, or an acylamino group having an ionic hydrophilic group as a substituent.

Each of $Y_{12}$ and $Y_{14}$ independently most preferably represents a hydrogen atom, and $Y_{13}$ most preferably represents an arylsulfonylamino group having an ionic hydrophilic group as a substituent, or an acylamino group having an ionic hydrophilic group as a substituent.

(iii) As the ionic hydrophilic group, —$SO_3M_{11}$ or —$CO_2M_{11}$ is preferred, —$SO_3M_{11}$ is more preferred, and —$SO_3Li$ is especially preferred.

(iv) Each of $M_1$ and $M_{11}$ independently represents a hydrogen atom or a monovalent counter cation. As the monovalent counter cation, e.g., an ammonium ion, an alkali metal ion (e.g., a lithium ion, a sodium ion, a potassium ion), and an organic cation (e.g., a tetramethylammonium ion, a tetramethylguanidium ion, a tetramethylphosphonium ion) are exemplified, preferably a lithium salt, a sodium salt, a potassium salt and an ammonium salt, more preferably a lithium salt and a mixed salt including a lithium salt as the main component, and most preferably a lithium salt.

(v) Each of $X_{11}$, $X_{12}$, $X_{13}$, $X_{14}$, $X_{15}$, $X_{16}$ and $X_{17}$ independently more preferably represents a hydrogen atom, an ionic hydrophilic group, a cyano group, a methanesulfonyl group, a phenylsulfonyl group, a nitro group, a methoxycarbonyl group, or a carbamoyl group, and especially preferably a hydrogen atom, an ionic hydrophilic group, or a cyano group. Each of $X_{11}$, $X_{13}$, $X_{15}$ and $X_{17}$ independently preferably represents either a hydrogen atom or substituent group J, and further, at least one of $X_{12}$, $X_{14}$ and $X_{16}$ preferably represents an electron-withdrawing group having a Hammett's σp value of 0.3 or more.

This structure is preferred for the factor that water solubility of the azo compounds of formula (BkII-1) is improved and azo dye structure capable of reconciling good hue and coloring property with high preservation stability can be electrolically and stereoscopically given.

As a result, preservation stability as an aqueous solution of the azo dye is improved, light fastness, thermal stability, wet heat stability, water resisting property, gas proof property and solvent resistance which are performances required of the ink are sharply improved and result in most preferred example.

The compound represented by formula (BkII-1) is preferably a compound represented by the following formula (BkII-2).

Compounds represented by formula (BkII-2) and the salts thereof are described in detail below.

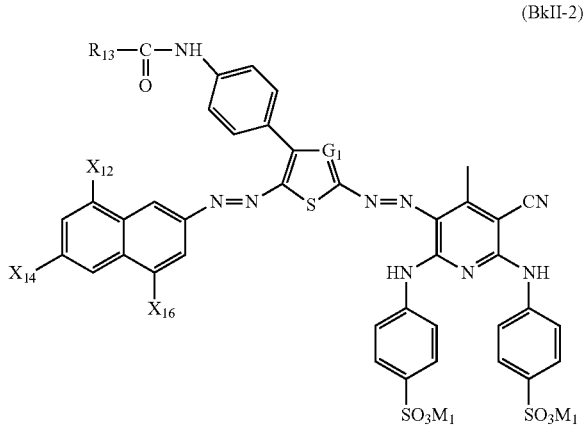

(BkII-2)

In formula (BkII-2), $G_1$ represents a nitrogen atom or —C($R_{12}$)=; $R_{12}$ represents a hydrogen atom, a sulfo group, a carboxyl group, a substituted or unsubstituted carbamoyl group, or a cyano group; each of $X_{12}$, $X_{14}$ and $X_{16}$ independently represents a hydrogen atom or a monovalent substituent, provided that at least one of $X_{12}$, $X_{14}$ and $X_{16}$ represents an electron-withdrawing group having a Hammett's σp value of 0.3 or more; $R_{13}$ represents a monovalent substituent; and each of $M_1$ independently represents a hydrogen atom or a monovalent counter cation.

$G_1$, $R_{12}$ and $M_1$ in formula (BkII-2) are respectively the same with $G_1$, $R_{12}$ and $M_1$ in formula (BkII-1), and preferred examples are also the same.

In formula (BkII-2), each of $X_{12}$, $X_{14}$ and $X_{16}$ independently represents a hydrogen atom or a monovalent substituent. When each of $X_{12}$, $X_{14}$ and $X_{16}$ represents a substituent, substituent group J can be exemplified as the substituents, provided that at least one of $X_{12}$, $X_{14}$ and $X_{16}$ represents an electron-withdrawing group having a Hammett's σp value of 0.3 or more.

Each of $X_{12}$, $X_{14}$ and $X_{16}$ independently preferably represents a hydrogen atom, an ionic hydrophilic group, a cyano group, a substituted or unsubstituted alkylsulfonyl group, a substituted or unsubstituted arylsulfonyl group, a nitro group, a substituted or unsubstituted alkoxycarbonyl group, a substituted or unsubstituted carbamoyl group, or a substituted or unsubstituted sulfamoyl group, more preferably a hydrogen atom, an ionic hydrophilic group, a cyano group, a methanesulfonyl group, a phenylsulfonyl group, a nitro group, a methoxycarbonyl group, or a carbamoyl group, and especially preferably a hydrogen atom, an ionic hydrophilic group, or a cyano group.

Further, at least one of $X_{12}$, $X_{14}$ and $X_{16}$ represents an electron-withdrawing group having a Hammett's σp value of 0.3 or more. The electron-withdrawing group has the least upper bound of the σp value of preferably 1.0 or less.

When at least one of $X_{12}$, $X_{14}$ and $X_{16}$ is an electron-withdrawing group having a Hammett's σp value in this range, it is possible to improve hue adjustment, light fastness and ozone gas resisting property of the azo compound, and effective in using as a water-soluble dye for inkjet recording black ink.

The specific examples of electron-withdrawing group having a Hammett's σp value of 0.3 or more include an acyl group, an acyloxy group, a carbamoyl group, an alkyloxycarbonyl group, an aryloxycarbonyl group, a cyano group, a nitro group, a dialkylphosphono group, a diarylphosphono group, a diarylphosphonyl group, an alkylsulfinyl group, an arylsulfinyl group, an alkylsulfonyl group, an arylsulfonyl group, a sulfonyloxy group, an acylthio group, a sulfamoyl group, a thiocyanate group, a thiocarbonyl group, a halogenated alkyl group, a halogenated alkoxy group, a halogenated aryloxy group, a halogenated alkylamino group, a halogenated alkylthio group, an aryl group substituted with other electron-withdrawing group having σp value of 0.3 or more, a nitro group, a heterocyclic group, a halogen atom, an azo group, and a selenocyanate group, preferably a cyano group, a methylsulfonyl group, a phenylsulfonyl group, a methoxycarbonyl group, a carbamoyl group, and a nitro group, and more preferably a cyano group, a methylsulfonyl group, and a nitro group.

From the viewpoint of hue, coloring property and preservation stability of an aqueous solution, it is more preferred that at least one of $X_{12}$, $X_{14}$ and $X_{16}$ is an ionic hydrophilic group, at least one of $X_{12}$, $X_{14}$ and $X_{16}$ is an electron-withdrawing group having a Hammett's σp value of 0.3 or more, $X_{13}$ is an electron-withdrawing group having a Hammett's σp value of 0.3 or more, and each of $X_{12}$ and $X_{16}$ represents an ionic hydrophilic group. The ionic hydrophilic group is preferably —$SO_3M_{11}$ or —$CO_2M_{11}$ ($M_{11}$ is Li, K, Ca, Mg, Ba), more preferably $CO_2M_{11}$, and especially preferably —$CO_2Li$.

As the monovalent substituent represented by $R_{13}$ in formula (BkII-2), substituent group J can be exemplified, preferably a substituted or unsubstituted alkyl group, a substituted or unsubstituted aryl group, or a heterocyclic group, and more preferably an alkyl group, or an aryl group which is unsubstituted or substituted with an ionic hydrophilic group.

The compound represented by formula (BkII-2) is preferably a compound represented by formula (BkII-3).

Compounds represented by formula (BkII-3) and the salts thereof are described in detail below.

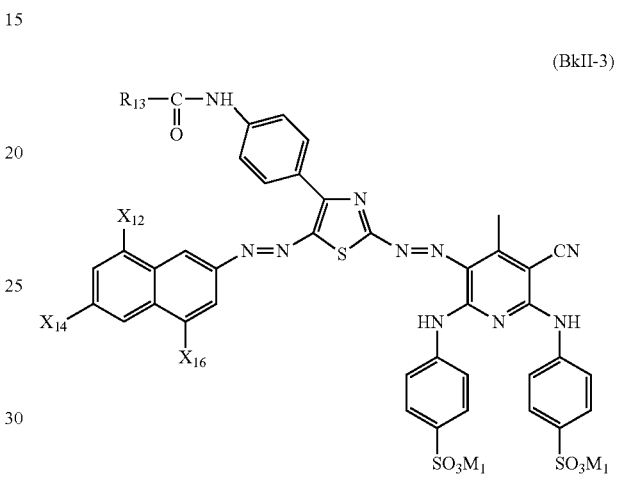

(BkII-3)

In formula (BkII-3), $R_{13}$ represents a monovalent substituent. Each of $X_{12}$, $X_{14}$ and $X_{16}$ independently represents a hydrogen atom or a monovalent substituent, provided that at least one of $X_{12}$, $X_{14}$ and $X_{16}$ represents an electron-withdrawing group having a Hammett's σp value of 0.3 or more; and $M_1$ represents a hydrogen atom or a monovalent counter cation.

In formula (BkII-3), $M_1$, $R_{12}$, $R_{13}$, $X_{12}$, $X_{14}$ and $X_{16}$ in formula (BkII-3) are respectively the same with $M_1$, $R_{12}$, $R_{13}$, $X_{12}$, $X_{14}$ and $X_{16}$ in formula (BkII-2), and preferred examples are also the same.

As the compound represented by formula (BkII-2) or (BkII-3), especially preferred combinations are the following (i) to (iv).

(i) As the monovalent substituent represented by $R_{13}$, substituent group J can be exemplified, preferably a substituted or unsubstituted alkyl group, a substituted or unsubstituted aryl group, or a heterocyclic group, and more preferably an alkyl group substituted with an ionic hydrophilic group, or an aryl group.

(ii) As the ionic hydrophilic group, —$SO_3M_{11}$ or —$CO_2M_{11}$ is preferred, —$SO_3M_{11}$ is more preferred, and —$SO_3Li$ is especially preferred.

(iii) Each of $M_1$ and $M_{11}$ independently represents a hydrogen atom or a monovalent counter cation. As the monovalent counter cation, e.g., an ammonium ion, an alkali metal ion (e.g., a lithium ion, a sodium ion, a potassium ion), and an organic cation (e.g., a tetramethylammonium ion, a tetramethylguanidium ion, a tetramethylphosphonium ion) are exemplified, preferably a lithium salt, a sodium salt, a potassium salt and an ammonium salt, more preferably a lithium salt and a mixed salt including a lithium salt as the main component, and most preferably a lithium salt.

(iv) At least one of $X_{12}$, $X_{14}$ and $X_{16}$ is preferably an ionic hydrophilic group, at least one of $X_{12}$, $X_{14}$ and $X_{16}$ is preferably an electron-withdrawing group having a Hammett's σp value of 0.3 or more, $X_{13}$ is more preferably an electron-withdrawing group having a Hammett's σp value of 0.3 or more, and each of $X_{12}$ and $X_{16}$ is more preferably an ionic hydrophilic group.

This structure is preferred for the factor that water solubility of the azo compounds represented by formulae (BkII-2) and (BkII-3) and aggregation property of the azo dyes in an aqueous solution are conspicuously improved and, in particular, preservation stability in an aqueous solution is heightened.

As a result, long term preservation stability of the azo dyes becomes possible and light fastness, thermal stability, wet heat stability, water resisting property, gas proof property and solvent resistance which are performances required of the ink are sharply improved and result in most preferred example.

The compound represented by formula (BkII-1) or (BkII-2) is preferably a compound represented by the following formula (BkII-4).

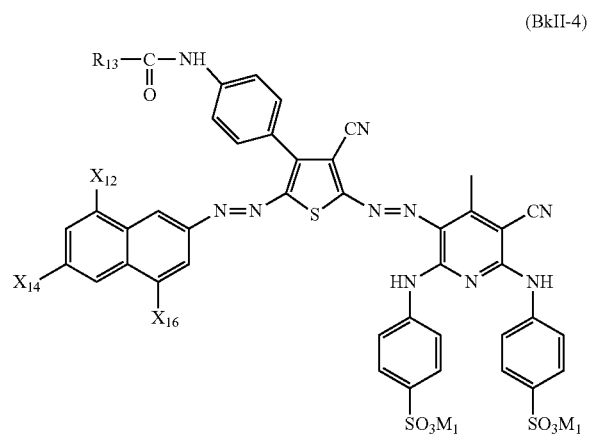

(BkII-4)

In formula (BkII-4), $R_{13}$ represents a monovalent substituent. Each of $X_{12}$, $X_{14}$ and $X_{16}$ independently represents a hydrogen atom or a monovalent substituent, provided that at least one of $X_{12}$, $X_{14}$ and $X_{16}$ represents an electron-withdrawing group having a Hammett's σp value of 0.3 or more; and each of $M_1$ independently represents a hydrogen atom or a monovalent counter cation.

$R_{13}$, $X_{12}$, $X_{14}$, $X_{16}$ and $M_1$ in formula (BkII-4) are respectively the same with $R_{13}$, $X_{12}$, $X_{14}$, $X_{16}$ and $M_1$ in formula (BkII-3), and preferred examples are also the same.

It is preferred that maximum absorption wavelength (λmax) of absorption spectrum of the compounds represented by any of formulae (BkII-1) to (BkII-4) measured with water as the solvent is 550 nm or more and 700 nm or less, and especially preferably 580 nm or more and 650 nm or less.

Further, it is preferred in the invention that the compounds represented by any of formulae (BkII-1) to (BkII-4) have at least 3 or more ionic hydrophilic groups, more preferably 3 to 6 ionic hydrophilic groups, and still more preferably 4 to 5 ionic hydrophilic groups, by which water solubility and aqueous solution preservation stability of the azo compounds of the invention are increased. Thus, the compounds of the invention can satisfy high levels of required performance as water-soluble dyes for inkjet recording black ink, and effective to further improve image quality of inkjet recorded matter in using as inkjet recording ink.

Further, in the invention, even when isotopes (e.g., $^2H$, $^3H$, $^{13}C$, $^{15}N$) are mixed in the compounds represented by formulae (BkII-1) to (BkII-4), the compounds are applicable.

The specific examples of the compounds represented by any of formulae (BkII-1) to (BkII-4) are shown below, but the invention is not restricted to these compounds.

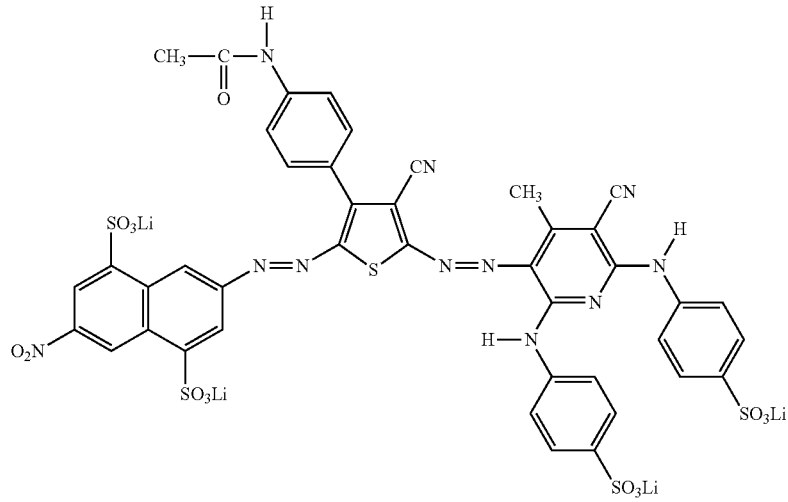

(BLACK-11)

(BLACK-12)

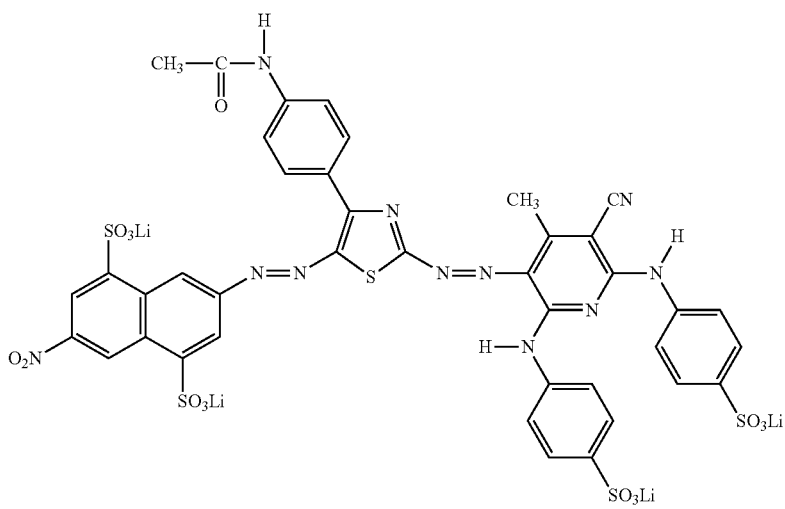

The azo compound represented by formula (BkII-1) can be synthesized by coupling reaction of a diazo component with a coupler, and the synthesis method is disclosed in JP-A-2003-306623.

[Compounds (Dyes) Represented by Formula (BkIII-1)]

The azo compounds represented by formula (BkIII-1) (hereinafter, "the compound represented by formula (BkIII-1) may be called) are described below.

(BkIII-1)

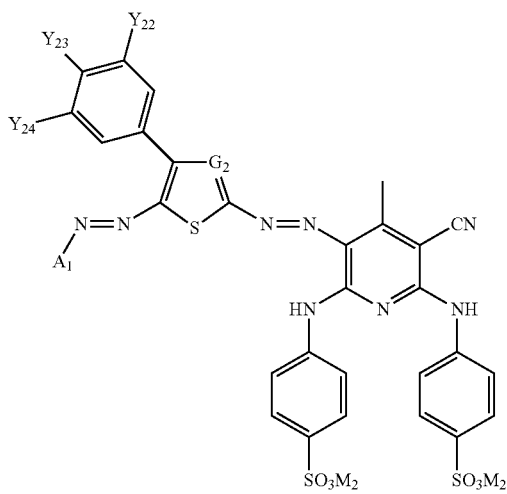

In formula (BkIII-1), $A_1$ represents an aryl group or a nitrogen-containing 5- or 6-membered heterocyclic group; $G_2$ represents a nitrogen atom or —$C(R_{22})$=; $R_{22}$ represents a hydrogen atom, a sulfo group, a carboxyl group, a substituted or unsubstituted carbamoyl group, or a cyano group; each of $Y_{22}$, $Y_{23}$ and $Y_{24}$ independently represents a hydrogen atom or a monovalent substituent, and $Y_{22}$, $Y_{23}$ and $Y_{24}$ may be bonded to each other to form a ring; and each of $M_2$ independently represents a hydrogen atom or a monovalent counter cation.

$G_2$ in formula (BkIII-1) represents a nitrogen atom or —$C(R_{22})$=. $R_{22}$ represents a hydrogen atom, a sulfo group, a carboxyl group, a substituted or unsubstituted carbamoyl group, or a cyano group. When the carbamoyl group has a substituent, an alkyl group (a methyl group, an ethyl group) and an aryl group (a phenyl group) can be exemplified as the substituents.

Each of $Y_{22}$, $Y_{23}$ and $Y_{24}$ independently represents a hydrogen atom or a monovalent substituent. When each of $Y_{22}$, $Y_{23}$ and $Y_{24}$ independently represents a substituent, substituent group J can be independently exemplified as the substituents.

In formula (BkIII-1), each of $Y_{22}$, $Y_{23}$ and $Y_{24}$ independently preferably represents a hydrogen atom, an ionic hydrophilic group, a substituted or unsubstituted carbamoyl group, a substituted or unsubstituted sulfamoyl group, a substituted or unsubstituted alkylsulfonylamino group, a substituted or unsubstituted arylsulfonylamino group, or an acylamino group, more preferably a hydrogen atom, an alkylsulfonylamino group having an ionic hydrophilic group as the substituent, an arylsulfonylamino group having an ionic hydrophilic group as the substituent, or an acylamino group having an ionic hydrophilic group as the substituent, and especially preferably a hydrogen atom, an arylsulfonylamino group having an ionic hydrophilic group as the substituent, or an acylamino group having an ionic hydrophilic group as the substituent.

When each of the carbamoyl group, sulfamoyl group, alkylsulfonylamino group, arylsulfonylamino group, and acylamino group represented by $Y_{22}$, $Y_{23}$ and $Y_{24}$ has a substituent, each of the substituents is independently more preferably selected from ionic hydrophilic groups (e.g., —$CO_2M_{11}$, —$SO_3M_{11}$, where $M_{11}$ is a monovalent counter cation).

$Y_{22}$, $Y_{23}$ and $Y_{24}$ may be bonded to each other to form a ring, and as the ring formed by $Y_{22}$, $Y_{23}$ and $Y_{24}$ by bonding, a benzene ring and a naphthalene ring are exemplified, and is preferably a benzene ring.

$Y_{22}$, $Y_{23}$ and $Y_{24}$ may further have a substituent, and as further substituents, a hydroxyl group, an aryl group which may have an ionic hydrophilic group, and a heterocyclic group can be exemplified.

$A_1$ represents an aryl group, or a single or a condensed heterocyclic group. The aryl group includes a substituted or unsubstituted aryl group. In further detail, aryl groups having substituent group J are exemplified.

$A_1$ preferably represents a substituted or unsubstituted aryl group having 6 to 30 carbon atoms, and more preferably a substituted or unsubstituted phenyl group. As the examples of the substituents, the groups described above in the item of the substituents are exemplified, and the above ionic hydrophilic groups and electron withdrawing groups having a Hammett's substituent constant σp value of 0.3 or more are preferred.

In the heterocyclic groups represented by $A_1$ are included substituted or unsubstituted heterocyclic groups. The heterocyclicaryl groups represented by $A_1$ are preferably monovalent groups obtained by removing one hydrogen atom from 5- or 6-membered, substituted or unsubstituted, aromatic or non-aromatic heterocyclic compounds, and more preferably 5- or 6-membered aromatic heterocyclic groups having 3 to 30 carbon atoms. As the examples of the substituents, the groups described above in the item of substituents J are exemplified. The examples of the heterocyclic groups represented by $A_1$ are shown below without restricting the substitution position: a pyrrole ring, a pyrazole ring, an imidazole ring, a triazole ring, a thiazole ring, an isothiazole ring, and a thiadiazole ring as 5-membered nitrogen-containing heterocyclic rings.

A pyridine ring, a pyrazine ring, a pyridazine ring, a pyrimidine ring and a triazine are exemplified as 6-membered nitrogen-containing heterocyclic rings without restricting the substitution position.

$A_1$ is preferably an aryl group having a substituent, more preferably an aryl group having an ionic hydrophilic group or an electron withdrawing groups having a Hammett's substituent constant σp value of 0.3 or more, and still more preferably a phenyl group having an ionic hydrophilic group or an electron withdrawing groups having a Hammett's substituent constant σp value of 0.3 or more.

As the ionic hydrophilic group in formula (BkIII-1), $—SO_3M_{11}$ or $—CO_2M_{11}$ is preferred, $—SO_3M_{11}$ is more preferred, and $—SO_3Li$ is especially preferred.

Each of $M_1$ and $M_{11}$ independently represents a hydrogen atom or a monovalent counter cation. As the monovalent counter cation, e.g., an ammonium ion, an alkali metal ion (e.g., a lithium ion, a sodium ion, a potassium ion), and an organic cation (e.g., a tetramethylammonium ion, a tetramethylguanidium ion, a tetramethylphosphonium ion) are exemplified, a lithium salt, a sodium salt, a potassium salt and an ammonium salt are preferred, a lithium salt and a mixed salt including a lithium salt as the main component are more preferred, and a lithium salt is most preferred.

As the compound represented by formula (BkIII-1), especially preferred combinations are the following (i) to (v).
(i) $G_2$ represents a nitrogen atom or $—C(R_{22})=$, and preferably $—C(R_{22})=$. $R_{22}$ represents a hydrogen atom, a sulfo group, a carboxyl group, a substituted or unsubstituted carbamoyl group, or a cyano group, preferably a carbamoyl group (a $—CONH_2$ group) or a cyano group, and more preferably a cyano group.
(ii) $A_1$ is preferably an aryl group having a substituent, more preferably an aryl group having an ionic hydrophilic group or an electron withdrawing groups having a Hammett's substituent constant σp value of 0.3 or more, and still more preferably a phenyl group having two ionic hydrophilic groups.
(iii) Each of $Y_{22}$, $Y_{23}$ and $Y_{24}$ independently preferably represents a hydrogen atom, an ionic hydrophilic group, a substituted or unsubstituted carbamoyl group, a substituted or unsubstituted sulfamoyl group, a substituted or unsubstituted alkylsulfonylamino group, a substituted or unsubstituted arylsulfonylamino group, or an acylamino group, more preferably a hydrogen atom, an ionic hydrophilic group, a substituted or unsubstituted alkylsulfonylamino group, a substituted or unsubstituted arylsulfonylamino group, or an acylamino group, and especially preferably a hydrogen atom, an arylsulfonylamino group having an ionic hydrophilic group as a substituent, or an acylamino group having an ionic hydrophilic group as a substituent.

Each of $Y_{22}$ and $Y_{24}$ independently most preferably represents a hydrogen atom, and $Y_{23}$ most preferably represents an arylsulfonylamino group having an ionic hydrophilic group as a substituent, or an acylamino group having an ionic hydrophilic group as a substituent.
(iv) As the ionic hydrophilic group, $—SO_3M_{11}$ or $—CO_2M_{11}$ is preferred, $—SO_3M_{11}$ is more preferred, and $—SO_3Li$ is especially preferred.
(v) Each of $M_1$ and $M_{11}$ independently represents a hydrogen atom or a monovalent counter cation. As the monovalent counter cation, e.g., an ammonium ion, an alkali metal ion (e.g., a lithium ion, a sodium ion, a potassium ion), and an organic cation (e.g., a tetramethylammonium ion, a tetramethylguanidium ion, a tetramethylphosphonium ion) are exemplified, preferably a lithium salt, a sodium salt, a potassium salt and an ammonium salt, more preferably a lithium salt and a mixed salt including a lithium salt as the main component, and most preferably a lithium salt.

This structure is preferred for the factor that water solubility of the azo compounds of formula (BkIII-1) is improved and azo dye structure capable of reconciling good hue and coloring property with high preservation stability can be electrolically and stereoscopically given.

As a result, preservation stability as an aqueous solution of the azo dye is improved, light fastness, thermal stability, wet heat stability, water resisting property, gas proof property and solvent resistance which are performances required of the ink are sharply improved and result in most preferred example.

The compound represented by formula (BkIII-1) is preferably a compound represented by the following formula (BkIII-2).

Compounds represented by formula (BkIII-2) and the salts thereof are described in detail below.

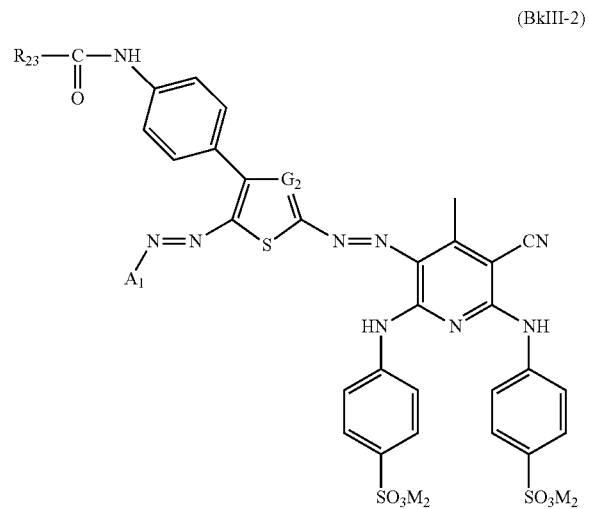

(BkIII-2)

In formula (BkIII-2), $G_2$ represents a nitrogen atom or $—C(R_{22})=$. $R_{22}$ represents a hydrogen atom, a sulfo group, a carboxyl group, a substituted or unsubstituted carbamoyl group, or a cyano group. $R_{23}$ represents a monovalent substituent. $A_1$ represents an aryl group or a 5-membered nitrogen-containing heterocyclic group. $M_2$ represents a hydrogen atom or a monovalent counter cation.

$G_2$, $R_{22}$ and $M_2$ in formula (BkIII-2) are respectively the same with $G_2$, $R_{22}$, $Y_{23}$ and $M_2$ in formula (BkIII-1), and preferred examples are also the same.

As the monovalent substituent represented by $R_{23}$ in formula (BkIII-2), substituent group J can be exemplified, preferably a substituted or unsubstituted alkyl group, a substituted or unsubstituted aryl group, or a heterocyclic group, and more preferably an alkyl group substituted with an ionic hydrophilic group, or an aryl group.

The compound represented by formula (BkIII-2) is preferably a compound represented by the following formula (BkIII-3).

Compounds represented by formula (BkIII-3) and the salts thereof are described in detail below.

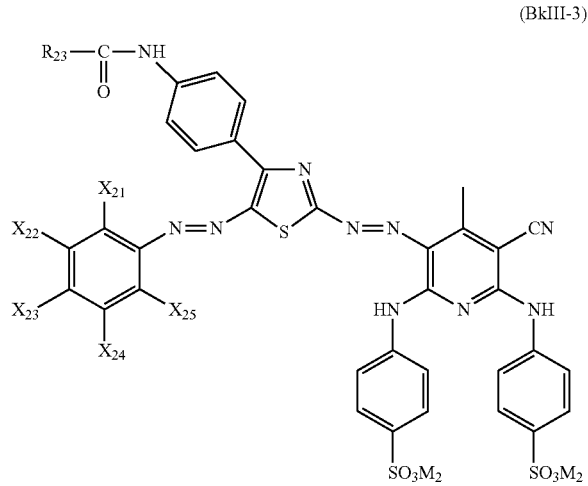

(BkIII-3)

In formula (BkIII-3), $R_{23}$ represents a monovalent substituent. Each of $X_{21}$, $X_{22}$, $X_{23}$, $X_{24}$ and $X_{25}$ independently represents a hydrogen atom or a monovalent substituent; and each of $M_2$ independently represents a hydrogen atom or a monovalent counter cation.

$M_2$ in formula (BkIII-3) is the same with $M_2$ in formula (BkIII-2) and preferred examples are also the same.

As the monovalent substituent represented by $R_{23}$ in formula (BkIII-3), substituent group J can be exemplified, preferably a substituted or unsubstituted alkyl group, a substituted or unsubstituted aryl group, or a heterocyclic group, and more preferably an alkyl group substituted with an ionic hydrophilic group, or an aryl group.

In formula (BkIII-3), each of $X_{21}$, $X_{22}$, $X_{23}$, $X_{24}$ and $X_{25}$ independently represents a hydrogen atom or a monovalent substituent. As the substituents in the case where each of $X_{21}$, $X_{22}$, $X_{23}$, $X_{24}$ and $X_{25}$ represents a monovalent substituent, substituent group J can be exemplified.

Each of $X_{21}$, $X_{22}$, $X_{23}$, $X_{24}$ and $X_{25}$ independently preferably represents a hydrogen atom, an ionic hydrophilic group, a cyano group, a substituted or unsubstituted alkylsulfonyl group, a substituted or unsubstituted arylsulfonyl group, a nitro group, a substituted or unsubstituted alkoxycarbonyl group, a substituted or unsubstituted carbamoyl group, or a substituted or unsubstituted sulfamoyl group, more preferably a hydrogen atom, an ionic hydrophilic group, a cyano group, a methanesulfonyl group, a phenylsulfonyl group, a nitro group, a methoxycarbonyl group, or a carbamoyl group, and especially preferably a hydrogen atom, an ionic hydrophilic group, or a cyano group.

In formula (BkIII-3), each of $X_{22}$ and $X_{24}$ independently preferably represents a hydrogen atom or an ionic hydrophilic group. Each of $X_{21}$, $X_{23}$ and $X_{25}$ independently preferably represents either a hydrogen atom or substituent group J, and it is preferred that at least one of $X_{21}$, $X_{23}$ and $X_{25}$ represents an electron-withdrawing group having a Hammett's σp value of 0.3 or more. The electron-withdrawing group has the least upper bound of the σp value of preferably 1.0 or less.

When at least one of $X_{21}$, $X_{23}$ and $X_{25}$ is an electron-withdrawing group having a Hammett's σp value in this range, it is possible to improve hue adjustment, light fastness and ozone gas resisting property of the azo compound, and effective in using as a water-soluble dye for inkjet recording black ink.

The specific examples of electron-withdrawing group having a Hammett's σp value of 0.3 or more include an acyl group, an acyloxy group, a carbamoyl group, an alkyloxycarbonyl group, an aryloxycarbonyl group, a cyano group, a nitro group, a dialkylphosphono group, a diarylphosphono group, a diarylphosphonyl group, an alkylsulfinyl group, an arylsulfinyl group, an alkylsulfonyl group, an arylsulfonyl group, a sulfonyloxy group, an acylthio group, a sulfamoyl group, a thiocyanate group, a thiocarbonyl group, a halogenated alkyl group, a halogenated alkoxy group, a halogenated aryloxy group, a halogenated alkylamino group, a halogenated alkylthio group, an aryl group substituted with other electron-withdrawing group having σp value of 0.3 or more, a nitro group, a heterocyclic group, a halogen atom, an azo group, and a selenocyanate group, preferably a cyano group, a methylsulfonyl group, a phenylsulfonyl group, a methoxycarbonyl group, a carbamoyl group, and a nitro group, and more preferably a cyano group, a methylsulfonyl group, and a nitro group.

From the viewpoint of hue, coloring property and preservation stability of an aqueous solution, it is more preferred that at least one of $X_{22}$, $X_{23}$ and $X_{24}$ is an ionic hydrophilic group, at least one of $X_1$ and $X_5$ is an electron-withdrawing group having a Hammett's σp value of 0.3 or more, it is preferred that $X_{21}$, $X_{23}$ and $X_{25}$ are ionic hydrophilic group, and each of $X_{22}$ and $X_{24}$ represents an ionic hydrophilic group. The ionic hydrophilic group is preferably —$SO_3M_{21}$ or —$CO_2M_{21}$ ($M_{21}$ is Li, K, Ca, Mg, Ba), more preferably $CO_2M_{21}$, and especially preferably —$CO_2Li$.

As the compound represented by formula (BkIII-3), especially preferred combinations are the following (i) to (iii).

(i) As the monovalent substituent represented by $R_{23}$, substituent group J can be exemplified, preferably a substituted or unsubstituted alkyl group, a substituted or unsubstituted aryl group, or a heterocyclic group, and more preferably an alkyl group substituted with an ionic hydrophilic group, or an aryl group.

(ii) As the ionic hydrophilic group, —$SO_3M_{21}$ or —$CO_2M_{21}$ is preferred, —$SO_3M_{21}$ is more preferred, and —$SO_3Li$ is especially preferred.

(iii) Each of $M_2$ and $M_{21}$ independently represents a hydrogen atom or a monovalent counter cation. As the monovalent counter cation, e.g., an ammonium ion, an alkali metal ion (e.g., a lithium ion, a sodium ion, a potassium ion), and an organic cation (e.g., a tetramethylammonium ion, a tetramethylguanidium ion, a tetramethylphosphonium ion) are exemplified, preferably a lithium salt, a sodium salt, a potassium salt and an ammonium salt, more preferably a lithium salt and a mixed salt including a lithium salt as the main component, and most preferably a lithium salt.

This structure is preferred for the factor that water solubility of the azo compounds represented by formulae (BkIII-3) and aggregation property of the azo dyes in an aqueous solution are conspicuously improved and, in particular, preservation stability in an aqueous solution is heightened.

As a result, long term preservation stability of the azo dyes becomes possible and light fastness, thermal stability, wet heat stability, water resisting property, gas proof property and solvent resistance which are performances required of the ink are sharply improved and result in most preferred example.

The compound represented by formula (BkIII-1) or (BkIII-2) is preferably a compound represented by the following formula (BkIII-4).

Compounds represented by formula (BkIII-4) and the salts thereof are described in detail below.

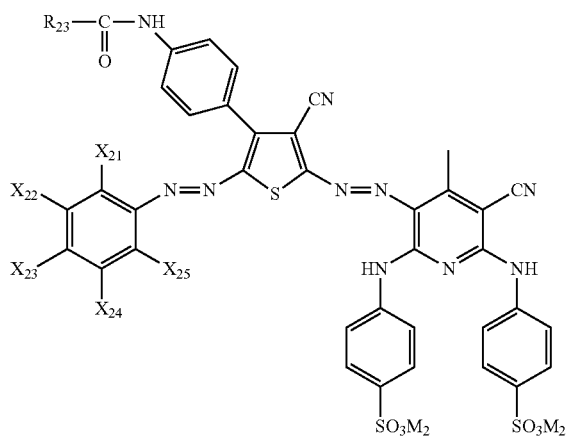

(BkIII-4)

In formula (BkIII-4), $R_{23}$ represents a monovalent substituent. Each of $X_{21}$, $X_{22}$, $X_{23}$, $X_{24}$ and $X_{25}$ independently represents a hydrogen atom or a monovalent substituent, and each of $M_2$ independently represents a hydrogen atom or a monovalent counter cation.

$R_{23}$ and $M_2$ in formula (BkIII-4) are respectively the same with $R_{23}$ and $M_2$ in formula (BkIII-3), and preferred examples are also the same.

It is preferred that maximum absorption wavelength ($\lambda$max) of absorption spectrum of the compounds represented by any of formulae (BkIII-1) to (BkIII-4) measured with water as the solvent is 550 nm or more and 700 nm or less, and especially preferably 580 nm or more and 650 nm or less.

Further, it is preferred in the invention that the compounds represented by any of formulae (BkIII-1) to (BkIII-4) have at least 3 or more ionic hydrophilic groups, more preferably 3 to 6 ionic hydrophilic groups, and still more preferably 4 to 5 ionic hydrophilic groups, by which water solubility and aqueous solution preservation stability of the azo compounds of the invention are increased. Thus, the compounds of the invention can satisfy high levels of required performance as water-soluble dyes for inkjet recording black ink, and effective to further improve image quality of inkjet recorded matter in using as inkjet recording ink.

Further, in the invention, even when isotopes (e.g., $^2$H, $^3$H, $^{13}$C, $^{15}$N) are mixed in the compounds represented by formulae (BkIII-1) to (BkIII-4), the compounds are applicable.

The specific examples of the compounds represented by any of formulae (BkIII-1) to (BkIII-4) are shown below, but the invention is not restricted to these compounds.

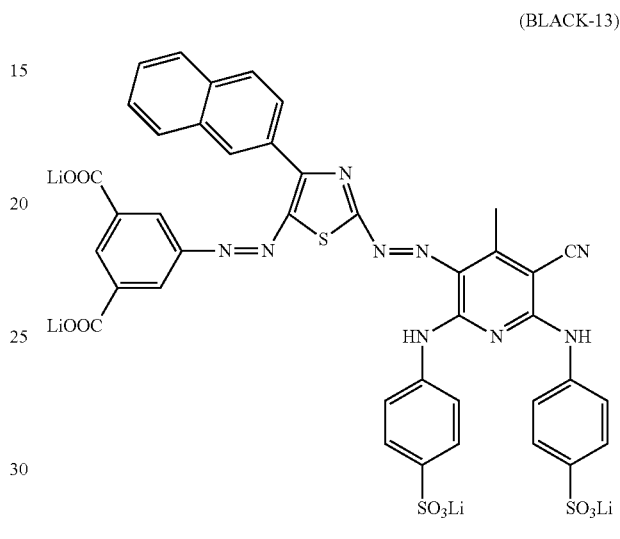

(BLACK-13)

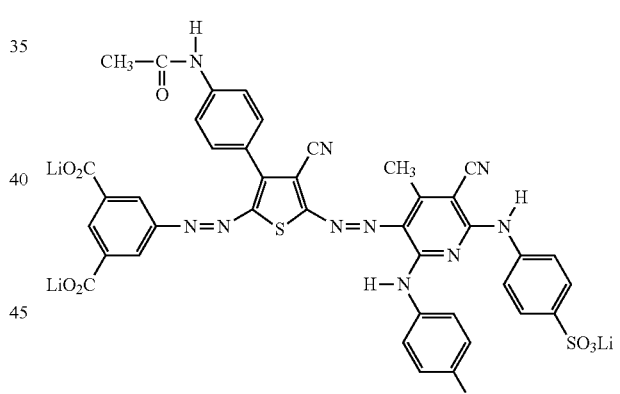

(BLACK-21)

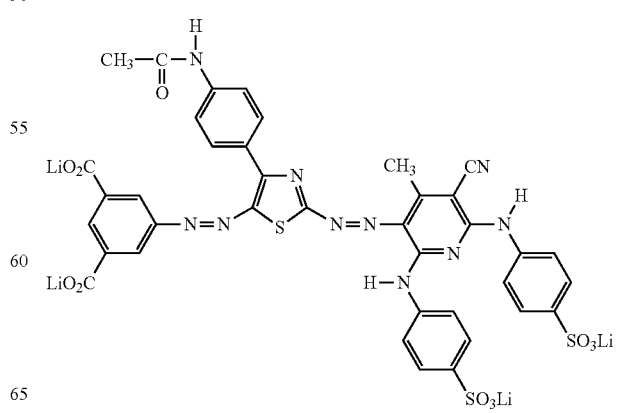

(BLACK-22)

(BLACK-23)
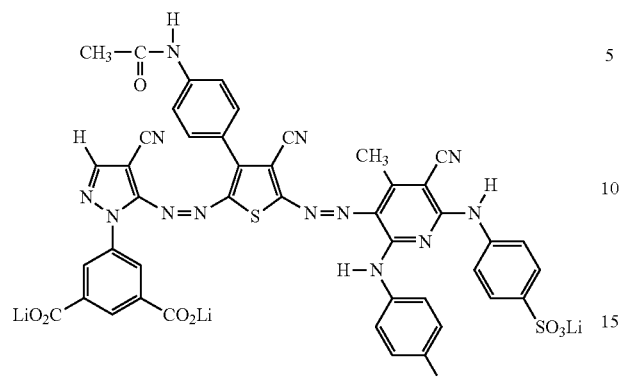
(BLACK-24)
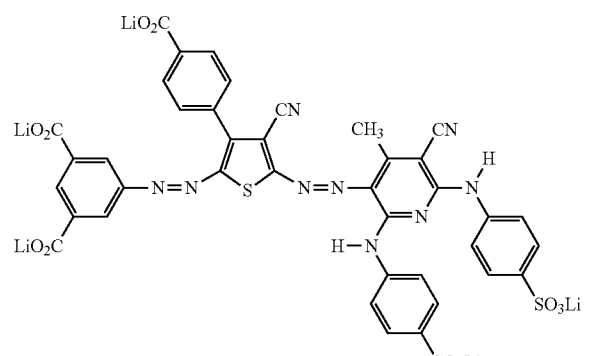
(BLACK-25)
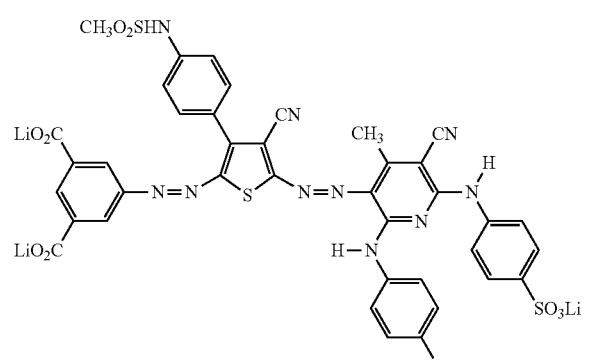
(BLACK-26)
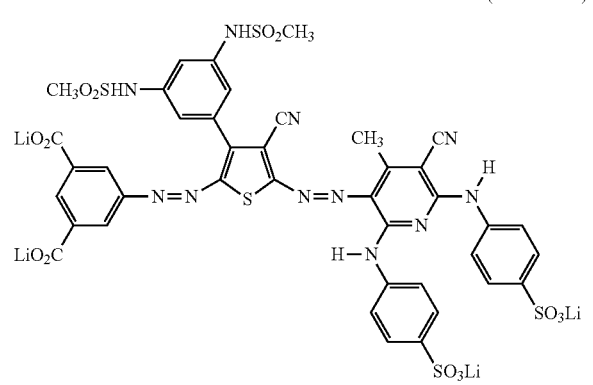
(BLACK-27)
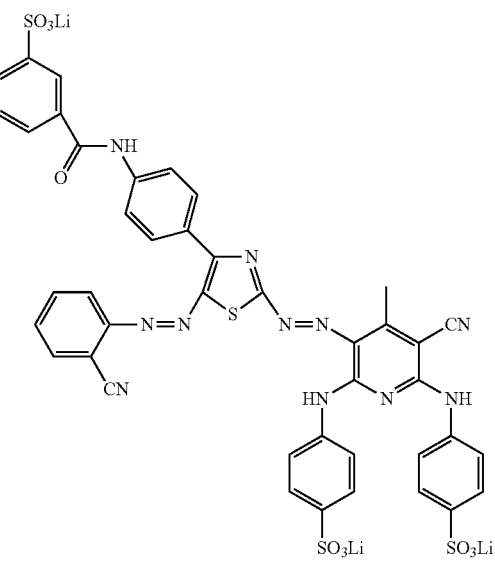
(BLACK-28)
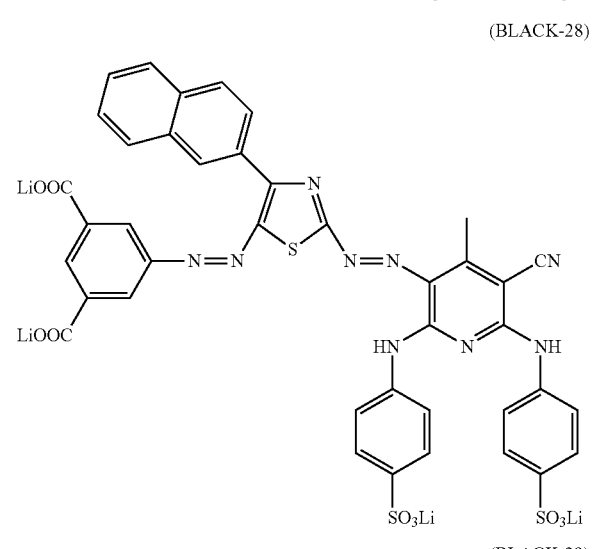
(BLACK-29)
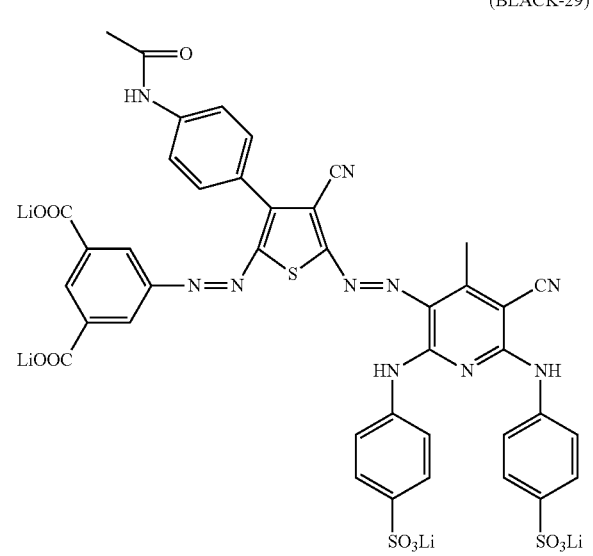

The azo compound represented by formula (BkIII-1) can be synthesized by coupling reaction of a diazo component with a coupler, and the synthesis method is disclosed in JP-A-2003-306623 and Japanese Patent Application 2003-353498.

Further, for the purpose of adjusting the hue or the like of a black ink composition, the compound represented by the following formula (B-11) and other yellow dyes can also be used in the invention in such an extent of not greatly damaging light fastness and ozone resistance.

Yellow dyes which are used in combination include, for example, C.I. Direct Yellow 8, 9, 11, 12, 27, 28, 29, 33, 35, 39, 41, 44, 50, 53, 59, 68, 87, 93, 95, 96, 98, 100, 106, 108, 109, 110, 130, 142, 144, 161, 163, C.I. Acid Yellow 17, 19, 23, 25, 39, 40, 42, 44, 49, 50, 61, 64, 76, 79, 110, 127, 135, 143, 151, 159, 169, 174, 190, 195, 196, 197, 199, 218, 219, 222, 227, C.I. Reactive Yellow 2, 3, 13, 14, 15, 17, 18, 23, 24, 25, 26, 27, 29, 35, 37, 41, 42, C.I. Basic Yellow 1, 2, 4, 11, 13, 14, 15, 19, 21, 23, 24, 25, 28, 29, 32, 36, 39, 40, but the invention is not restricted thereto.

Formula (B-11)

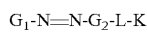

In formula (B-11), each of $G_1$ and $G_2$ independently represents an aryl group which may be substituted or a heterocyclic group which may be substituted; K represents an arbitrary substituent; and L represents a divalent linking group, provided that formula (B-11) has at least one ionic hydrophilic group.

As the examples of the aryl group, a benzene ring and a naphthalene ring can be exemplified, and N, O and S can be exemplified as the examples of the hetero atoms of the hetero ring. An aliphatic ring, an aromatic ring, or other hetero ring may be condensed to the hetero ring. The substituents may be an arylazo group or a heterocyclic azo group.

The compound represented by formula (B-11) is preferably a compound represented by the following formula (B-12).

Formula (B-12)

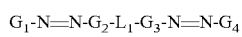

In formula (B-12), each of $G_1$, $G_2$, $G_3$ and $G_4$ independently represents an aryl group which may be substituted or a heterocyclic group which may be substituted; and $L_1$ represents a divalent linking group, provided that formula (B-12) has at least one ionic hydrophilic group.

The compound represented by formula (B-12) is preferably a compound represented by the following formula (B-13).

Formula (B-13)

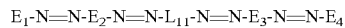

In formula (B-13), each of $E_1$, $E_2$, $E_3$ and $E_4$ independently represents an aryl group which may be substituted or a heterocyclic group which may be substituted; and $L_{11}$ represents a divalent linking group, provided that formula (B-13) has at least one ionic hydrophilic group.

The compound represented by formula (B-13) is preferably a compound represented by the following formula (B-14).

Formula (B-14)

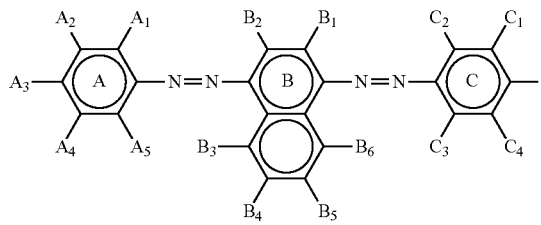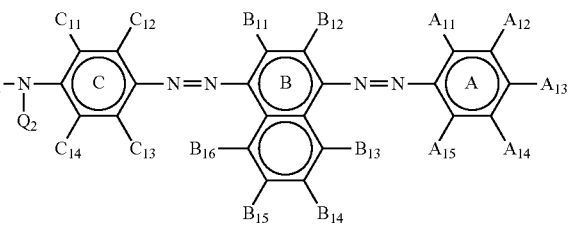

In formula (B-14), each of ring A, ring B, and ring C independently represents an aryl group which may be substituted or a heterocyclic group which may be substituted; each of $A_1$, $A_2$, $A_3$, $A_4$, $A_5$, $A_{11}$, $A_{12}$, $A_{13}$, $A_{14}$, $A_{15}$, $B_1$, $B_2$, $B_3$, $B_4$, $B_5$, $B_6$, $B_{11}$, $B_{12}$, $B_{13}$, $B_{14}$, $B_{15}$, $B_{16}$, $C_1$, $C_2$, $C_3$, $C_4$, $C_{11}$, $C_{12}$, $C_{13}$ and $C_{14}$ independently represents a hydrogen atom or a substituent, provided that formula (B-14) has at least one ionic hydrophilic group; and each of $Q_1$ and $Q_2$ independently represents a hydrogen atom or a substituent. $L_{12}$ represents a divalent linking group.

Formula (B-14) is explained below.

Each of $A_1$, $A_2$, $A_3$, $A_4$, $A_5$, $A_{11}$, $A_{12}$, $A_{13}$, $A_{14}$, $A_{15}$, $B_1$, $B_2$, $B_3$, $B_4$, $B_5$, $B_6$, $B_{11}$, $B_{12}$, $B_{13}$, $B_{14}$, $B_{15}$, $B_{16}$, $C_1$, $C_2$, $C_3$, $C_4$, $C_{11}$, $C_{12}$, $C_{13}$ and $C_{14}$ independently represents a hydrogen atom or a substituent. Preferred examples of the substituents include an ionic hydrophilic group, a halogen atom, a cyano group, a nitro group, a substituted or unsubstituted acylamino group, a substituted or unsubstituted sulfonylamino group, a substituted or unsubstituted alkyl group, a substituted or unsubstituted alkoxy group, a substituted or unsubstituted aryl group, a substituted or unsubstituted heterocyclic group, a substituted or unsubstituted alkylsulfonyl group, a substituted or unsubstituted arylsulfonyl group, a substituted or unsubstituted sulfamoyl group, and a substituted or unsubstituted carbamoyl group, preferably an ionic hydrophilic group, a halogen atom, a cyano group, a nitro group, a substituted or unsubstituted acylamino group, a substituted or unsubstituted alkyl group, a substituted or unsubstituted alkoxy group, a substituted or unsubstituted alkylsulfonyl group, a substituted or unsubstituted arylsulfonyl group, and a substituted or unsubstituted sulfamoyl group, more preferably an ionic hydrophilic group, a halogen atom, a cyano group, a nitro group, a substituted or unsubstituted acylamino group, and a substituted or unsubstituted alkyl group, and most preferably an ionic hydrophilic group.

The content of the compound represented by formula (BkII-1) or (BkIII-1) or a salt thereof in the black ink composition of the invention is preferably 0.5% by mass to 10% by mass to the gross mass of the black ink composition, and more preferably 1.0% by mass to 9.0% by mass.

The sum total of all the colorants contained in the black ink composition is preferably 0.5% by mass to 12% by mass to the gross mass of the black ink composition, and more preferably 1.0% by mass to 9.0% by mass.

When the total amount of the colorants contained in the black ink composition is 0.5% by mass or more and an image is recorded on a recording medium with the ink composition, sufficient coloring and high image density can be obtained. By making the total amount of the colorants 12% by mass or less, viscosity of the ink composition can be adjusted to a preferred value, ejecting amount of the ink composition from the inkjet heads can be stabilized, and clogging of the inkjet heads can be prevented.

(Ink Composition)

The colorants for use in each ink composition in the invention and the contents of the colorants in the ink composition are described above. Other components contained in each ink composition are described below.

Each ink composition in the invention can be obtained by dissolving the above-described colorant (dye) in a proper solvent. As the solvent for dissolving the colorant in each ink composition, it is preferred to use water, or a mixed solution of water and a water-soluble organic solvent as a main solvent. The examples of water that can be used include ion exchange water, ultrafiltered water, reverse osmosed water and distilled water. Further, it is preferred to use water subjected to various types of chemical sterilization treatments such as ultraviolet irradiation and addition of hydrogen peroxide from the viewpoint of long term preservation.

The content of water in each ink composition for constituting the ink set in the invention is preferably 40% by mass to 90% by mass based on the ink composition, and more preferably 50% by mass to 80% by mass.

As described above, each ink composition in the invention can contain water-soluble organic solvents as solvent with water. Water-soluble organic solvents capable of dissolving dyes and having vapor pressure lower than that of pure water are preferably used.

Water-soluble organic solvents preferably used in the invention include polyhydric alcohols, e.g., ethylene glycol, propylene glycol, butanediol, pentanediol, 1,3-hexanediol, 2-butene-1,4-diol, 2-methyl-2,4-pentanediol, glycerol, 1,2,6-hexanetriol, diethylene glycol, triethylene glycol, and dipropylene glycol, ketones, e.g., acetonylacetone, esters, e.g., γ-butyrolactone and triethyl phosphate, furfuryl alcohol, tetrahydrofurfuryl alcohol, and thiodiglycol, but the invention is not restricted thereto. By the use of water-soluble organic solvent with water as the solvent for ink composition, ejection stability of the ink composition from the ink heads can be improved, and adjustment such as lowering of viscosity of ink composition can be easily carried out with hardly affecting other characteristics.

The ink composition of the invention can contain at least one humectant selected from sugars in each ink composition of the invention. By the use of a humectant in the ink composition, evaporation of water content from the ink can be controlled to thereby humidify the ink when the ink composition is used in an inkjet recording method. The sugars that can be preferably used in the invention include maltitol, sorbitol, gluconolactone and maltose. In addition, there are cases where the above-described water-soluble organic solvents function as the humectants.

The above water-soluble organic solvent and/or humectant can be used in total of 5% by mass to 50% by mass in the ink composition, preferably 5% by mass to 30% by mass, and especially preferably 5% by mass to 20% by mass. By making the content of the water-soluble organic solvent and/or humectant 5% by mass or more, good moisture retention of ink can be obtained, while when by making the content 50% by mass or less, viscosity of the ink composition can be adjusted to suitable viscosity for use in an inkjet recording method.

It is preferred for the ink set in the invention to contain a betaine compound in the ink composition of each color according to necessity, and betaine-type surfactants having an oil-soluble group are especially preferably used. Of betaine compounds, a compound represented by the later-described formula is preferably used in the invention above all.

Betaine compounds used in the invention are preferably betaine-type surfactants having a surface activation property. The betaine compound means a compound having both cationic and anionic moieties in a molecule.

As the cationic moiety, an aminergic nitrogen atom, a nitrogen atom of a hetero-aromatic ring, a boron atom having four bonds to carbon, and a phosphorus atom can be exemplified. Of these, an aminergic nitrogen atom and a nitrogen atom of a hetero-aromatic ring are preferred. A quaternary nitrogen atom is especially preferred.

As the anionic moiety, a hydroxyl group, a thio group, a sulfonamido group, a sulfo group, a carboxyl group, an imido group, a phosphoric acid group and a phosphonic acid group can be exemplified. A carboxyl group and a sulfo group are especially preferred of these groups. Charge as the molecule at large may be any of cation, anion and neutral, but neutral is preferred.

The betaine compounds disclosed in JP-A-2005-298744, paragraphs [0033] to [0043], and the betaine compounds disclosed in JP-A-2006-56916 can be preferably used.

Preferred addition amount of betaine compound is not restricted so long as the amount is in the range of capable of exhibiting the effect of the invention, but is preferably 0.001% by mass to 50% by mass in the ink composition, and more preferably 0.01% by mass to 20% by mass. Two or more kinds of betaine compounds can be used in combination, and preferably in combination of the compound represented by formula W-1, W-2 or W-3. In particular, it is preferred to contain a compound in which R represents an alkyl group having 14 carbon atoms in formula W-1, W-2 or W-3. Further, when this combination is used, the purity (purity can be measured according to, e.g., LC-Mass) of the compound having an alkyl group having 14 carbon atoms is preferably 90% or more, especially preferably 95% or more, and most preferably 98% or more.

Further, when two or more kinds of compounds are used in combination, the compound of the maximum use amount can be used in mass ratio of 1 to 10,000 times the compound of the minimum use amount.

In the invention, it is particularly preferred to suppress the total mass of the inorganic ions mixed to the ink from the betaine compound and the like (in particular, a betaine surfactant) to 2% by mass or less based on the gross mass of the ink.

Inorganic ions here mean the sum of inorganic ions of the counter ions of a dye, inorganic ions resulting from inorganic salts contained in a betaine surfactant as impurities, inorganic ions to become the counter ions of ion component deviating from the ion equivalent of a betaine compound, inorganic ions introduced from inorganic salts used for pH adjustment, and inorganic ions introduced from additives of ink such as a chelating agent and an anticeptic. However, in the invention, ammonium ions are treated as the volatile compound and excluded from the inorganic ions.

It is the requisite in the invention that the gross of inorganic ions is 2% by mass or less of the ink, preferably 1% by mass or less, and especially preferably 0.5% by mass or less. For example, $Cl^-$ and $SO_4^{2-}$ resulting from NaCl or $Na_2SO_4$ are 100 ppm in 20 wt % aq. equivalent density, preferably 30 ppm, and more preferably 10 ppm (for example, quantitative analysis is possible by ion chromatography).

For reducing the content of inorganic ions in ink to the utmost, various means can be taken. For example, the methods disclosed in JP-A-2004-285269, paragraphs [0032] and can be used.

In the first place, a method of removing inorganic ions contained in the materials used in ink (for example, a betaine compound) at the time of the syntheses of the materials can be exemplified. In the case of water-soluble ink materials, there are many cases where a lot of ion-dissociating groups are introduced in particular for the purpose of improving water solubility. At this time, much amount of inorganic matters is contained in the synthesis of the material, or inorganic ions are inevitably introduced as counter ions. For excluding the ions of the former case, a method of desalting refinement by electrolytic dialysis with an ion selective permeation membrane, a method with an ion exchange resin, and desalting refinement by a gel filtration method can be performed.

Further, a method of positively exchanging ions at the time of synthesis can also be used. For example, a method of adding excess amount of ammonia or organic amines and exchanging with metal ions, and a method of exchanging inorganic ions with organic carboxylic acid in the case of anions can be exemplified. Further, as a desalting method at the time of synthesis, a removing method of positively precipitating the salts with organic solvents and then filtration can also be utilized.

In the second place, it is also preferred to perform the desalting refinement in the state of raw materials of ink, that is, in the state of a dense aqueous solution obtained by dissolving various kinds of materials in a solvent such as water (stock solution of ink). Desalting refinement of finished ink is also possible, if circumstances require.

The ink for use in the ink set of the invention is ink obtained by dissolving or dispersing a dye in water and water-soluble organic solvent. Water-soluble type ink by a water-soluble dye is preferred. In an ink set, ink having a betaine compound may be any color, and colorless ink may be prepared for a betaine compound.

Foams are generated in ink sometimes when the betaine compound of the invention is used. Since there is a case where the foams cause printing failure in inkjet recording, a compound having defoaming function is added to solve this problem.

As defoaming agents, various kinds of compounds, e.g., a Pluronic-based defoaming agent (a polyoxyethylene-polyoxypropylene-type defoaming agent), and a silicone-type defoaming agent can be used.

In the ink set in the invention, it is also preferred to add at least one selected from the group consisting of a naphthalene-based aromatic compound having a carboxyl group at the 2-position and the salt thereof to cyan and/or magenta ink composition. By the addition of at least one selected from the group consisting of a naphthalene-based aromatic compound having a carboxyl group at the 2-position and the salt thereof, generation of a bronzing phenomenon of the cyan ink composition can be prevented, and moisture resistance of the magenta ink composition can be improved. The bronzing phenomenon is known as a phenomenon generally occurring when high Duty printing, such as solid printing, is performed on a special inkjet recording medium (in particular, a glossy recording medium) with an ink composition containing a cyan dye, and a phenomenon that reddening occurs at the printed part. When a bronzing phenomenon occurs, color balance of image at large becomes uneven and image quality lowers, so that a good image cannot be obtained.

Of the naphthalene-based aromatic compounds having a carboxyl group at the 2-position used in the invention, as especially preferred compound, the alkali metal salt of a naphthalene-based aromatic compound having a carboxyl group at the 2-position is exemplified. Of the alkali metals, it is especially preferred to use a lithium salt. When a lithium salt is used, not only generation of the bronzing phenomenon can be prevented but also clogging of inkjet nozzles difficultly occurs.

The naphthalene-based aromatic compounds having a carboxyl group at the 2-position and the salts thereof include 2-naphthoic acid, 1-hydroxy-2-naphthoic acid, 3-hydroxy-2-naphthoic acid, 6-hydroxy-2-naphthoic acid, 4-hydroxybenzoic acid, 2,6-naphthalenedicarboxylic acid, 3-methoxy-2-naphthoic acid, 3-ethoxy-2-naphthoic acid, 3-propoxy-2-naphthoic acid, 6-methoxy-2-naphthoic acid, 6-ethoxy-2-naphthoic acid, and 6-propoxy-2-naphthoic acid, and salts thereof, especially lithium salts can be exemplified. Particularly preferred are 2-naphthoic acid and lithium salt thereof.

When the salt of a naphthalene-based aromatic compound having a carboxyl group at the 2-position is added to an ink composition, either of the following methods can be used: a method of adding the compound to ink in the form of a salt, a method of adding, to an ink composition, a naphthalene-based aromatic compound having a carboxyl group at corresponding 2-position and separately adding a base capable of forming a salt therewith. Further, at least one selected from the group consisting of a naphthalene-based aromatic compound having a carboxyl group at the 2-position and the salt thereof can be used in the invention, and both a naphthalene-based aromatic compound having a carboxyl group at the 2-position and the salt thereof can be used in combination.

When at least one selected from the group consisting of a naphthalene-based aromatic compound having a carboxyl group at the 2-position and the salt thereof (hereinafter referred to as a naphthalene-based aromatic compound having a carboxyl group at the 2-position) is added to the cyan ink composition and/or magenta ink composition, it is preferred that the naphthalene-based aromatic compound having a carboxyl group at the 2-position is contained in sum total of 0.1% by mass to 10% by mass in these ink compositions, and more preferably 0.5% by mass to 5% by mass. The amount of the naphthalene-based aromatic compound having a carboxyl group at the 2-position in the ink composition can be arbitrarily decided according to the kind of the compound itself, the kind of the dye contained in the ink composition, and the kind of the solvent used in the ink composition.

When the naphthalene-based aromatic compound having a carboxyl group at the 2-position is added to the cyan ink composition, the ratio of the content (% by mass) of the cyan dye contained in the ink composition to the content (% by mass) of the naphthalene-based aromatic compound having a carboxyl group at the 2-position is preferably in the range of 1:0.1 to 1:10, and more preferably 1:0.3 to 1:6. When the content of the cyan dye contained in the cyan ink composition is taken as 1, by making the content of the naphthalene-based aromatic compound having a carboxyl group at the 2-position more than 0.1, generation of a bronzing phenomenon can be lowered, and by making the content of the naphthalene-based aromatic compound having a carboxyl group at the 2-position less than 10, clogging of the inkjet nozzles can be prevented.

On the other hand, when the naphthalene-based aromatic compound having a carboxyl group at the 2-position is added to the magenta ink composition, the ratio of the content (% by mass) of the magenta dye contained in the ink composition to the content (% by mass) of the naphthalene-based aromatic compound having a carboxyl group at the 2-position is preferably in the range of 1:0.5 to 1:10, and more preferably 1:1 to 1:6. When the content of the magenta dye contained in the magenta ink composition is taken as 1, by making the content of the naphthalene-based aromatic compound having a carboxyl group at the 2-position more than 0.5, deterioration of image quality due to bleeding of the image under high humidity environment can be reduced, and by making the content of the naphthalene-based aromatic compound having a carboxyl group at the 2-position less than 10, clogging of the inkjet nozzles can be prevented.

Other preferred additives to be added to the ink composition for constituting the ink set in the invention are described below.

It is preferred for the ink composition constituting the ink set of the invention to contain a nonionic surfactant. By the addition of a nonionic surfactant, penetration of the ink composition to a recording medium becomes excellent and the ink composition can be rapidly fixed on the recording medium at the time of printing. It is preferred that a dot recorded by an ink composition on a recording medium is complete round as far as possible. By the addition of a nonionic surfactant to an ink composition, the circularity of the image formed by one dot can be heightened, thus the image quality of the obtained image can be improved.

As the nonionic surfactant for use in the invention, e.g., acetylene glycol surfactants are preferred, but the invention is not restricted thereto.

As the acetylene glycol surfactants, for example, SURFYNOL 465 (trade mark), SURFYNOL 104PG50 (trade mark), (trade names, manufactured by Air Products and Chemicals Inc.), OLFINE PD001 (trade mark), OLFINE E1010 (trade mark) (trade names, manufactured by Nisshin Chemical Industry Co., Ltd.) can be exemplified, and at least one selected from these is preferably added to the ink composition constituting the ink set of the invention.

In the invention, it is preferred to add nonionic surfactants to the ink composition preferably in an amount of 0.1% by mass to 5% by mass, and more preferably in an amount of 0.5% by mass to 2% by mass. By adding 0.1% by mass or more of nonionic surfactants to the ink composition, penetration of the ink composition to the recording medium is increased. By making the content of nonionic surfactants in the ink composition 5% by mass or less, the effect that the image formed by the ink composition on the recording medium difficultly bleeds can be obtained.

Besides nonionic surfactants, by the addition of glycol ethers as a penetration accelerator to the ink composition, not only penetration of the ink composition to the recording medium is improved but also bleeding of inks at the boundary of contiguous color inks decreases in color printing, so that a very sharp image can be obtained. Accordingly, it is preferred to add a penetration accelerator to the ink composition constituting the ink set of the invention.

The above glycol ethers preferably used in the invention as penetration accelerators include ethylene glycol monobutyl ether, diethylene glycol monobutyl ether, triethylene glycol monoethyl ether, propylene glycol monomethyl ether, dipropylene glycol monoethyl ether, propylene glycol monobutyl ether, dipropylene glycol monobutyl ether, and triethylene glycol monobutyl ether, but the invention is not restricted thereto. These glycol ethers are preferably contained in the ink composition in an amount of 3% by mass to 30% by mass, and more preferably 5% by mass to 15% by mass. By containing glycol ethers in an amount of 3% by mass or more, bleeding between contiguous inks decreases in color printing can be effectively prevented, while when by the addition amount of 30% by mass or less, generation of bleeding can be easily prevented and preservation stability of ink can be raised.

Materials selected from a pH adjustor, e.g., triethanolamine and alkali metal hydroxide, a water-soluble polymer, e.g., sodium alginate, a water-soluble resin, a fluorine surfactant, an antiseptic, an antifungal agent, a rust preventive, a dissolution assistant, an antioxidant, and an ultraviolet absorber can be added to the ink composition of the invention, if necessary. These components can be used by mixing one or two or more by different kinds If not necessary, they may not be added. Those skilled in the art can use selected preferred additives in preferred amounts without imparing the effect of the invention. Incidentally, when an insoluble matter is precipitated from the ink composition, the above dissolution assistant is used to dissolve the insoluble matter and maintain the ink composition homogeneous.

The above dissolution assistants include pyrrolidones, e.g., N-methyl-2-pyrrolidone and 2-pyrrolidone, ureas, e.g., urea, thiourea, and tetramethylurea, allophanates, e.g., allophanate and methyl allophanate, and biurets, e.g., biuret, dimethyl biuret, and tetramethyl biuret, but the invention is not restricted thereto. As the examples of antioxidants, L-ascorbic acid and salts thereof can be exemplified, but the invention is not restricted thereto.

As the antiseptics or an antifungal agents, sodium benzoate, sodium pentachlorophenol, sodium 2-pyridinethiol-1-oxide, sodium sorbate, sodium dehydroacetate, and 1,2-dibenzisothiazolin-3-one (PROXEL CRL, PROXEL BDN, PROXEL GXL, PROXEL XL2, and PROXEL TN (trade marks, manufactured by AVECLA)) can be exemplified, but the invention is not restricted thereto.

The pH adjustors include amines, e.g., diethanolamine, triethanolamine, propanolamine, and morpholine, and modified products thereof, metal hydroxides, e.g., potassium hydroxide, sodium hydroxide, and lithium hydroxide, ammonium salts, e.g., ammonium hydroxide, and quaternary ammonium hydroxide (tetramethyl ammonium), carbonates, e.g., potassium carbonate, sodium carbonate, and lithium carbonate, in addition, phosphates and the like can be exemplified, but the invention is not restricted thereto.

The ink composition for constituting the ink set of the invention is arbitrarily selected from the above components and prepared. The viscosity of the obtained ink composition at 20° C. is preferably less than 10 mPa·S. The surface tension of the ink composition of the invention at 20° C. is preferably 45 mN/m or less, and especially preferably 25 mN/m to 45 mN/m. By adjusting the viscosity and surface tension to these ranges, the ink composition having preferred characteristics for inkjet recording can be obtained. The adjustment of viscosity and surface tension can be done by the addition amounts of the solvents and various additives, and arbitrary selection of the kinds of additives.

The pH of the ink composition for constituting the ink set of the invention at 20° C. is preferably 7.0 to 10.5, and more preferably 7.5 to 10.0. By making the pH of the ink composition at 20° C. to 7.0 or more, peeling of co-precipitation of the inkjet head can be prevented and ejection of the ink composition from the inkjet head can be stabilized. Further, by adjusting the pH of the ink composition at 20° C. to 10.5 or less, deterioration of various kinds of members to which the ink composition is brought into contact, e.g., members for constituting ink cartridge and inkjet head, can be inhibited.

The ink composition in the invention is prepared by the method of thoroughly mixing and homogeneously dissolving various kinds of components contained in the ink composition, pressure-filtering with a membrane filter having a pore size of 0.8 μm, and further, subjecting the obtained solution to deaeration treatment with a vacuum pump, but the invention is not limited this method.

<Ink Cartridge, Inkjet Printer>

The ink set in the invention can be used as an ink cartridge for housing the ink composition integrally or independently, and is preferred for easiness of handling. The ink cartridge constituted by including ink sets is well known in this technical field, and can be manufactured according to known methods.

The inkjet printer of the invention contains the ink cartridge.

The ink set or ink cartridge of the invention can be used for general writing material, recorder and pen plotter, but to use in an inkjet recording method is especially preferred.

<Inkjet Recording Method>

The inkjet recording method capable of using the ink set or ink cartridge of the invention includes any recording method of ejecting the ink composition as droplets from fine nozzles and agglutinating the droplets on a recording medium. Specific examples of inkjet recording methods capable of using the ink composition of the invention are described below.

A first method is a method called an electrostatic suction method. An electrostatic suction method is a method of recording an image by applying strong electrical field between nozzles and accelerating electrode arranged in front of nozzles, continuously ejecting ink droplets from the nozzles, flying ink droplets onto a recording medium by applying printing data signal to deflecting electrodes during the ink droplets passing between the deflecting electrode, and fixing the ink on the recording medium, or a method of recording an image on a recording medium by fixing by ejecting ink droplets from the nozzles according to printing data signal not deflecting ink droplets. The ink set or ink cartridge of the invention is preferably used in electrostatic suction methods.

A second method is a method of ejecting ink droplets forcedly from the nozzles by applying pressure to ink solution by a small size pump at the same time by mechanically vibrating the nozzles by a quartz vibrator. Ink droplets jected from the nozzles are electrically charged simultaneously with ejection, and recording an image on a recording medium by applying printing data signal to deflecting electrodes during the ink droplets passing between the deflecting electrode and flying ink droplets onto the recording medium. The ink set or ink cartridge of the invention is also preferably used in this recording methods.

A third method is a method of recording an image on a recording medium by applying pressure and printing data signal to the ink solution at the same time with a piezoelectric element, ejecting ink droplets from the nozzles onto the recording medium. The ink set or ink cartridge of the invention is also preferably used in this recording methods.

A fourth method is a method of recording an image on a recording medium by heating and foaming an ink solution according to printing data signal with micro electrodes, expanding these foams, and ejecting the ink solution from the nozzles to the recording medium. The ink set or ink cartridge of the invention is also preferably used in this recording methods.

The ink set or ink cartridge of the invention is especially preferably used in the case of recording an image on a recording medium by using image recording method according to the inkjet method including the above four methods.

<Recorded Matter>

Recorded matters recorded with the ink set of the invention have excellent images of good color balance and further excellent in light fastness and ozone resistance.

EXAMPLES

The invention will be described more specifically with reference to examples, but the invention is not restricted thereto.

<Preparation of Each Ink Composition>

Each ink composition is prepared by stirring each composition as shown in Tables 1 to 6 below at room temperature for 30 minutes, and filtering the obtained solution through a membrane filter having a pore size of 1.0 μm. In Tables 1 to 6, the numerical value of each component is shown in % by mass with the mass of ink composition being 100%. "The rest" showing the amount of water is the amount to be 100% in total with the components other than water.

TABLE 1

Yellow Ink Composition

|  | Y-01 | Y-02 | Y-03 | Y-04 | Y-05 |
|---|---|---|---|---|---|
| Dye |  |  |  |  |  |
| YELLOW-1 | 5.0 |  |  |  |  |
| YELLOW-2 |  | 5.0 |  |  |  |
| YELLOW-3 |  |  | 5.0 |  |  |
| YELLOW-4 |  |  |  | 5.0 |  |
| YELLOW-5 |  |  |  |  | 2.0 |
| YELLOW-6 |  |  |  |  | 1.5 |
| Additive, Solvent |  |  |  |  |  |
| Glycerin | 9 | 9 | 9 | 9 | 10 |
| Triethylene glycol | 9 | 9 | 9 | 9 | 10 |
| TEGmBE | 9 | 9 | 9 | 9 | 10 |
| OLFINE E1010 |  |  |  |  | 1 |
| SURFYNOL 104PG50 | 1 | 1 | 1 | 1 |  |
| 2-Pyrrolidone | 2 | 2 | 2 | 2 |  |
| Urea | 1 | 1 | 1 | 1 |  |
| Triethanolamine | 0.7 | 0.7 | 0.7 | 0.7 | 0.1 |
| PROXEL XL2 | 0.5 | 0.5 | 0.5 | 0.5 | 0.3 |
| Water | The rest | The rest | The rest | The rest | The rest |

TABLE 2

Magenta Ink Composition

|  | M-01 | M-02 | M-03 | M-04 | M-05 |
|---|---|---|---|---|---|
| Dye |  |  |  |  |  |
| MAGENTA-1 | 3.2 |  |  |  |  |
| MAGENTA-2 |  | 3.2 |  |  |  |
| MAGENTA-3 |  |  | 3.2 |  |  |
| MAGENTA-4 |  |  |  | 3.0 |  |
| MAGENTA-5 |  |  |  |  | 4.0 |
| Additive, Solvent |  |  |  |  |  |
| Glycerin | 10 | 10 | 10 | 10 | 10 |
| Triethylene glycol | 2 | 2 | 2 | 6 | 6 |
| 1,2-Hexanediol | 1 | 1 | 1 |  |  |
| TEGmBE | 10 | 10 | 10 | 10 | 10 |

TABLE 2-continued

Magenta Ink Composition

|  | M-01 | M-02 | M-03 | M-04 | M-05 |
|---|---|---|---|---|---|
| OLFINE E1010 |  |  |  | 1 | 1 |
| Betaine-1 | 3.2 | 3.2 | 3.2 |  |  |
| SURFYNOL 104PG50 | 1 | 1 | 1 |  |  |
| 2-Pyrrolidone | 0.5 | 0.5 | 0.5 |  |  |
| Urea | 2 | 2 | 2 | 5 | 5 |
| Triethanolamine | 0.5 | 0.5 | 0.5 | 0.5 | 0.5 |
| LiOH-monohydrate | 1 | 1 | 1 |  |  |
| PROXEL XL2 | 0.5 | 0.5 | 0.5 | 0.3 | 0.3 |
| Water | The rest | The rest | The rest | The rest | The rest |

TABLE 3

Cyan Ink Composition

|  | C-01 | C-02 | C-03 | C-04 |
|---|---|---|---|---|
| Dye |  |  |  |  |
| CYAN-1 | 5 |  |  |  |
| CYAN-2 |  | 4.5 | 4 |  |
| CYAN-3 |  | 0.5 | 1 |  |
| CYAN-4 |  |  |  | 5 |
| Additive, Solvent |  |  |  |  |
| Glycerin | 11 | 11 | 11 | 5 |
| Triethylene glycol | 10 | 10 | 10 | 14 |
| 1,2-Hexanediol | 3.5 | 3.5 | 3.5 | 1 |
| TEGmBE | 9 | 9 | 9 | 9 |
| SURFYNOL 104PG50 | 1.1 | 1.1 | 1.1 | 1 |
| 2-Pyrrolidone | 3.5 | 3.5 | 3.5 |  |
| Urea | 1 | 1 | 1 |  |
| Triethanolamine | 0.5 | 0.5 | 0.5 | 0.5 |
| PROXEL XL2 | 0.3 | 0.3 | 0.3 | 0.3 |
| Water | The rest | The rest | The rest | The rest |

TABLE 4

Black Ink Composition

|  | B-01 | B-02 | B-03 | B-04 | B-05 | B-6 |
|---|---|---|---|---|---|---|
| Dye |  |  |  |  |  |  |
| BLACK-1 | 7.5 |  |  |  |  |  |
| BLACK-2 |  | 7.5 |  |  |  |  |
| BLACK-3 |  |  | 7.5 |  |  |  |
| BLACK-4 |  |  |  | 7.5 |  |  |
| BLACK-5 |  |  |  |  | 7.5 |  |
| BLACK-6 | 1 | 1 | 1 | 1 | 1 |  |
| BLACK-7 |  |  |  |  |  | 6 |
| Additive, Solvent |  |  |  |  |  |  |
| Glycerin | 10 | 10 | 10 | 10 | 10 | 8 |
| Triethylene glycol | 2 | 2 | 2 | 2 | 2 | 2 |
| 1,2-Hexanediol | 3 | 3 | 3 | 3 | 3 |  |
| TEGmBE | 8 | 8 | 8 | 8 | 8 |  |
| DEGmBE |  |  |  |  |  | 10 |
| OLFINE PD001 |  |  |  |  |  | 0.5 |
| SURFYNOL 104PG50 | 1 | 1 | 1 | 1 | 1 |  |
| 2-Pyrrolidone | 3 | 3 | 3 | 3 | 3 | 3 |
| Urea | 5 | 5 | 5 | 5 | 5 |  |
| Triethanolamine | 0.4 | 0.4 | 0.4 | 0.4 | 0.4 | 0.5 |
| PROXEL XL2 | 0.3 | 0.3 | 0.3 | 0.3 | 0.3 | 0.3 |
| Water | The rest | The rest | The rest | The rest | The rest | The rest |

TABLE 5

Light Magenta Ink Composition

|  | LM-01 | LM-02 | LM-03 | LM-04 |
|---|---|---|---|---|
| Dye |  |  |  |  |
| MAGENTA-1 | 1 |  |  |  |
| MAGENTA-2 |  | 1 |  |  |
| MAGENTA-4 |  |  | 2 |  |
| MAGENTA-5 |  |  |  | 2 |
| Additive, Solvent |  |  |  |  |
| Glycerin | 12 | 12 | 10 | 10 |
| Triethylene glycol | 10 | 10 | 9 | 9 |
| 1,2-Hexanediol | 3 | 3 |  |  |
| TEGmBE | 11 | 11 | 10 | 10 |
| OLFINE E1010 |  |  | 1 | 1 |
| Betaine-1 | 1 | 1 |  |  |
| SURFYNOL 104PG50 | 1 | 1 |  |  |
| 2-Pyrrolidone | 3 | 3 |  |  |
| Urea | 2 | 2 |  |  |
| Triethanolamine | 0.7 | 0.7 | 0.5 | 0.5 |
| PROXEL XL2 | 0.3 | 0.3 | 0.3 | 0.3 |
| Water | The rest | The rest | The rest | The rest |

TABLE 6

Light Cyan Ink Composition

|  | LC-01 | LC-02 | LC-03 |
|---|---|---|---|
| Dye |  |  |  |
| CYAN-2 | 1.7 |  |  |
| CYAN-3 |  | 1.7 |  |
| CYAN-4 |  |  | 1.7 |
| Additive, Solvent |  |  |  |
| Glycerin | 12 | 12 | 10 |
| Triethylene glycol | 5 | 5 | 10 |
| 1,2-Hexanediol |  |  | 1 |
| TEGmBE | 10 | 10 | 9 |
| SURFYNOL 104PG50 | 1 | 1 | 1 |
| 2-Pyrrolidone | 2 | 2 | 3 |
| Urea | 2 | 2 |  |
| Triethanolamine | 0.2 | 0.2 | 0.2 |
| PROXEL XL2 | 0.3 | 0.3 | 0.3 |
| Water | The rest | The rest | The rest |

The details of the compounds used in each ink composition are shown below.

TEGmBE: Triethylene glycol monobutyl ether

DEGmBE: Diethylene glycol monobutyl ether

OLFINE E1010: Acetylene glycol surfactant (manufactured by Nisshin Chemical Industry Co., Ltd.)

OLFINE PD001: Acetylene glycol surfactant (manufactured by Nisshin Chemical Industry Co., Ltd.)

SURFYNOL 104PG50: Acetylene glycol surfactant (manufactured by Air Products and Chemicals Inc.)

PROXEL XL2: 1,2-Dibenzothiazolin-3-one (manufactured by Fuji Film Arch Inc.)

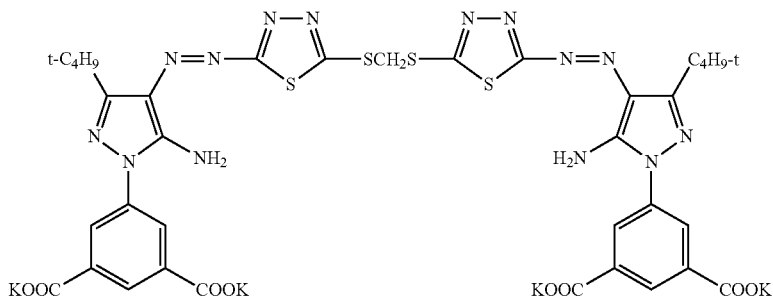
(YELLOW-1)
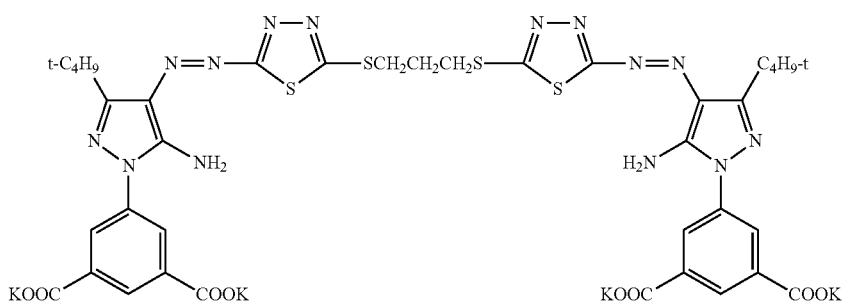
(YELLOW-2)
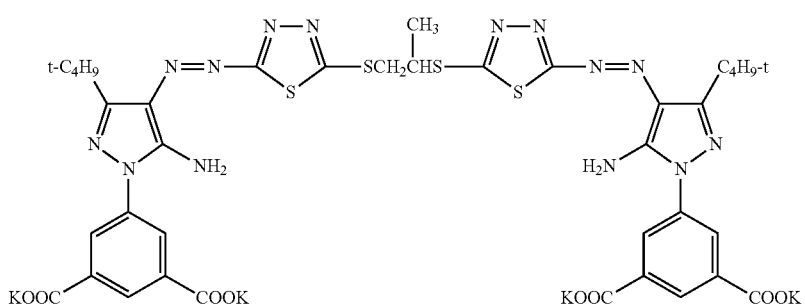
(YELLOW-3)
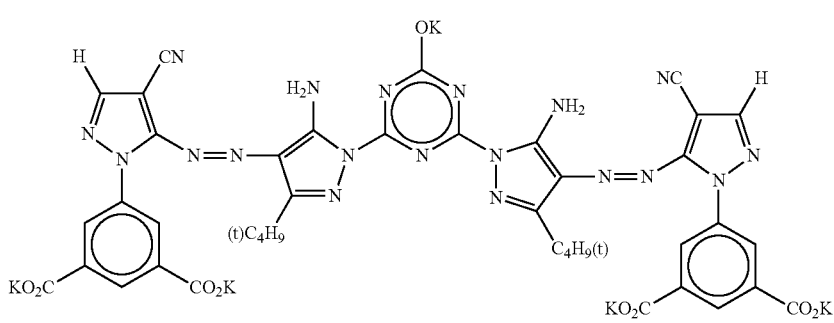
(YELLOW-4)
(YELLOW-5) C.I. Direct Yellow 132
(YELLOW-6) C.I. Direct Yellow 86

(MAGENTA-1)
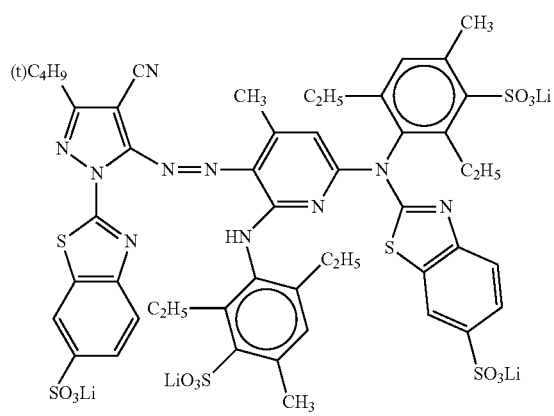
(MAGENTA-2)
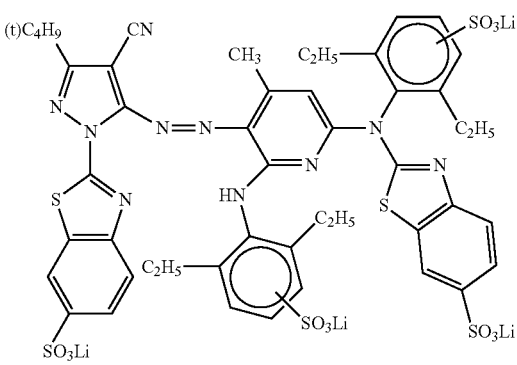
(MAGENTA-3)
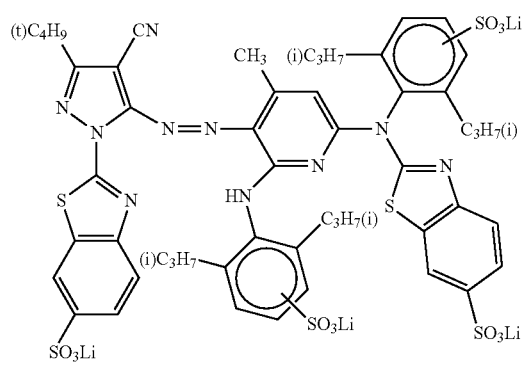
(MAGENTA-4)
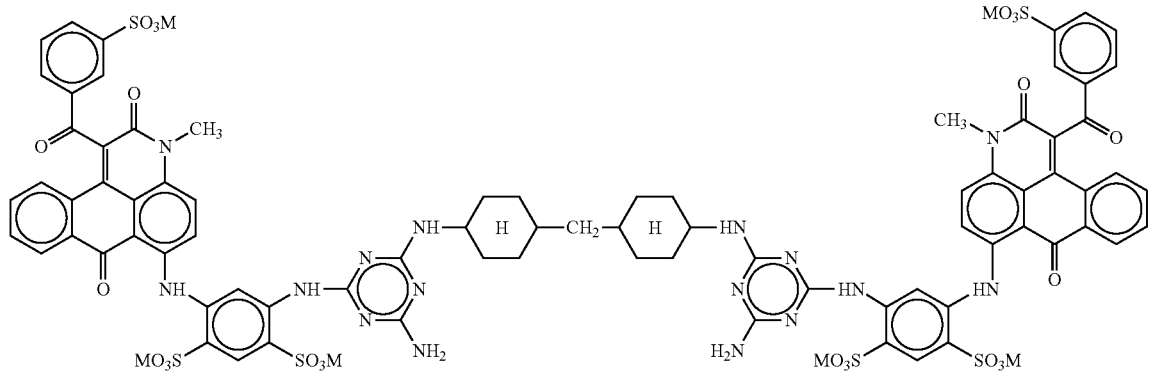
(M = NH$_4$ or Na)
(MAGENTA-5)
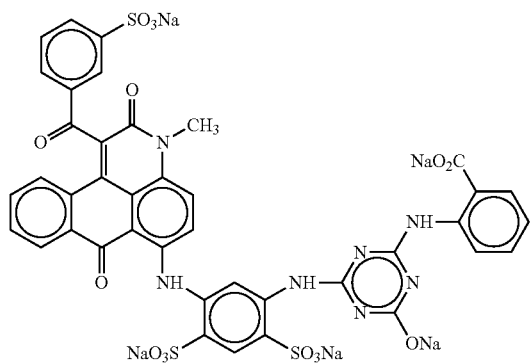
(Betaine-1)
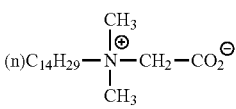

-continued
(CYAN-1)
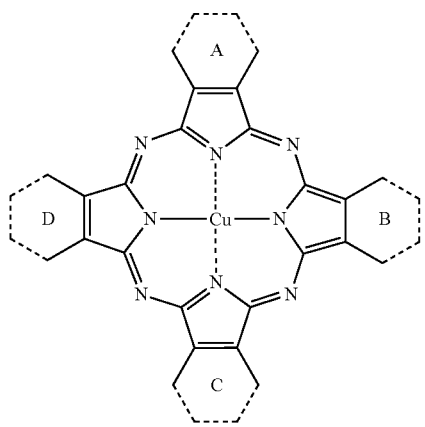
One of rings A to D:
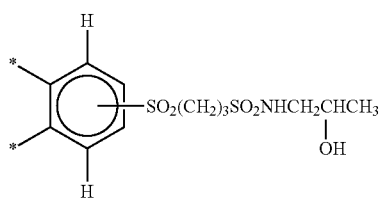
The remaining three:
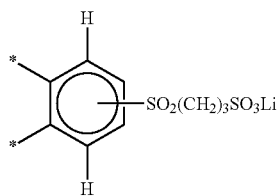
is the bonding position of the phthalocyanine ring.
Two of rings A to D:
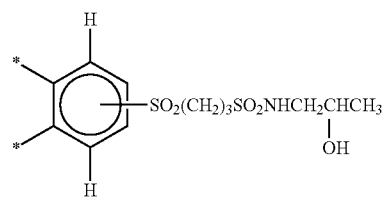
The remaining two:
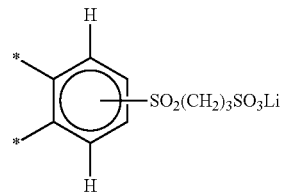
is the bonding position of the phthalocyanine ring.
(CYAN-2)
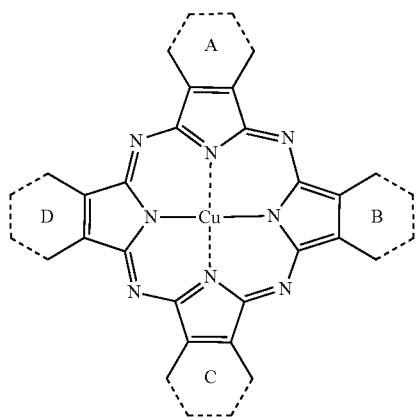
(CYAN-3)
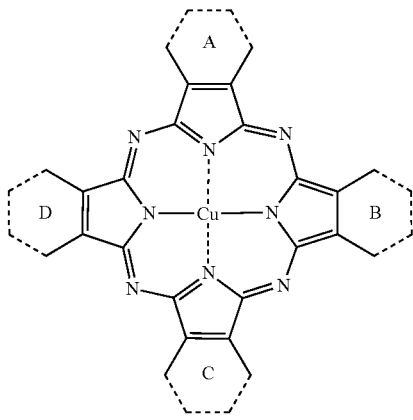

One of rings A to D:
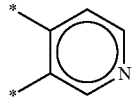
The remaining three:
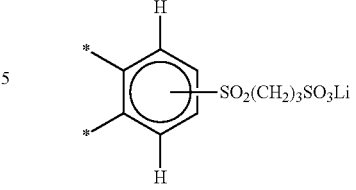
* is the bonding position of the phthalocyanine ring.
(CYAN-4)
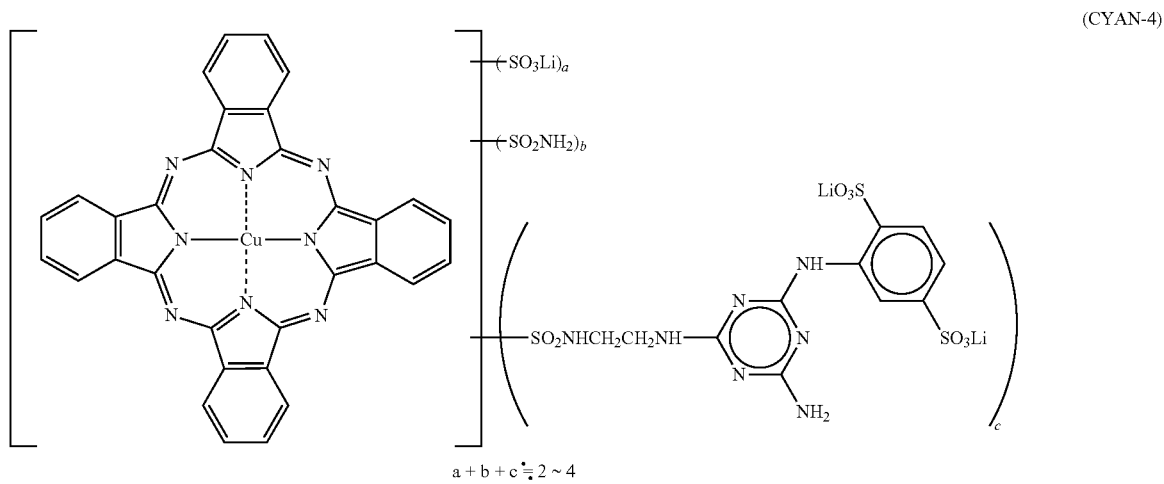
(BLACK-1)
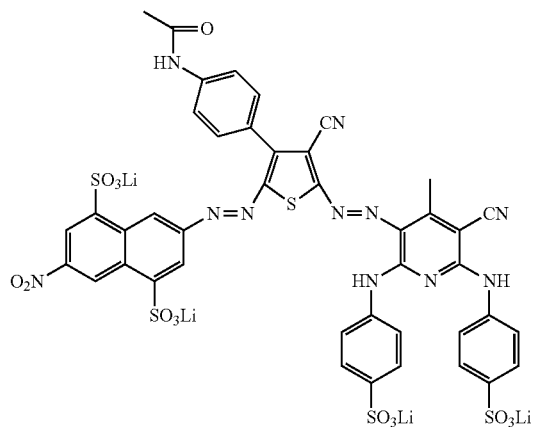
(BLACK-2)
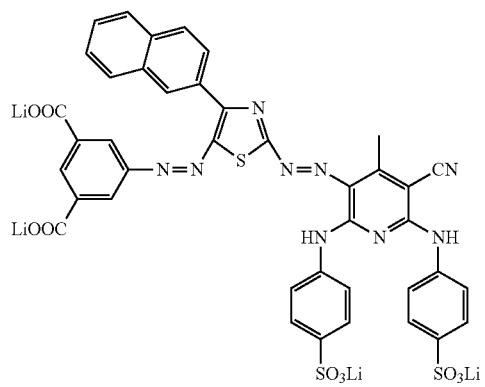

-continued

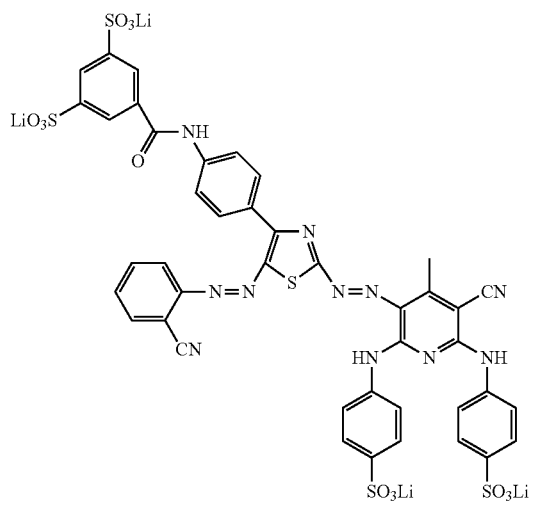
(BLACK-3)

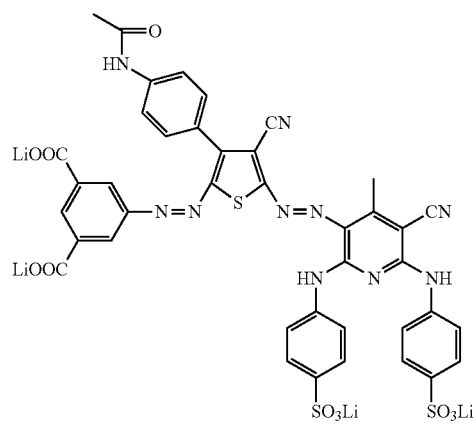
(BLACK-4)

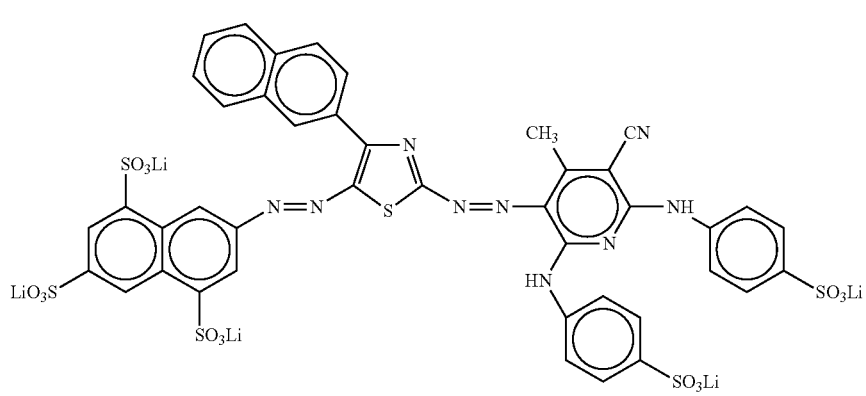
(BLACK-5)

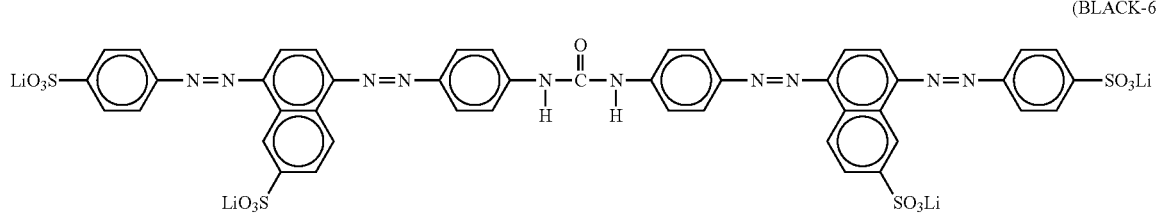
(BLACK-6)

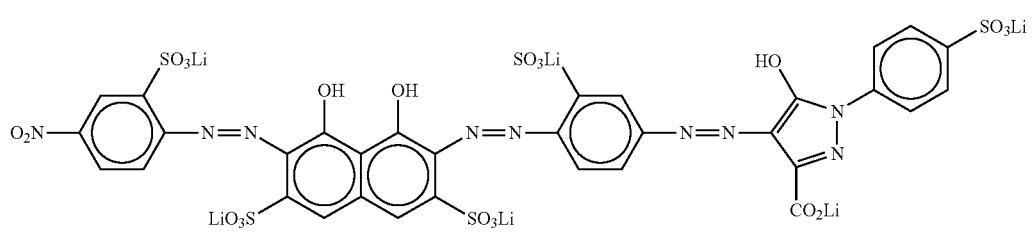
(BLACK-7)

In the next place, each ink set in Examples 1 to 4 and Comparative Examples 1 to 3 including yellow (Y), magenta (M) and cyan (C) with each ink composition is prepared by the combination as shown in Table 7 below. Incidentally, the combined ink sets shown in Table 7 do not contain a black ink composition and a light ink composition, i.e., light magenta ink composition and light cyan ink composition.

TABLE 7

|  | Y | M | Cy |
|---|---|---|---|
| Example 1 | Y-01 | M-01 | C-01 |
| Example 2 | Y-02 | M-01 | C-01 |
| Example 3 | Y-03 | M-01 | C-01 |

TABLE 7-continued

|  | Y | M | Cy |
|---|---|---|---|
| Example 4 | Y-01 | M-02 | C-02 |
| Comparative Example 1 | Y-04 | M-01 | C-01 |
| Comparative Example 2 | Y-05 | M-04 | C-04 |
| Comparative Example 3 | Y-05 | M-05 | C-04 |

In regard to the ink set shown in Table 7, preservation tability of ink of each ink composition in each ink set is evaluated as follows.

By using inkjet printer Stylus Color 880 (trade name, manufactured by Seiko Epspon Corporation) and each ink set shown in Table 7, monochromatic image pattern of each color of yellow, magenta and cyan, whose density is stepwise changed so that OD value of each color is 0.7 to 1.8, and image patterns of green, red and gray are printed on a special recording medium for inkjet recording (photographic paper <Kohtaku> (glossy)) (trade name, manufactured by Seiko Epspon Corporation).

<Preservation Stability of Ink>

Each ink composition is put in a sealed container and preserved at room temperature (18 to 20° C.) for one month and preservation stability is confirmed. Dye content in the ink before and after preservation is measured by high performance liquid chromatography and evaluated as dye residual rate by three grades. Dye residual rate of 90% or more is graded A, 80% or more and less than 90% is B, and less than 80% is C. The higher the dye residual rate, the more excellent is the ink preservation stability. The results of evaluation are shown in Table 8 below.

<Light Fastness>

Glossy paper on which an image is formed is irradiated with a xenon lamp (100,000 lux) for 28 days. Image density before and after xenon irradiation is measured with a reflection densitometer (X-Rite310TR) and OD value of monochromatic image of each color is measured. Reflection density is measured at three points of 0.7, 1.0 and 1.8. Residual optical density rate (ROD) is found from the obtained result according to the following equation: ROD (%)=(D/Do)×100 (in the equation, D is OD value after light irradiation, and Do is OD value before light irradiation).

Evaluation is performed by four grades. The case where ROD is 85% or more at any density is graded A, the case where ROD is less than 85% at any one point of density is graded B, the case where ROD is less than 85% at any two points of density is C, and the case where ROD is less than 85% at all the points of density is D.

The less the reduction of ROD even by long term exposure to light, the higher is light fastness. The results of evaluation are shown in Table 8 below.

From the results of evaluation of light fastness of each color, light fastness of each ink set is graded by the following criteria of judgment. The results of evaluation obtained are shown in Table 9 below as "light fastness of ink set".

A: Light fastness evaluation is graded A as to all of three colors.
B: Light fastness evaluation is graded B as to one or more of three colors, and the remaining colors are all A.
C: Light fastness evaluation is graded C as to one or more of three colors, and the remaining colors are all A or B
D: Light fastness evaluation is graded D as to one or more of three colors.

In regard to the difference in a change in ROD (color balance) between each color of the printed matter caused by exposure to light, every ink set is evaluated by the following criteria of judgment.
A: The difference between the maximum value and the minimum value of ROD of each color (hereinafter, merely referred to as "difference in ROD" in the description of this evaluation method) is less than 15 points (15%) even after the elapse of 28 days from the beginning of light irradiation.
B: Difference in ROD is 15 points after the elapse of 14 to 28 days from the beginning of light irradiation.
C: Difference in ROD is 15 points after the elapse of 7 to 14 days from the beginning of light irradiation.
D: Difference in ROD is 15 points within 7 days after the beginning of light irradiation.

In this evaluation, those little in the difference in ROD are excellent as a recorded matter. The results of evaluation obtained are shown in Table 9 below as "color balance".

<Ozone Resistance>

Glossy paper on which an image is formed is left to stand for 14 days on the condition set at ozone gas density of 5 ppm (25° C., 60% RH). Image density before and after being left to stand under ozone gas is measured with a reflection densitometer (X-Rite310TR) and OD value of monochromatic image of each color is measured. Reflection density is measured at three points of 0.7, 1.0 and 1.8. Residual optical density rate (ROD) is found from the obtained result according to the following equation: ROD (%)=(D/Do)×100 (in the equation, D is OD value after being left to stand under ozone gas, and Do is OD value before being left to stand under ozone gas).

Evaluation is performed by four grades. The case where ROD is 85% or more at any density is graded A, the case where ROD is less than 85% at any one point of density is graded B, the case where ROD is less than 85% at any two points of density is C, and the case where ROD is less than 85% at all the points of density is D.

The less the reduction of ROD even by long term exposure to ozone gas, the higher is ozone resistance. The results of evaluation obtained are shown in Table 8 below From the results of evaluation of ozone resistance of each color, ozone resistance of each ink set is graded by the following criteria of judgment. The results of evaluation obtained are shown in Table 9 below as "ozone resistance of ink set".
A: Ozone resistance evaluation is graded A as to all of three colors.
B: Ozone resistance evaluation is graded B as to one or more of three colors, and the remaining colors are all A.
C: Ozone resistance evaluation is graded C as to one or more of three colors, and the remaining colors are all A or B
D: Ozone resistance evaluation is graded D as to one or more of three colors.

In regard to the difference in a change in ROD (color balance) between each color of the printed matter caused by exposure to ozone, every ink set is evaluated by the following criteria of judgment.
A: The difference between the maximum value and the minimum value of ROD of each color (hereinafter, merely referred to as "difference in ROD" in the description of this evaluation method) is less than 15 points (15%) even after the elapse of 14 days from the beginning of standing under ozone gas.
B: Difference in ROD is 15 points after the elapse of 7 to 14 days from the beginning of standing under ozone gas.

C: Difference in ROD is 15 points after the elapse of 3 to 7 days from the beginning of standing under ozone gas.
D: Difference in ROD is 15 points within 3 days after the beginning of standing under ozone gas.

In this evaluation, those little in the difference in ROD are excellent as a recorded matter. The results of evaluation obtained are shown in Table 9 below as "color balance".

TABLE 8

| Example No. | Ozone Resistance | | | Light Fastness | | | Preservation Stability of Ink | | |
|---|---|---|---|---|---|---|---|---|---|
| | Y | M | Cy | Y | M | Cy | Y | M | Cy |
| Example 1 | A | A | A | A | A | A | A | A | A |
| Example 2 | A | A | A | A | A | A | A | A | A |
| Example 3 | A | A | A | A | A | A | A | A | A |
| Example 4 | A | A | A | A | A | A | A | A | A |
| Comparative Example 1 | B | A | A | B | A | A | C | A | A |
| Comparative Example 2 | D | D | D | D | D | C | B | A | B |
| Comparative Example 3 | D | D | D | D | D | C | B | A | B |

TABLE 9

| Example No. | Ozone Resistance | Color Balance | Light Fastness | Color Balance |
|---|---|---|---|---|
| Example 1 | A | A | A | A |
| Example 2 | A | A | A | A |
| Example 3 | A | A | A | A |
| Example 4 | A | A | A | A |
| Comparative Example 1 | B | B | B | B |
| Comparative Example 2 | D | B | D | C |
| Comparative Example 3 | D | B | D | C |

Each ink set in Examples 5 to 11 and Comparative Examples 4 to 6 is prepared by the combination of the ink compositions as shown in Table 10 below with each ink composition as shown in Tables 1 to 4.

TABLE 10

| Example No. | Y | M | Cy | Bk |
|---|---|---|---|---|
| Example 5 | Y-01 | M-01 | C-01 | B-01 |
| Example 6 | Y-02 | M-01 | C-01 | B-01 |
| Example 7 | Y-03 | M-01 | C-01 | B-01 |
| Example 8 | Y-01 | M-01 | C-01 | B-02 |
| Example 9 | Y-01 | M-01 | C-01 | B-03 |
| Example 10 | Y-01 | M-01 | C-01 | B-04 |
| Example 11 | Y-01 | M-02 | C-02 | B-01 |
| Comparative Example 4 | Y-04 | M-01 | C-01 | B-05 |
| Comparative Example 5 | Y-05 | M-04 | C-04 | B-06 |
| Comparative Example 6 | Y-05 | M-05 | C-04 | B-06 |

Preservation stability of ink of each ink composition in the ink sets of Examples 5 to 11 and Comparative Examples 4 to 6 is evaluated in the same manner as in Examples 1 to 4 and Comparative Examples 1 to 3.

By using inkjet printer Stylus Color 880 (trade name, manufactured by Seiko Epspon Corporation) and with each ink set, monochromatic image pattern of each color of yellow (Y), magenta (M), cyan (Cy) and black (Bk), whose density is stepwise changed so that OD value of each color is 0.7 to 1.8, and image patterns of green, red and gray are printed on a special recording medium for inkjet recording (photographic paper <Kohtaku> (glossy)) (trade name, manufactured by Seiko Epson Corporation).

In regard to monochromatic image of each color, ozone resistance and light fastness (including color balance) are evaluated in the same manner as in Examples 1 to 4 and Comparative Examples 1 to 3. Criteria of evaluations of light fastness and ozone resistance are as follows.

The results of evaluation are shown in Tables 11 and 12 below.

<Light Fastness>
A: Light fastness evaluation is graded A as to all of four colors.
B: Light fastness evaluation is graded B as to one or more of four colors, and the remaining colors are all A.
C: Light fastness evaluation is graded C as to one or more of four colors, and the remaining colors are all A or B
D: Light fastness evaluation is graded D as to one or more of four colors.

<Ozone Resistance>
A: Ozone resistance evaluation is graded A as to all of four colors.
B: Ozone resistance evaluation is graded B as to one or more of four colors, and the remaining colors are all A.
C: Ozone resistance evaluation is graded C as to one or more of four colors, and the remaining colors are all A or B
D: Ozone resistance evaluation is graded D as to one or more of four colors.

TABLE 11

| Example No. | Ozone Resistance | | | | Light Fastness | | | | Preservation Stability of Ink | | | |
|---|---|---|---|---|---|---|---|---|---|---|---|---|
| | Y | M | Cy | Bk | Y | M | Cy | Bk | Y | M | Cy | Bk |
| Example 5 | A | A | A | A | A | A | A | A | A | A | A | A |
| Example 6 | A | A | A | A | A | A | A | A | A | A | A | A |
| Example 7 | A | A | A | A | A | A | A | A | A | A | A | A |
| Example 8 | A | A | A | A | A | A | A | A | A | A | A | A |
| Example 9 | A | A | A | A | A | A | A | A | A | A | A | A |
| Example 10 | A | A | A | A | A | A | A | A | A | A | A | A |
| Example 11 | A | A | A | A | A | A | A | A | A | A | A | A |
| Comparative Example 4 | B | A | A | B | B | A | A | B | C | A | A | A |
| Comparative Example 5 | D | D | D | D | D | D | C | D | B | A | B | B |
| Comparative Example 6 | D | D | D | D | D | D | C | D | B | A | B | B |

TABLE 12

| Example No. | Ozone Resistance | Color Balance | Light Fastness | Color Balance |
|---|---|---|---|---|
| Example 5 | A | A | A | A |
| Example 6 | A | A | A | A |
| Example 7 | A | A | A | A |
| Example 8 | A | A | A | A |
| Example 9 | A | A | A | A |
| Example 10 | A | A | A | A |
| Example 11 | A | A | A | A |
| Comparative Example 4 | B | B | B | B |
| Comparative Example 5 | D | B | D | C |
| Comparative Example 6 | D | B | D | C |

<Manufacture of Recorded Matter with Mixed Ink of Dark Color and Light Color>

Each ink set in Examples 12 to 19 and Comparative Examples 7 to 9 is prepared by the combination of the ink compositions of yellow (Y), magenta (M), cyan (Cy), light cyan (LC), light magenta (LM) and black (Bk) as shown in Table 13 below with each ink composition as shown in Tables 1 to 6.

TABLE 13

| Example No. | Y | LM | M | LC | Cy | Bk |
|---|---|---|---|---|---|---|
| Example 12 | Y-01 | LM-02 | M-01 | LC-01 | C-01 | B-01 |
| Example 13 | Y-02 | LM-02 | M-01 | LC-01 | C-01 | B-01 |
| Example 14 | Y-03 | LM-02 | M-01 | LC-01 | C-01 | B-01 |
| Example 15 | Y-01 | LM-02 | M-01 | LC-01 | C-01 | B-02 |
| Example 16 | Y-01 | LM-02 | M-01 | LC-01 | C-01 | B-03 |
| Example 17 | Y-01 | LM-02 | M-01 | LC-01 | C-01 | B-04 |
| Example 18 | Y-01 | LM-01 | M-01 | LC-01 | C-01 | B-01 |
| Example 19 | Y-01 | LM-01 | M-01 | LC-02 | C-03 | B-01 |
| Comparative Example 7 | Y-04 | LM-02 | M-01 | LC-01 | C-01 | B-05 |
| Comparative Example 8 | Y-05 | LM-03 | M-04 | LC-03 | C-04 | B-06 |
| Comparative Example 9 | Y-05 | LM-04 | M-05 | LC-03 | C-04 | B-06 |

Preservation stability of ink of each ink composition in the ink sets of Examples 12 to 19 and Comparative Examples 7 to 9 is evaluated in the same manner as in Examples 1 to 4 and Comparative Examples 1 to 3.

By using inkjet printer PM930C (trade name, manufactured by Seiko Epson Corporation) and with each ink set, monochromatic image pattern of each color of yellow (Y), magenta (M), cyan (Cy), light cyan (LC), light magenta (LM), and black (Bk), whose density is stepwise changed so that OD value of each color is 0.7 to 1.8, and image patterns of green, red and gray are printed on a special recording medium for inkjet recording (photographic paper <Kohtaku> (glossy)) (trade name, manufactured by Seiko Epson Corporation).

In regard to monochromatic image of each color, ozone resistance and light fastness (including color balance) are evaluated in the same manner as in Examples 1 to 4 and Comparative Examples 1 to 3. Criteria of evaluations of light fastness and ozone resistance are as follows.

The results of evaluation are shown in Tables 14 and 15 below.

<Light Fastness>
A: Light fastness evaluation is graded A as to all of six colors.
B: Light fastness evaluation is graded B as to one or more of six colors, and the remaining colors are all A.
C: Light fastness evaluation is graded C as to one or more of six colors, and the remaining colors are all A or B
D: Light fastness evaluation is graded D as to one or more of six colors.

<Ozone Resistance>
A: Ozone resistance evaluation is graded A as to all of six colors.
B: Ozone resistance evaluation is graded B as to one or more of six colors, and the remaining colors are all A.
C: Ozone resistance evaluation is graded C as to one or more of six colors, and the remaining colors are all A or B
D: Ozone resistance evaluation is graded D as to one or more of six colors.

TABLE 14

| Example No. | Ozone Resistance | | | | | | Light Fastness | | | | | |
|---|---|---|---|---|---|---|---|---|---|---|---|---|
| | Y | LM | M | LC | Cy | Bk | Y | LM | M | LC | Cy | Bk |
| Example 12 | A | A | A | A | A | A | A | A | A | A | A | A |
| Example 13 | A | A | A | A | A | A | A | A | A | A | A | A |
| Example 14 | A | A | A | A | A | A | A | A | A | A | A | A |
| Example 15 | A | A | A | A | A | A | A | A | A | A | A | A |
| Example 16 | A | A | A | A | A | A | A | A | A | A | A | A |
| Example 17 | A | A | A | A | A | A | A | A | A | A | A | A |
| Example 18 | A | A | A | A | A | A | A | A | A | A | A | A |
| Example 19 | A | A | A | A | A | A | A | A | A | A | A | A |
| Comparative Example 7 | B | A | A | A | A | B | B | A | A | A | A | B |
| Comparative Example 8 | D | D | D | D | D | D | D | D | D | D | C | D |
| Comparative Example 9 | D | D | D | D | D | D | D | D | D | D | C | D |

TABLE 15

| Example No. | Ozone Resistance | Color Balance | Light Fastness | Color Balance |
|---|---|---|---|---|
| Example 12 | A | A | A | A |
| Example 13 | A | A | A | A |
| Example 14 | A | A | A | A |
| Example 15 | A | A | A | A |
| Example 16 | A | A | A | A |
| Example 17 | A | A | A | A |
| Example 18 | A | A | A | A |
| Example 19 | A | A | A | A |
| Comparative Example 7 | B | B | B | B |
| Comparative Example 8 | D | B | D | C |
| Comparative Example 9 | D | B | D | C |

From the above results, it is confirmed that the ink sets in the invention are excellent in ink preservation stability and color balance, and images (recorded matters) having excellent light fastness and ozone resistance can be obtained with the ink sets in the invention.

What is claimed is:

1. An ink set comprising at least a yellow ink composition, a magenta ink composition, and a cyan ink composition, wherein the yellow ink composition contains as a colorant at least one selected from the group consisting of a compound represented by formula (Y-I) and a salt thereof:

Formula (Y-I):

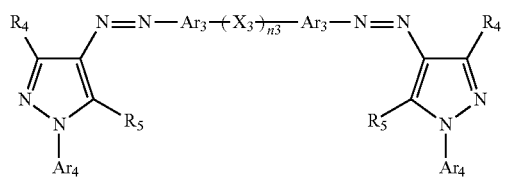

wherein $R_4$ represents a monovalent group; $R_5$ represents —$OR_6$ or —$NHR_7$; each of $R_6$ and $R_7$ represents a hydrogen atom or a monovalent group; $X_3$ represents a divalent linking group; $n_3$ represents 0 or 1; $Ar_3$ represents a divalent heterocyclic group; and $Ar_4$ represents an aryl group.

2. The ink set as claimed in claim 1, wherein the aryl group represented by $Ar_4$ has a sulfo group or a carboxyl group as a substituent.

3. The ink set as claimed in claim 1, wherein the yellow ink composition conatins the colorant in an amout of 1.0% by mass to 6.0% by mass to the gross mass of the yellow ink composition.

4. The ink set as claimed in claim 1, wherein the magenta ink composition contains as a colorant at least one selected from the group consisting of a compound represented by formula (M-1) and a salt thereof:

Formula (M-1):

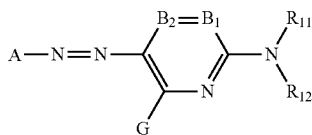

wherein
A represents a 5-membered heterocyclic group;
each of $B_1$ and $B_2$ independently represents —$CR_{13}$= or —$CR_{14}$=, or either one of $B_1$ and $B_2$ represents a nitrogen atom and the other represents —$CR_{13}$= or —$CR_{14}$=;
each of $R_{11}$ and $R_{12}$ independently represents a hydrogen atom, an alkyl group, a cycloalkyl group, an alkenyl group, an alkynyl group, an aralkyl group, an aryl group, a heterocyclic group, an acyl group, an alkoxycarbonyl group, an aryloxycarbonyl group, a carbamoyl group, an alkylsulfonyl group, an arylsulfonyl group, or a sulfamoyl group, and each group may further have a substituent; and
each of G, $R_{13}$ and $R_{14}$ independently represents a hydrogen atom, a halogen atom, an alkyl group, an alkenyl group, an alkynyl group, an aralkyl group, an aryl group, a heterocyclic group, a cyano group, a carboxyl group, a carbamoyl group, an alkoxycarbonyl group, an aryloxycarbonyl group, an acyl group, a hydroxyl group, an alkoxy group, an aryloxy group, a silyloxy group, an acyloxy group, a carbamoyloxy group, a heterocyclic oxy group, an alkoxycarbonyloxy group, an aryloxycarbonyloxy group, an amino group substituted with an alkyl group or aryl group or heterocyclic group, an acylamino group, a ureido group, a sulfamoylamino group, an alkoxycarbonylamino group, an aryloxycarbonylamino group, an alkylsulfonylamino group, an arylsulfonylamino group, a nitro group, an alkylthio group, an arylthio group, an alkylsulfonyl group, an arylsulfonyl group, an alkylsulfinyl group, an arylsulfinyl group, a sulfamoyl group, a heterocyclic thio group, or an ionic hydrophilic group, each of which may further be substituted, and $R_{13}$ and $R_{14}$, or $R_{11}$ and $R_{12}$ may be bonded to form a 5- or 6-membered ring,
provided that formula (M-1) has at least one ionic hydrophilic group.

5. The ink set as claimed in claim 4, wherein the magenta ink composition includes two magenta ink compositions different in color density, and at least one of the two magenta ink compositions contains as a colorant at least one selected from the group consisting of a compound represented by formula (M-1) and a salt thereof.

6. The ink set as claimed in claim 5, wherein, of the two magenta ink compositions different in color density, a magenta ink composition having a lower color density contains as a colorant at least one selected from the group consisting of a compound represented by formula (M-1) and a salt thereof, and the magenta ink composition having the lower color density contains the colorant in an amount of 0.5% by mass to 3.5% by mass to the gross mass of the magenta ink composition having the lower color density.

7. The ink set as claimed in claim 5, wherein, of the two magenta ink compositions different in color density, a magenta ink composition having a higher color density contains as a colorant at least one selected from the group consisting of a compound represented by formula (M-1) and a salt thereof, and the magenta ink composition having the higher color density contains the colorant in an amount of 3% by mass to 10% by mass to the gross mass of the magenta ink composition having the higher color density.

8. The ink set as claimed in claim 5, wherein, in the two magenta ink compositions different in color density, a ratio of a concentration (% by mass) of the colorant contained in a magenta ink composition having a lower color density to a concentration (% by mass) of the colorant contained in a magenta ink composition having a higher color density (% by mass) is in a range of ½ to ⅛.

9. The ink set as claimed in claim 1, wherein the cyan ink composition contains as a colorant at least one selected from the group consisting of a compound represented by formula (C-1) and a salt thereof:

Formula (C-1):

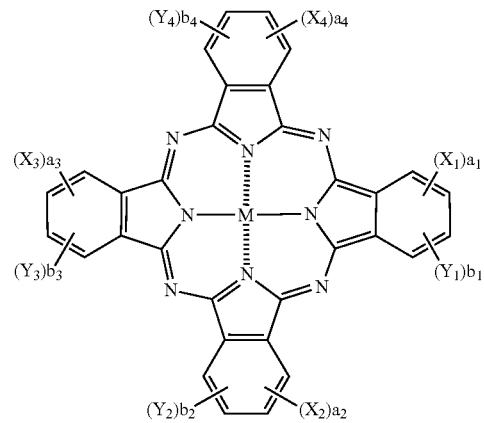

wherein
each of $X_1$, $X_2$, $X_3$ and $X_4$ independently represents —SO—Z, —$SO_2$—Z, —$SO_2NV_1V_2$, —$CO_2NV_1V_2$, —$CO_2Z$, —CO—Z, or a sulfo group, wherein Z represents an alkyl group, a cycloalkyl group, an alkenyl group, an alkynyl group, an aralkyl group, an aryl group, or a heterocyclic group, and each group may further have a substituent; $V_1$ and $V_2$, which may be the same or different, and each independently represents a hydrogen atom, an alkyl group, a cycloalkyl group, an alkenyl group, an alkynyl group, an aralkyl group, an aryl group, or a heterocyclic group, and each group may further have a substituent;

each of $Y_1, Y_2, Y_3$ and $Y_4$ independently represents a hydrogen atom, a halogen atom, an alkyl group, a cycloalkyl group, an alkenyl group, an aralkyl group, an aryl group, a heterocyclic group, a cyano group, a hydroxyl group, a nitro group, an amino group, an alkylamino group, an alkoxy group, an aryloxy group, an amido group, an arylamino group, a ureido group, a sulfamoylamino group, an alkylthio group, an arylthio group, an alkoxycarbonylamino group, a sulfonamido group, a carbamoyl group, a sulfamoyl group, an alkoxycarbonyl group, a heterocyclic oxy group, an azo group, an acyloxy group, a carbamoyloxy group, a silyloxy group, an aryloxycarbonyl group, an aryloxycarbonylamino group, an imido group, a heterocyclic thio group, a phosphoryl group, an acyl group, or an ionic hydrophilic group, and each of these groups may further have a substituent;

each of $a_1$ to $a_4$ and $b_1$ to $b_4$ represents the number of substituents of $X_1$ to $X_4$ and $Y_1$ to $Y_4$, respectively, each of $a_1$ to $a_4$ independently represents an integer of 0 to 4, and all of $a_1$ to $a_4$ do not represent 0 at the same time, and each of $b_1$ to $b_4$ independently represents an integer of 0 to 4; and M represents a hydrogen atom or a metal atom or an oxide, hydroxide, or halide thereof, provided that at least one of $X_1, X_2, X_3, X_4, Y_1, Y_2, Y_3$ and $Y_4$ is an ionic hydrophilic group or a group having an ionic hydrophilic group as a substituent.

10. The ink set as claimed in claim 9, wherein the cyan ink composition includes two cyan ink compositions different in color density, and at least one of the two cyan ink compositions contains as a colorant at least one selected from the group consisting of a compound represented by formula (C-1) and a salt thereof.

11. The ink set as claimed in claim 10, wherein, of the two cyan ink compositions different in color density, a cyan ink composition having a lower color density contains as a colorant at least one selected from the group consisting of a compound represented by formula (C-1) and a salt thereof, and the cyan ink composition having the lower color density contains the colorant in an amount of 0.4% by mass to 3.0% by mass to the gross mass of the cyan ink composition having the lower color density.

12. The ink set as claimed in claim 10, wherein, of the two cyan ink compositions different in color density, a cyan ink composition having a higher color density contains as a colorant at least one selected from the group consisting of a compound represented by formula (C-1) and a salt thereof, and the cyan ink composition having the higher color density contains the colorant in an amout of 2.0% by mass to 10.0% by mass to the gross mass of the cyan ink composition having the higher color density.

13. The ink set as claimed in claim 10, wherein, in the two cyan ink compositions different in color density, a ratio of a concentration (% by mass) of the colorant contained in a cyan ink composition having a lower color density to a concentration (% by mass) of the colorant contained in a cyan ink composition having a higher color density is in an range of ½ to ⅛.

14. The ink set as claimed in claim 1, which further comprises a black ink composition, wherein the black ink composition contains as a colorant at least one selected from the group consisting of a compound represented by formula (BkII-1) or (BkIII-1) and a salt thereof:

Formula (BkII-1):

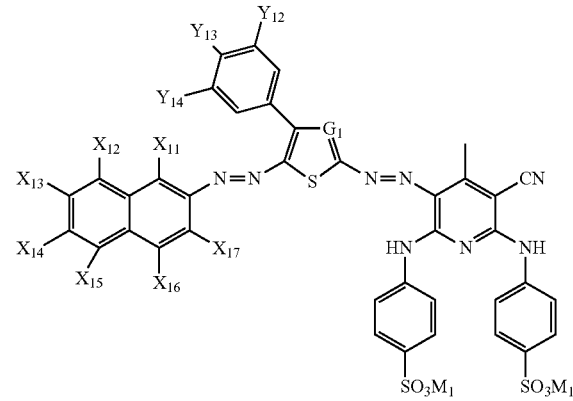

wherein $G_1$ represents a nitrogen atom or $-C(R_{12})=$; $R_{12}$ represents a hydrogen atom, a sulfo group, a carboxyl group, a substituted or unsubstituted carbamoyl group, or a cyano group; each of $X_{11}, X_{12}, X_{13}, X_{14}, X_{15}, X_{16}$ and $X_{17}$ independently represents a hydrogen atom or a monovalent substituent; each of $Y_{12}, Y_{13}$ and $Y_{14}$ independently represents a hydrogen atom or a monovalent substituent, and $Y_{12}, Y_{13}$ and $Y_{14}$ may be bonded to each other to form a ring; and each of $M_1$ independently represents a hydrogen atom or a monovalent counter cation;

Formula (BkIII-1):

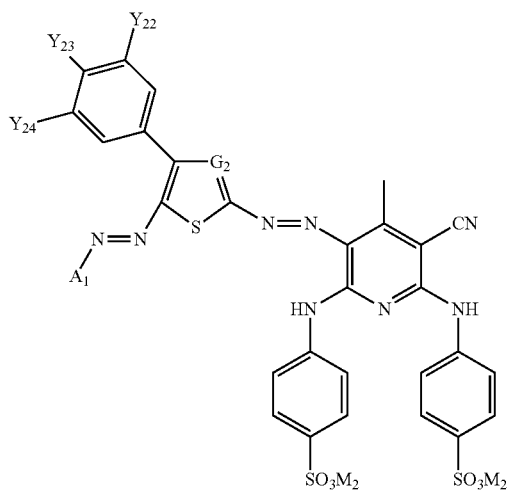

wherein $A_1$ represents an aryl group or a nitrogen-containing 5-membered heterocyclic group; $G_2$ represents a nitrogen atom or $-C(R_{22})=$; $R_{22}$ represents a hydrogen atom, a sulfo group, a carboxyl group, a substituted or unsubstituted carbamoyl group, or a cyano group; each of $Y_{22}, Y_{23}$ and $Y_{24}$ independently represents a hydrogen atom or a monovalent substituent, and $Y_{22}, Y_{23}$ and $Y_{24}$ may be bonded to each other to form a ring; and each of $M_2$ independently represents a hydrogen atom or a monovalent counter cation.

15. The ink set as claimed in claim 14, wherein the black ink composition further contains a compound represented by formula (B-14):

Formula (B-14):

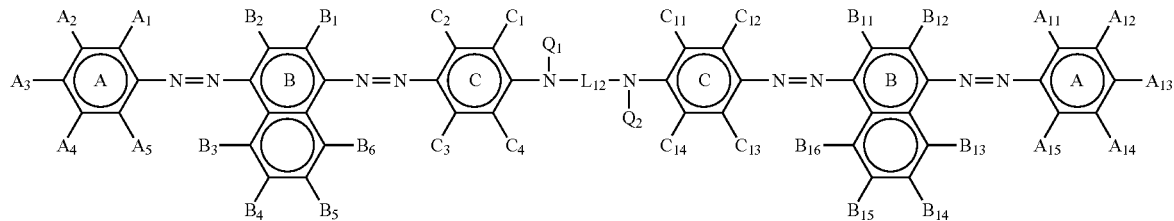

wherein each of ring A, ring B and ring C independently represents a substituted or unsubstituted aryl group or heterocyclic group; each of $A_1$, $A_2$, $A_3$, $A_4$, $A_5$, $A_{11}$, $A_{12}$, $A_{13}$, $A_{14}$, $A_{15}$, $B_1$, $B_2$, $B_3$, $B_4$, $B_5$, $B_6$, $B_{11}$, $B_{12}$, $B_{13}$, $B_{14}$, $B_{15}$, $B_{16}$, $C_1$, $C_2$, $C_3$, $C_4$, $C_{11}$, $C_{12}$, $C_{13}$ and $C_{14}$ independently represents a hydrogen atom or a substituent; each of $Q_1$ and $Q_2$ independently represents a hydrogen atom or a substituent; and $L_{12}$ represents a divalent linking group, provided that the compound represented by formula (B-14) has at least one ionic hydrophilic group.

16. An ink cartridge housing an ink set as claimed in claim 1.

17. An inkjet printer loaded with an ink cartridge as claimed in claim 16.

18. An inkjet recording method comprising recording with an ink set as claimed in claim 1.

19. An inkjet recording method comprising forming an image with an ink set as claimed in claim 1.

20. A recorded matter recorded with an ink set as claimed in claim 1.

* * * * *